(12) United States Patent
Meenakshisundaram et al.

(10) Patent No.: US 12,053,925 B2
(45) Date of Patent: Aug. 6, 2024

(54) RECOATING SYSTEM INCLUDING MULTIPLE BLADES

(71) Applicant: Align Technology, Inc., San Jose, CA (US)

(72) Inventors: Viswanath Meenakshisundaram, Santa Clara, CA (US); Peter Dorfinger, Woodside, CA (US); Umesh Upendra Choudhary, Santa Cruz, CA (US); Michael Christopher Cole, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/963,958

(22) Filed: Oct. 11, 2022

(65) Prior Publication Data

US 2023/0121648 A1 Apr. 20, 2023

Related U.S. Application Data

(60) Provisional application No. 63/300,512, filed on Jan. 18, 2022, provisional application No. 63/255,655, filed on Oct. 14, 2021.

(51) Int. Cl.
| | |
|---|---|
| *B29C 64/214* | (2017.01) |
| *A61C 7/08* | (2006.01) |
| *A61C 7/10* | (2006.01) |
| *B29C 64/124* | (2017.01) |
| *B29C 64/223* | (2017.01) |
| *B29C 64/245* | (2017.01) |
| *B29C 64/255* | (2017.01) |

(Continued)

(52) U.S. Cl.
CPC .............. *B29C 64/214* (2017.08); *A61C 7/08* (2013.01); *A61C 7/10* (2013.01); *B29C 64/124* (2017.08); *B29C 64/223* (2017.08); *B29C 64/245* (2017.08); *B29C 64/255* (2017.08); *B29C 64/321* (2017.08); *B29C 64/393* (2017.08); *B33Y 30/00* (2014.12); *B33Y 40/00* (2014.12); *B33Y 50/02* (2014.12); *B29L 2031/753* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 5,688,464 | A | 11/1997 | Jacobs et al. |
| 6,048,487 | A | 4/2000 | Almquist et al. |

(Continued)

FOREIGN PATENT DOCUMENTS

| | | |
|---|---|---|
| CN | 208881187 U | 5/2019 |
| CN | 210501451 U | 5/2020 |

(Continued)

*Primary Examiner* — Yung-Sheng M Tsui
(74) *Attorney, Agent, or Firm* — Lowenstein Sandler LLP

(57) ABSTRACT

A system includes a carrier film including an outer surface and an inner surface. The inner surface is configured to contact rollers. The system further includes a first blade configured to form a layer of resin on the outer surface of the carrier film. The system further includes a second blade configured to prevent printed features from contacting the first blade. The system further includes a build platform. A portion of the layer of resin is to be added to an object being formed on the build platform.

17 Claims, 22 Drawing Sheets

(51) Int. Cl.
*B29C 64/321* (2017.01)
*B29C 64/393* (2017.01)
*B33Y 30/00* (2015.01)
*B33Y 40/00* (2020.01)
*B33Y 50/02* (2015.01)
B29L 31/00 (2006.01)
B33Y 80/00 (2015.01)

(56) References Cited

U.S. PATENT DOCUMENTS

| | | |
|---|---|---|
| 6,210,162 B1 | 4/2001 | Chishti et al. |
| 6,309,215 B1 | 10/2001 | Phan et al. |
| 6,450,807 B1 | 9/2002 | Chishti et al. |
| 6,497,574 B1 | 12/2002 | Miller |
| 6,656,410 B2 | 12/2003 | Hull et al. |
| 6,749,414 B1 | 6/2004 | Hanson et al. |
| 6,830,450 B2 | 12/2004 | Knopp et al. |
| 6,957,118 B2 | 10/2005 | Kopelman et al. |
| 6,964,564 B2 | 11/2005 | Phan et al. |
| 6,976,627 B1 | 12/2005 | Culp et al. |
| 7,092,784 B1 | 8/2006 | Simkins |
| 7,220,124 B2 | 5/2007 | Taub et al. |
| 7,236,842 B2 | 6/2007 | Kopelman et al. |
| 7,245,977 B1 | 7/2007 | Simkins |
| 7,261,533 B2 | 8/2007 | Wrosz et al. |
| 7,335,024 B2 | 2/2008 | Wen |
| 7,384,266 B2 | 6/2008 | Wen |
| 7,435,084 B2 | 10/2008 | Liu et al. |
| 7,472,789 B2 | 1/2009 | Wu et al. |
| 7,476,100 B2 | 1/2009 | Kuo |
| 7,481,647 B2 | 1/2009 | Sambu et al. |
| 7,604,181 B2 | 10/2009 | Culp et al. |
| 7,641,828 B2 | 1/2010 | DeSimone et al. |
| 7,648,360 B2 | 1/2010 | Kuo |
| 7,674,422 B2 | 3/2010 | Kuo |
| 7,711,447 B2 | 5/2010 | Lu et al. |
| 7,748,199 B2 | 7/2010 | Sankaran et al. |
| 7,802,987 B1 | 9/2010 | Phan |
| 7,819,659 B2 | 10/2010 | Wen |
| 7,831,322 B2 | 11/2010 | Liu et al. |
| 7,840,373 B2 | 11/2010 | Culp et al. |
| 7,874,836 B2 | 1/2011 | McSurdy, Jr. |
| 7,892,474 B2 | 2/2011 | Shkolnik et al. |
| 7,922,490 B2 | 4/2011 | Wen |
| 7,957,824 B2 | 6/2011 | Boronvinskih et al. |
| 8,019,465 B2 | 9/2011 | Spiridonov et al. |
| 8,030,588 B2 | 10/2011 | Culp et al. |
| 8,087,932 B2 | 1/2012 | Liu |
| 8,636,513 B2 | 1/2014 | Wen |
| 8,740,614 B2 | 6/2014 | Wen et al. |
| 8,765,031 B2 | 7/2014 | Li et al. |
| 8,776,391 B1 | 7/2014 | Kaza et al. |
| 9,108,338 B2 | 8/2015 | Sirovskiy et al. |
| 9,403,238 B2 | 8/2016 | Culp |
| 9,610,141 B2 | 4/2017 | Kopelman et al. |
| 9,655,691 B2 | 5/2017 | Li et al. |
| 9,844,424 B2 | 12/2017 | Wu et al. |
| 9,943,386 B2 | 4/2018 | Webber et al. |
| 9,943,991 B2 | 4/2018 | Tanugula et al. |
| 10,213,277 B2 | 2/2019 | Webber et al. |
| 10,336,102 B2 | 7/2019 | Cole |
| 10,363,116 B2 | 7/2019 | Boronkay |
| 10,495,973 B2 | 12/2019 | Cole |
| 10,783,629 B2 | 9/2020 | Parpara et al. |
| 10,888,395 B2 | 1/2021 | Kopelman |
| 11,189,021 B2 | 11/2021 | Paren et al. |
| 11,295,444 B2 | 4/2022 | Cherkas et al. |
| 11,420,362 B2 | 8/2022 | Mojdeh et al. |
| 2004/0243361 A1 | 12/2004 | Steuben et al. |
| 2006/0093982 A1 | 5/2006 | Wen |
| 2006/0093987 A1 | 5/2006 | Wen |
| 2006/0093993 A1 | 5/2006 | Wen |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199145 A1 | 9/2006 | Liu et al. |
| 2007/0092853 A1 | 4/2007 | Liu et al. |
| 2007/0243502 A1 | 10/2007 | Wen |
| 2008/0083348 A1 | 4/2008 | Kuo et al. |
| 2009/0148814 A1 | 6/2009 | Li et al. |
| 2012/0248657 A1 | 10/2012 | Ebert et al. |
| 2014/0061974 A1 | 3/2014 | Tyler |
| 2014/0265034 A1 | 9/2014 | Dudley |
| 2015/0097315 A1 | 4/2015 | Desimone et al. |
| 2015/0224710 A1 | 8/2015 | El-Siblani |
| 2015/0238280 A1 | 8/2015 | Wu et al. |
| 2016/0288412 A1 * | 10/2016 | Stampfl ............ B29C 64/124 |
| 2016/0310236 A1 | 10/2016 | Kopelman et al. |
| 2017/0007362 A1 | 1/2017 | Chen et al. |
| 2017/0007365 A1 | 1/2017 | Kopelman et al. |
| 2017/0007366 A1 | 1/2017 | Kopelman et al. |
| 2017/0007368 A1 | 1/2017 | Boronkay |
| 2017/0165032 A1 | 6/2017 | Webber et al. |
| 2017/0319296 A1 | 11/2017 | Webber et al. |
| 2017/0326792 A1 * | 11/2017 | Paternoster ............ B22F 12/63 |
| 2018/0065302 A1 | 3/2018 | Arai et al. |
| 2018/0153648 A1 | 6/2018 | Shanjani et al. |
| 2018/0200948 A1 | 7/2018 | Kuijpers et al. |
| 2019/0298494 A1 | 10/2019 | Webber et al. |
| 2019/0314119 A1 | 10/2019 | Kopelman et al. |
| 2020/0078137 A1 | 3/2020 | Chen et al. |
| 2020/0214801 A1 | 7/2020 | Wang et al. |
| 2020/0262150 A1 * | 8/2020 | Dubelman ............ B29C 64/205 |
| 2020/0290262 A1 | 9/2020 | Aguilar Mendez et al. |
| 2020/0306017 A1 | 10/2020 | Chavez et al. |
| 2020/0316856 A1 | 10/2020 | Mojdeh et al. |
| 2021/0030516 A1 | 2/2021 | O'Leary et al. |
| 2021/0169617 A1 | 6/2021 | Nishimuta et al. |
| 2021/0170676 A1 | 6/2021 | Kitchen et al. |
| 2021/0299960 A1 | 9/2021 | Liu |
| 2022/0088873 A1 | 3/2022 | Voit et al. |
| 2022/0402198 A1 | 12/2022 | Thompson et al. |

FOREIGN PATENT DOCUMENTS

| | | | |
|---|---|---|---|
| EP | 3322582 B1 | 7/2020 | |
| JP | 2000025118 A | 1/2000 | |
| JP | 2021133676 A | 9/2021 | |
| KR | 102253316 B1 * | 4/2020 | |
| WO | WO-2019009496 A1 * | 1/2019 | ........ B29C 64/106 |
| WO | 2019213585 A1 | 11/2019 | |
| WO | 2019213588 A1 | 11/2019 | |

* cited by examiner

ACTIVE EXPANDERS

PASSIVE HOLDER (RETAINER)

RECOATING SYSTEM INCLUDING MULTIPLE BLADES

RELATED APPLICATIONS

This application is related to U.S. application Ser. No. 17/963,963, filed Oct. 11, 2022, and U.S. application Ser. No. 17/963,964, filed Oct. 11, 2022, the contents of which are hereby incorporated by reference in their entirety.

TECHNICAL FIELD

The technical field relates to the field of forming objects and, in particular, to forming objects with a recoating system.

BACKGROUND

Three-dimensional (3D) printing systems (e.g., additive manufacturing systems, recoating systems) are used to form a 3D object layer by layer. 3D printing systems can use resin to form objects. 3D printing systems can be used to make dental appliances to be used in corrective dentistry or orthodontic treatment. Dental appliances, such as palatal expanders, dental aligners and attachment formation templates, are used to perform particular functions in accordance with respective treatment plans. For example, incremental palatal expanders can include a set of dental appliances that fit into a palate of a patient and function to expand a patient's palate according to a treatment plan. Aligners can include polymeric dental appliances that include tooth-receiving cavities to receive and reposition a patient's teeth to correct malocclusions. Dental attachment templates can include dental appliances shaped to fit to a patient's dentition and allow for the placement of attachments, e.g., bonded attachments, prefabricated attachments, etc. to the patient's dentition.

SUMMARY

Some example implementations of the present disclosure are summarized herein.

In a first implementation, a system comprises: a carrier film comprising an outer surface and an inner surface, wherein the inner surface is configured to contact rollers; a first blade configured to form a layer of resin on the outer surface of the carrier film; a second blade configured to prevent printed features from contacting the first blade; and a build platform, wherein a portion of the layer of resin is to be added to an object being formed on the build platform.

A second implementation may further extend the first implementation. In the second implementation, the printed features comprise one or more of a printing defect, incomplete curing, or layer delamination from the object being formed on the build platform.

A third implementation may further extend the first or second implementations. In the third implementation, the second blade forms a plurality of openings to allow resin to flow through the second blade to prevent accumulation of the resin behind the second blade and to prevent resin-spill over.

A fourth implementation may further extend the third implementation. In the fourth implementation, the second blade has a graded porosity or mesh that forms the plurality of openings.

A fifth implementation may further extend any of the first through fourth implementations. In the fifth implementation, the second blade is configured to direct the printed features into a capture basin.

A sixth implementation may further extend any of the first through fifth implementations. In the sixth implementation, distance of the second blade from the carrier film and mounting angle of the second blade relative to the carrier film are adjustable for collection of the printed features.

A seventh implementation may further extend any of the first through sixth implementations. In the seventh implementation, the system further comprises a third blade, wherein the second blade and the third blade are at different distances from the carrier film.

An eighth implementation may further extend any of the first through seventh implementations. In the eighth implementation, the system further comprises a closing gate disposed above the carrier film, wherein the second blade is disposed between the first blade and the closing gate, wherein the second blade is closer to the carrier film than the first blade and the closing gate.

A ninth implementation may further extend any of the first through eighth implementations. In the ninth implementation, the second blade is curved to collect the printed features.

A tenth implementation may further extend any of the first through ninth implementations. In the tenth implementation, the second blade has a shorter height than the first blade.

An eleventh implementation may further extend any of the first through tenth implementations. In the eleventh implementation, the first blade is disposed substantially perpendicular to the carrier film, and wherein the second blade is not parallel to the first blade.

A twelfth implementation may further extend any of the first through eleventh implementations. In the twelfth implementation, the system further comprises an automated device that is configured to remove the printed features from the second blade.

A thirteenth implementation may further extend any of the first through twelfth implementations. In the thirteenth implementation, at least one of the first blade or the second blade is configured to vibrate to reduce viscosity of the layer of resin.

A fourteenth implementation may further extend any of the first through thirteenth implementations. In the fourteenth implementation, one or more structures are configured to at least partially cover resin accumulated behind the first blade, and wherein the one or more structures are configured to prevent evaporation of the resin.

A fifteenth implementation may further extend any of the first through fourteenth implementations. In the fifteenth implementation, the object is a dental appliance.

A sixteenth implementation may further extend any of the first through fifteenth implementations. In the sixteenth implementation, the system further comprises a controller configured to: receive image data from an imaging device directed to the carrier film; responsive to determining, based on the image data, that uniformity of the layer of resin does not meet a threshold uniformity, moving the second blade to capture the printed features.

In a seventeenth implementation, a system comprises: a carrier film comprising an outer surface and an inner surface, wherein the inner surface is configured to contact rollers; a first structure configured to form a layer of resin on the outer surface of the carrier film, wherein the first structure is oriented substantially perpendicular to the carrier film; a second structure configured to prevent printed features from contacting the first structure, wherein the second structure is disposed proximate the outer surface of the carrier film; and a build platform, wherein a portion of the layer of resin is to be added to an object being formed on the build platform.

An eighteenth implementation may further extend the seventeenth implementation. In the eighteenth implementation, the second structure is closer to the outer surface of the carrier film than the first structure, and wherein the second structure is configured to direct the printed features off of the carrier film.

In a nineteenth implementation, a system comprises: a plurality of rollers; a carrier film configured to be moved in a loop trajectory by the plurality of rollers, wherein a layer of resin is to be disposed on an outer surface of the carrier film and the rollers are to contact an inner surface of the carrier film; a build platform disposed under the carrier film, wherein a portion of the layer of resin is to be added to an object being formed on the build platform; and a blade disposed above the carrier film, wherein the blade is to direct printed features to a capture basin to maintain thickness uniformity of the layer of resin.

A twentieth implementation may further extend the nineteenth implementation. In the twentieth implementation, the blade forms a plurality of openings to allow resin to flow through the blade to prevent accumulation of the resin behind the blade and to prevent resin-spill over.

In a twenty-first implementation, a system comprises: a build platform configured to support an object that is being formed from layers of resin; and one or more blades configured to provide the layers of resin to form the object on the build platform, wherein at least a first blade of the one or more blades is configured to vibrate to reduce viscosity of the layers of resin.

A twenty-second implementation may further extend the twenty-first implementation. In the twenty-second implementation, the system further comprises a piezoelectric element coupled to the first blade to induce one or more frequencies of vibration on the first blade.

A twenty-third implementation may further extend the twenty-first or twenty-second implementations. In the twenty-third implementation, the system further comprises an ultrasonic element coupled to the first blade to induce one or more frequencies of vibration on the first blade.

A twenty-fourth implementation may further extend any of the twenty-first through twenty-third implementations. In the twenty-fourth implementation, the system further comprises a mechanical element coupled to the first blade to induce one or more frequencies of vibration on the first blade.

A twenty-fifth implementation may further extend any of the twenty-first through twenty-fourth implementations. In the twenty-fifth implementation, the first blade is configured to agitate the layers of resin.

A twenty-sixth implementation may further extend any of the twenty-first through twenty-fifth implementations. In the twenty-sixth implementation, frequency of vibration of the first blade is selected based on material type of the layers of resin.

A twenty-seventh implementation may further extend any of the twenty-first through twenty-sixth implementations. In the twenty-seventh implementation, the layers of resin are formed from resin that has a viscosity of greater than 5 Pascal-second (Pa·s).

A twenty-eighth implementation may further extend any of the twenty-first through twenty-seventh implementations. In the twenty-eighth implementation, the system further comprises one or more vibration isolators coupled to the first blade to control frequency modulated vibrations of the first blade.

A twenty-ninth implementation may further extend any of the twenty-first through twenty-eighth implementations. In the twenty-ninth implementation, the first blade has a first distal end disposed proximate the object or a carrier film and a second distal end opposite the first distal end, and wherein the first distal end is to vibrate while the second distal end is to be substantially stationary.

A thirtieth implementation may further extend any of the twenty-first through twenty-ninth implementations. In the thirtieth implementation, the first blade has a first distal end disposed proximate the object or a carrier film and a second distal end opposite the first distal end, and wherein the first blade is to pivot about a point at the second distal end of the first blade.

A thirty-first implementation may further extend any of the twenty-first through thirtieth implementations. In the thirty-first implementation, the first blade is configured to vibrate by moving in one or more of x-direction, y-direction, or z-direction.

A thirty-second implementation may further extend any of the twenty-first through thirty-first implementations. In the thirty-second implementation, the system further comprises a second blade, wherein: the first blade is configured to prevent printed features from contacting the second blade; or the second blade is configured to prevent the printed features from contacting the first blade.

A thirty-third implementation may further extend any of the twenty-first through thirty-second implementations. In the thirty-third implementation, one or more structures are configured to at least partially cover resin accumulated behind at least one of the one or more blades, and wherein the one or more structures are configured to prevent evaporation of the resin.

A thirty-fourth implementation may further extend any of the twenty-first through thirty-third implementations. In the thirty-fourth implementation, the system further comprises a carrier film comprising an outer surface and an inner surface, wherein the inner surface is configured to contact rollers, wherein at least one of the one or more blades are configured to form a layer of resin on the outer surface of the carrier film, and wherein a portion of the layer of resin is to be added to the object being formed on the build platform.

A thirty-fifth implementation may further extend any of the twenty-first through thirty-fourth implementations. In the thirty-fifth implementation, the system further comprises a vat, wherein the build platform and resin are disposed in the vat.

A thirty-sixth implementation may further extend any of the twenty-first through thirty-fifth implementations. In the thirty-sixth implementation, the object is a dental appliance.

In a thirty-seventh implementation, a system comprises: a build platform configured to support an object that is being formed from layers of resin; and one or more blades configured to provide the layers of resin to form the object on the build platform, wherein at least a first blade of the one or more blades is configured to move in one or more of x-direction, y-direction, or z-direction to reduce viscosity of the layers of resin.

A thirty-eighth implementation may further extend the thirty-seventh implementation. In the thirty-eighth implementation, the system further comprises a motor coupled to the first blade to move the first blade.

In a thirty-ninth implementation, a system comprises: a build platform configured to support an object that is being formed from layers of resin; and a blade configured to vibrate to reduce viscosity of the layers of resin.

A fortieth implementation may further extend the thirty-ninth implementation. In the fortieth implementation, one or more of a piezoelectric element, ultrasonic element, or mechanical element is coupled to the blade to induce one or more frequencies of vibration on the blade.

In a forty-first implementation, a system comprises: a partial enclosure configured to hold resin; one or more structures configured to at least partially cover the resin, and wherein the one or more structures are configured to prevent evaporation of the resin; and a build platform configured to support an object that is being formed from layers of the resin, wherein a first blade is configured to provide the layers of the resin to form the object on the build platform.

A forty-second implementation may further extend the forty-first implementation. In the forty-second implementation, the one or more structures are configured to float in an upper portion of the resin, and wherein upper surfaces of the one or more structures are to be above the resin responsive to the one or more structures floating in the resin.

A forty-third implementation may further extend the forty-first or forty-second implementations. In the forty-third implementation, the one or more structures comprise one or more of hollow balls, plastic balls, or metal balls.

A forty-fourth implementation may further extend any of the forty-first through forty-third implementations. In the forty-fourth implementation, the one or more structures comprise a lid.

A forty-fifth implementation may further extend any of the forty-first through forty-fourth implementations. In the forty-fifth implementation, the one or more structures comprise a membrane.

A forty-sixth implementation may further extend any of the forty-first through forty-fifth implementations. In the forty-sixth implementation, the partial enclosure is a vat, and wherein the build platform and the resin are disposed in the vat.

A forty-seventh implementation may further extend any of the forty-first through forty-sixth implementations. In the forty-seventh implementation, the build platform is at least partially submerged in the resin in the partial enclosure.

A forty-eighth implementation may further extend any of the forty-first through forty-seventh implementations. In the forty-eighth implementation, the partial enclosure comprises: a carrier film, wherein the partial enclosure forms a carrier film coating zone; the first blade disposed above the carrier film; a closing gate disposed above the carrier film; and side walls disposed between the first blade and closing gate above the carrier film.

A forty-ninth implementation may further extend any of the forty-first through forty-eighth implementations. In the forty-ninth implementation, the system further comprises a second blade, wherein the second blade is configured to prevent printed features from contacting the first blade.

A fiftieth implementation may further extend any of the forty-first through forty-ninth implementations. In the fiftieth implementation, the first blade is configured to vibrate to reduce viscosity of the resin.

In a fifty-first implementation, a system comprises: a partial enclosure configured to hold resin, wherein the resin in the partial enclosure is to be at least partially covered to prevent evaporation of the resin; and a build platform configured to support an object that is being formed from layers of the resin, wherein a first blade configured to provide the layers of the resin to form the object on the build platform.

A fifty-second implementation may further extend the fifty-first implementation. In the fifty-second implementation, the resin in the partial enclosure is to be covered by silicon oil.

A fifty-third implementation may further extend the fifty-first or fifty-second implementations. In the fifty-third implementation, the resin in the partial enclosure is to be at least partially covered by a membrane.

A fifty-fourth implementation may further extend any of the fifty-first through fifty-third implementations. In the fifty-fourth implementation, the resin in the partial enclosure is to be at least covered by a sealed lid.

A fifty-fifth implementation may further extend any of the fifty-first through fifty-fourth implementations. In the fifty-fifth implementation, the resin in the partial enclosure is to be at least partially covered by a plurality of structures floating in the resin.

In a fifty-sixth implementation, a system comprises: a partial enclosure configured to hold resin; a chiller-condenser disposed above the partial enclosure to prevent evaporation of the resin; and a build platform configured to support an object that is being formed from layers of the resin, wherein a first blade configured to provide the layers of the resin to form the object on the build platform.

A fifty-seventh implementation may further extend the fifty-sixth implementation. In the fifty-seventh implementation, the partial enclosure comprises: a carrier film; the first blade disposed above the carrier film; a closing gate disposed above the carrier film; and side walls disposed between the first blade and closing gate above the carrier film.

A fifty-eighth implementation may further extend the fifty-sixth or fifty-seventh implementations. In the fifty-eighth implementation, the chiller-condenser comprises a coiled tube open to inert gas or air.

A fifty-ninth implementation may further extend any of the fifty-sixth through fifty-eighth implementations. In the fifty-ninth implementation, the partial enclosure is at least partially covered by a covering structure, and wherein the chiller-condenser is coupled to the covering structure.

A sixtieth implementation may further extend any of the fifty-sixth through fifty-ninth implementations. In the sixtieth implementation, the partial enclosure is at least partially covered by a covering structure, and wherein the covering structure comprises a resin refill port.

BRIEF DESCRIPTION OF THE DRAWINGS

The present invention is illustrated by way of example, and not by way of limitation, in the figures of the accompanying drawings.

DETAILED DESCRIPTION

Figure 1A:
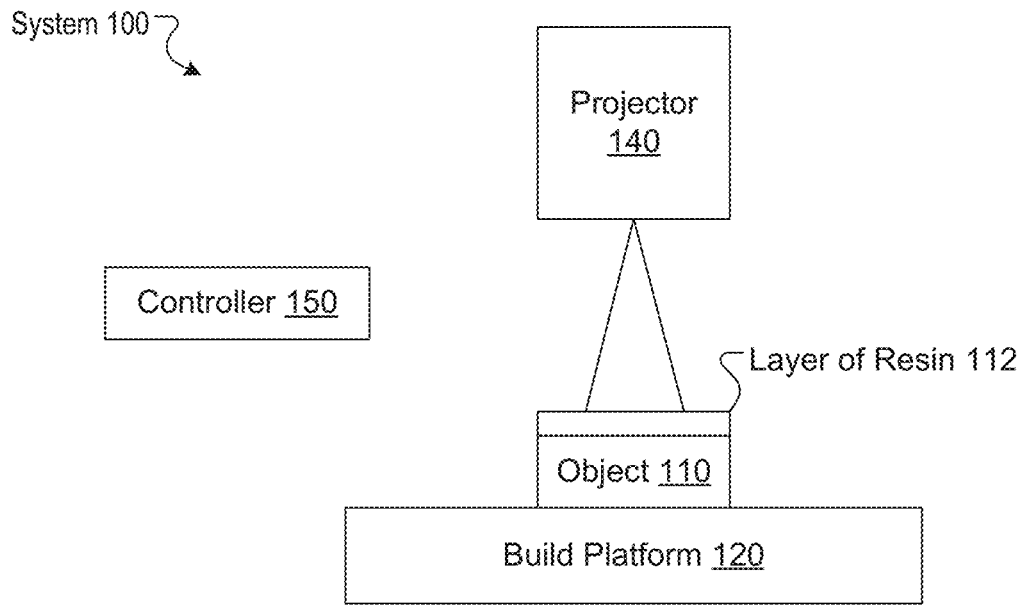
FIGS. 1A-B illustrate systems for forming objects, according to certain embodiments.

Described herein are embodiments of recoating systems. In some embodiments, the recoating system is a recoating apparatus for continuous vat photopolymerization systems. In some embodiments, the recoating system is a recoating apparatus for high-viscosity photopolymers. In some embodiments, the recoating system is a heated printer with reduced vaporization of resin components.

Three-dimensional (3D) printing systems are used to form a 3D object layer by layer. An example of a 3D printing system is a recoating system. A recoating system uses a blade (e.g., doctor blade, Zephyr blade, recoating blade) to form a layer of resin. A recoating system shines light (e.g., patterned ultraviolet (UV) light) on the layer of resin (e.g., that is sandwiched between a moving carrier film and a build platform) to add a portion of the layer of resin to an object that is being formed.

An object formed using the recoating system may be a dental appliance or a mold usable to create a dental appliance (e.g., a mold over which an aligner may be thermoformed). A dental appliance may include incremental palatal expanders, orthodontic aligners (e.g., dental appliances with or without mandibular advancement structures and/or other structures), sleep apnea treatment devices, dental attachment templates, attachment formation templates (e.g., appliances used to place attachments that engage with attachment wells and/or other structures in aligners to exert repositioning forces on a patient's dentition) that include regions that comprise pre-fabricated (e.g., 3D printed) attachments, and/or other dental appliances.

Printing defects (e.g., layer delamination, incomplete curing, cured layers, etc.) result in printed features that cause layers of resin that are not uniform. For example, printed features printed by a recoating system may adhere to the carrier film of the recoating system and during forming of a layer of resin, the printed features adhered to the carrier film introduce streaks in the layer of resin on the carrier film. The streaks do not contain resin or have lower resin thickness and may cause print failure for some or all subsequent layers. The print failures result in decreased yield, increased time consumption, increased energy consumption, increased waste, and increased material consumption. Conventionally, the resin is filtered from print to print. The filtering may result in wasted time and energy and decreased yield. Additionally, filtering may not be performed often enough, resulting in print failures. Filtering may alternatively be performed too often, resulting in wasted time and energy.

Filtering may also be performed reactive to identifying a print failure, which is wasteful in materials.

Resin used in recoating systems generally has high viscosity (e.g., greater than 5 Pascal-second (Pa-s), about 5 to about 25 Pa-s at room temperature, etc.). Conventionally, recoat speeds are lowered significantly (e.g., compared to the present disclosure of about 10 about 30 millimeters per second (mm/s)) and drag forces induced during recoating of viscous resin on printed parts limits printable feature size. This results in wasted time and low yield. This also results in limited types of objects that can be formed by recoating systems. Conventionally systems cannot produce a coat of resin that meets a threshold thickness (e.g., thin coating of resin). Conventional thick resin coating (e.g., such as twice the layer thickness of the thicknesses achieved by the present disclosure) induces motion in the cured part during printing of large surface area parts. This results in poor surface finish, poor accuracy, and poor adhesion to build platforms in conventional systems. Reducing the coat height from 800 microns to 325 microns leads to the present disclosure consuming less material for the print (e.g., from 1.85 liters (L) for 800 micron coat height to 1.3 L for 325 micron coat height) which results in savings on material consumption and cost.

Recoating systems may use high temperatures to heat the resin (e.g., reactive diluent). At high temperatures, evaporation (e.g., of resin, of reactive diluent, etc.) occurs during forming of objects. Conventionally, expensive and time consuming trial and error may be used to attempt to control the atmosphere and to make engineering changes to the recoating system to attempt to decrease evaporation. Evaporation (e.g., of the resin, of the reactive diluent, etc.) is wasteful of material, causes changes to the resin, and may cause print failure or production of objects that do not meet specification.

Embodiments of the devices, systems, components, and methods described herein address at least some of the above described deficiencies of conventional systems.

In some embodiments, a system includes a carrier film that is moved by rollers in a loop trajectory (e.g., the carrier film forms a loop that rotates around a set of rollers). The loop trajectory may include an upper substantially horizontal trajectory, a first side trajectory (e.g., that is substantially vertical), a lower substantially horizontal trajectory, and a second side trajectory (e.g., that is substantially vertical).

A first blade (e.g., doctor blade, recoating blade, etc.) is disposed above the carrier film (e.g., above the upper substantially horizontal trajectory). The first blade forms a layer of resin on an outer surface of the carrier film. A build platform is disposed under the carrier film (e.g., under the lower substantially horizontal trajectory). The carrier film moves the layer of resin from the first blade to the build platform. A projector (e.g., UV light) cures a portion of the layer of resin on the object on the build platform.

A second blade is disposed above the carrier film (e.g., above the upper substantially horizontal trajectory) between the build platform and the first blade. The second blade is configured to prevent printed features from contacting the first blade. Any printed features (e.g., a delaminated layer, an incompletely cured feature or layer, a cured feature or layer, etc.) being carried by the carrier film from the build platform are to be stopped by the second blade to allow the first blade to form a layer of resin of uniform thickness. The second blade may direct the printed features into a capture basin. The second blade may form one or more openings to allow resin to flow through the second blade. The second blade decreases print failure of the system compared to conventional systems.

In some embodiments, a system includes a build platform configured to support an object that is being formed from layers of resin. The system further includes one or more blades to provide the layers of resin to form the object on the build platform. A first blade is configured to vibrate to reduce viscosity of the layers of resin. The lower resin viscosity allows the system to move more rapidly and to form smaller features on the object than conventional systems. In some embodiments, the vibration is used until a thin layer of resin is coated on the carrier film. There may be zero relative velocity between the part and the resin (e.g., no drag forces or drag-induced size limitation).

In some embodiments, a system includes a partial enclosure configured to hold resin and one or more structures configured to at least partially cover the resin to prevent evaporation of the resin. A build platform is configured to support an object that is being formed from layers of resin and a first blade is configured to provide the layers of resin to form the object on the build platform. The partial enclosure may be a vat and the build platform and resin may be disposed in the vat. The partial enclosure may include a carrier film, the first blade, a closing gate, and side walls that hold accumulated resin. The one or more structures may include balls, a lid, a membrane, etc. In some embodiments, a liquid (e.g., silicon oil) covers the resin to prevent evaporation of the resin.

Aspects of the present disclosure result in technological advantages of significant reduction in wasted material, significant increase in throughput, and significant improvement in quality as compared to traditional recoating systems. By using a second blade to prevent printed features from reaching the first blade, the layer of resin is more uniform compared to conventional systems. This also avoids frequent filtering of the resin of conventional systems. By using a vibrating blade, the system can form objects quicker and with smaller features compared to conventional systems. By using one or more structures to cover the resin, less resin is wasted and material properties of the resin are better maintained compared to conventional solutions.

The present disclosure discusses different features, such as a second blade to prevent printed features from reaching the first blade, a vibrating blade, and at least partially covering the resin. The present disclosure also discusses different systems, such as carrier film systems, vat systems, systems where the projector is directed down towards the build platform, systems where the projector is directed up towards the build platform, etc. One or more of the features (e.g., any combination of features) disclosed herein can be used in one or more of the systems described herein.

Although some embodiments of the present disclosure describe using a system to form a dental appliance, in other embodiments, other types of objects may be formed and other processes may be performed by the systems of the present disclosure. For example, the present disclosure can be applied to screen printing technology, dyeing (e.g., textile dyeing), polishing, coating, etc.

Figure 1B:
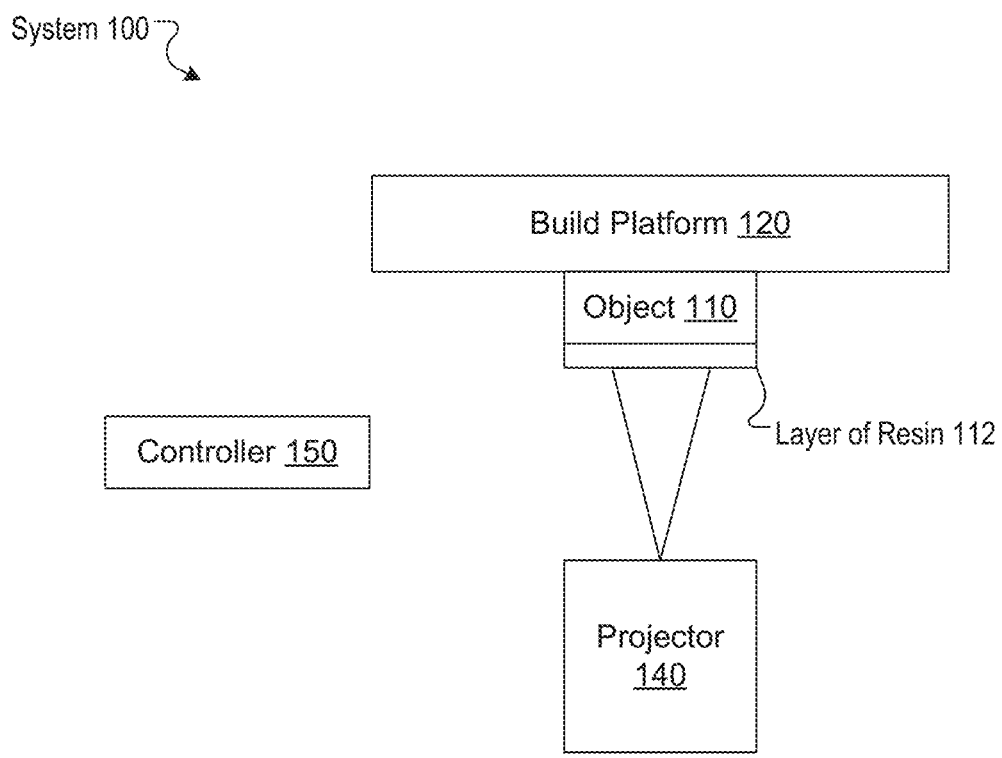

FIGS. 1A-B illustrate systems 100 (e.g., recoating systems, 3D printing systems, additive manufacturing systems, dental appliance manufacturing systems, etc.) for forming objects 110 (e.g., dental appliances, 3D parts), according to certain embodiments.

The system 100 includes a build platform 120 (e.g., build tray) that has a substantially horizontal surface on which an object 110 is to be formed. The object 110 formed using the system 100 may be a dental appliance or a mold usable to create a dental appliance (e.g., a mold over which an aligner may be thermoformed). The dental appliance may be an incremental palatal expander, an orthodontic aligner (e.g., dental appliances with or without mandibular advancement structures and/or other structures), a sleep apnea treatment device, a dental attachment template, an attachment formation template (e.g., appliances used to place attachments that engage with attachment wells and/or other structures in aligners to exert repositioning forces on a patient's dentition) that includes regions that comprise pre-fabricated (e.g., 3D printed) attachments, and/or some other dental appliance. The system further includes a projector 130 (e.g., lighting device, UV light device, etc.) that provides patterned light (e.g., UV light) to cure a portion of a layer of resin 112. In some embodiments, a layer of resin has a thickness (e.g., height) of about 200 to about 300 micrometers.

Figure 6:
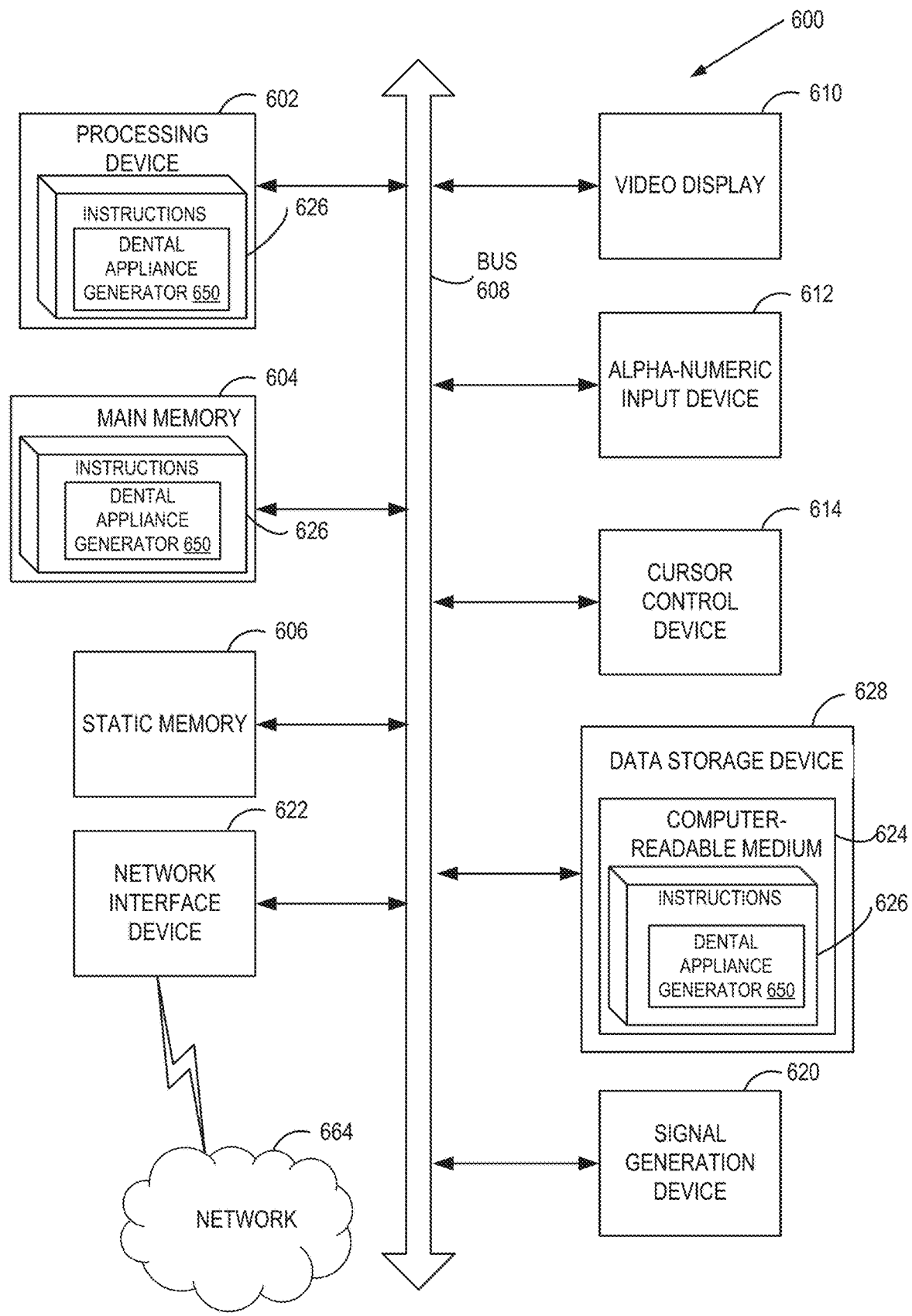
FIG. 6 illustrates a block diagram of an example computing device, according to certain embodiments.

A controller 150 (e.g., processing device, processing logic, computer device 600 of FIG. 6) controls the forming of object 110. The controller 150 may receive a digital model of the object 110 and determine patterns of layers of resin 112 that are to be cured to form the object 110. The controller 150 may determine patterns of light to be provided by the projector 140 (e.g., mobile projection unit) to form the patterns of layers of resin 112 and may cause (e.g., provide instructions to) the projector 140 to provide the patterns of light (e.g., UV projection). The controller 150 may determine the height of the build platform 120 to form the patterns of layers of resin 112 and may cause (e.g., provide instructions to a lifting device) the height of the build platform 120 to be adjusted. The controller 150 may determine configurations (e.g., vibration, height, angle, etc.) of a blade (e.g., recoating blade, doctor blade, Zephyr blade) to form the layers of resin 112 and may cause the blade to be configured.

The object 110 is made from layers of resin 112. A first layer of resin 112 may be formed by a blade. The first layer of resin 112 may be formed on the build platform 120 or may be brought in contact with the build platform 120 (e.g., via a carrier film). The projector 140 (e.g., lighting device, UV light device) provides patterned light (e.g., UV light) onto the layer of resin 112 to cure a portion of the layer of resin 112 to the build platform 120. The height of the build platform may be adjusted and a second layer of resin 112 may be formed by a blade. The second layer of resin 112 may be formed on the object 110 (e.g., on the first layer of resin 112) or may be brought in contact with the object 110 (e.g., the first layer of resin 112). The projector 140 provides patterned light to cure a portion of the second layer of resin 112 on the first layer of resin 112. This continues until all of the layers of resin 112 are cured to form the object 110.

In some embodiments, as illustrated in FIG. 1A, the projector 140 is disposed above the build platform 120 and shines down onto layer of resin 112. In some embodiments, as illustrated in FIG. 1B, the projector 140 is disposed below the build platform 120 and shines up onto layer of resin 112.

In some embodiments, a blade provides a layer of resin 112 onto a carrier film and the carrier film provides the layer of resin 112 onto the build platform 120 or object 110 (see FIGS. 2A-E). In some embodiments, a blade provides the layer of resin 112 onto the build platform 120 or object 110 (see FIGS. 3A-B).

Figure 2A:
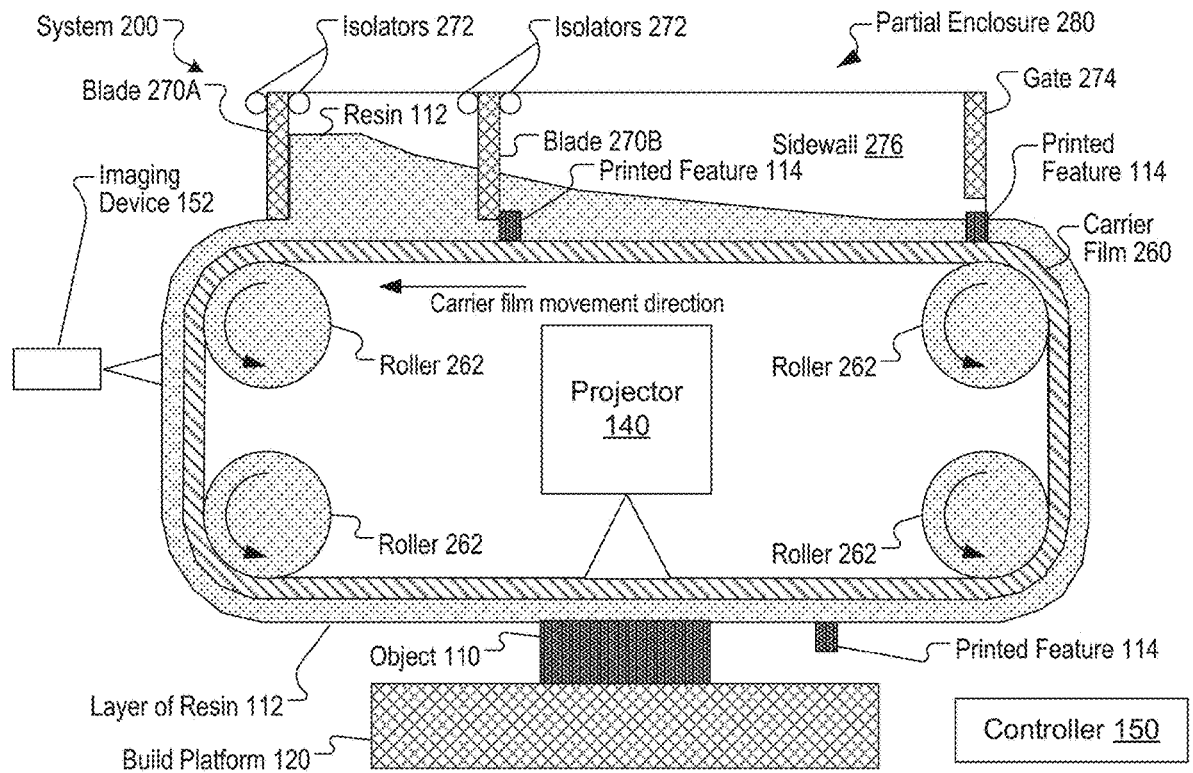
FIGS. 2A-E illustrate systems for forming objects using a carrier film, according to certain embodiments.
Figure 2B:
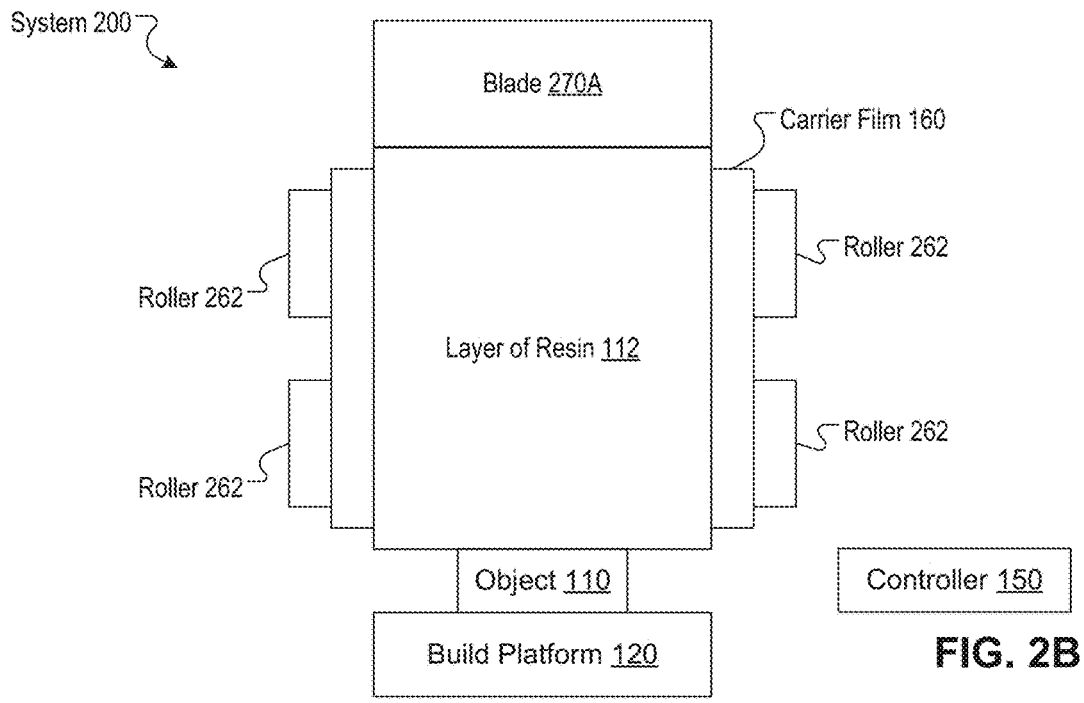
Figure 2C:
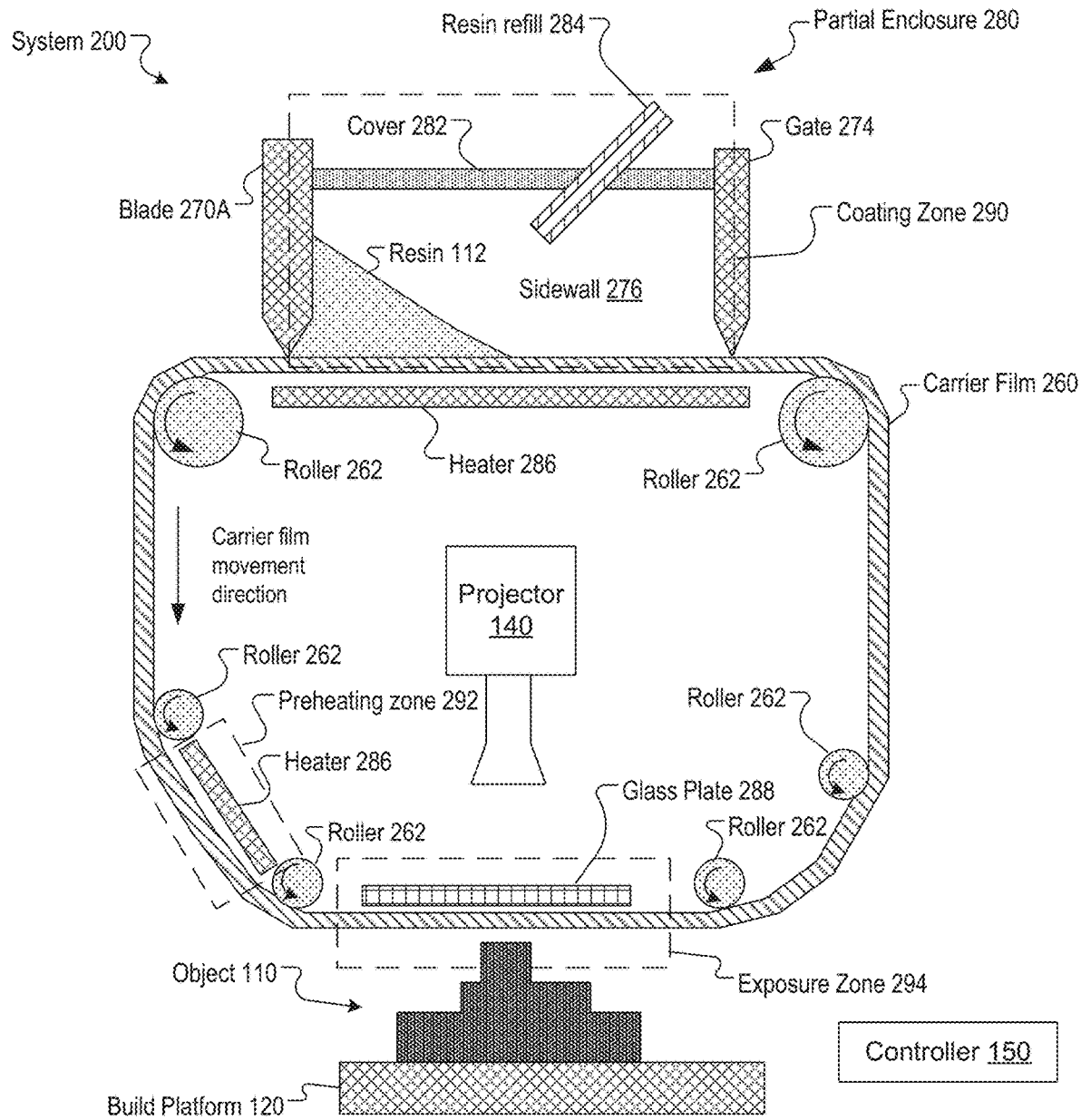
Figure 2D:
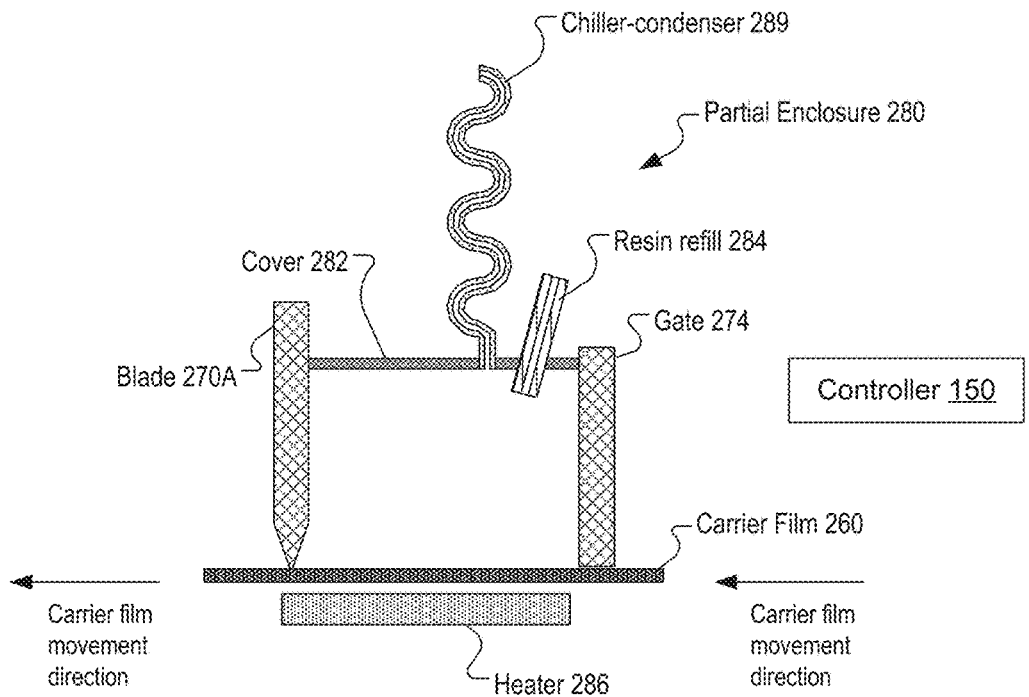
Figure 2E:
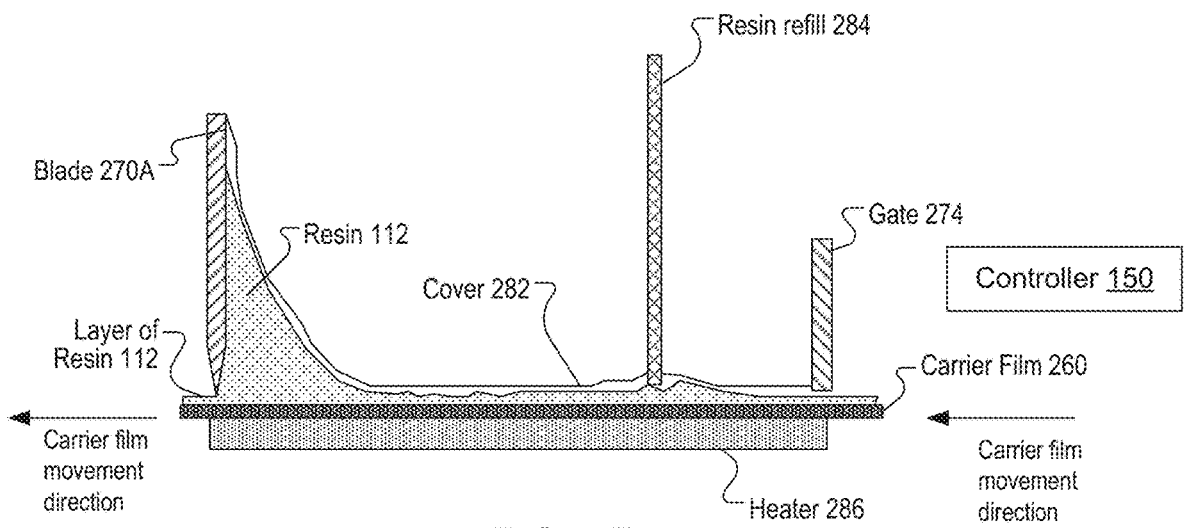

FIGS. 2A-E illustrate systems 200 (e.g., systems 100) for forming objects 110 using a carrier film 260, according to certain embodiments. FIG. 2A is a side cross-sectional view and FIG. 2B is a front view, according to certain embodiments. System 200 may be referred to as a recoating apparatus. In some embodiments, FIGS. 2A-B are different views of the same system 200. FIGS. 2C-E are side cross-sectional views of systems 200, according to certain embodiments. FIGS. 2C-E may be different embodiments of system 200. Features with similar reference numbers as those in other FIGS. may have the same or similar functionality, properties, and/or structure.

A system 200 may include a carrier film 260 that includes an outer surface and an inner surface. The inner surface is configured to contact rollers 262 (e.g., carrier film forms a loop around the rollers 262). The rollers 262 rotate and cause the carrier film 260 to move in a loop trajectory around the rollers 262. The loop trajectory may include an upper substantially horizontal trajectory, a first side trajectory (e.g., that is substantially vertical), a lower substantially horizontal trajectory, and a second side trajectory (e.g., that is substantially vertical). The first side trajectory may be disposed between a first distal end of the upper substantially horizontal trajectory and a first distal end of the lower substantially horizontal trajectory. The second side trajectory may be disposed between a second distal end of the upper substantially horizontal trajectory and a second distal end of the lower substantially horizontal trajectory.

One or more blades 270 are disposed above the carrier film 260 (e.g., above the outer surface of the upper substantially horizontal trajectory of the carrier film 260) and may be configured to form a layer of resin 112 (e.g., that has a substantially uniform thickness) on the outer surface of the carrier film 260. Blade 270A (e.g., doctor blade, Zephyr blade, recoater blade) may form the layer of resin 112 and blade 270B may prevent printed features 114 from contacting the blade 270A. The rollers 262 rotate to move the carrier film 260 in a loop trajectory. The layer of resin 112 remains secured to the carrier film 260 as the carrier film 260 moves in the loop trajectory.

A build platform 120 is disposed below the carrier film 260 (e.g., below the outer surface of the lower substantially horizontal trajectory of the carrier film 260). The carrier film 260 moves the layer of resin 112 from the blade 270A to be above the build platform 120 (e.g., contacting the build platform 120, contacting an object 110 being formed on the build platform 120). The carrier film 260 may be substantially transparent. The carrier film 260 may be disposed between a projector 140 (e.g., light engine) and the build platform 120. The projector 140 may provide patterned light (e.g., UV light) through the carrier film 260 and onto a portion of the layer of resin 112 to cure the portion of the layer of resin 112. The portion of the layer of resin 112 may be cured (e.g., formed, added) onto the build platform 120 or onto the object 110 that is being formed onto the build platform 120. The carrier film 260 moves the remaining amount of the layer of resin 112 from above the build platform 120 to the upper substantially horizontal trajectory of the carrier film 260. Resin 112 accumulates behind the blade 270A. The remaining amount of the layer of resin 112 is moved from above the build platform 120 to become part of the resin 112 that is accumulated behind blade 270A.

As the object 110 is being formed on the build platform 120, printing defects may occur. Printing defects may include one or more of layer delamination, incomplete curing, cured layers, etc. that result in printed features 114. For example, a portion of the layer of resin 112 may be cured or partially cured by the projector 140 and may not secure to the object 110 or build platform 120 and may become a printed feature 114 that is moved by the carrier film 250 (e.g., moves with the layer of resin 112) from the lower substantially horizontal trajectory of the carrier film 260, to the side trajectory of the carrier film 26 and to the upper substantially horizontal trajectory of the carrier film 260.

Conventionally, printed features 114 are stopped by the blade 270A that forms the layer of resin 112 and cause non-uniformity of thickness (e.g., streaks) in the layer of resin 112. The non-uniformity in thickness of the layer of resin 112 can cause defects in the object 110 being formed on the build platform 120.

In some embodiments, objects (e.g., parts) are manufactured by shining patterned UV light on a layer of resin 112 that is sandwiched between a moving carrier film 260 and a build platform 120. Printing defects (e.g., layer delamination and incomplete curing) result in the adhesion of printed features 114 to the carrier film 260. During recoating (e.g., forming of layer of resin 112 by blade 270A), printed features 114 adhered to the carrier film 260 introduce streaks on the film surface of the carrier film 260. The streaks may not contain resin 112 or may have lower thickness of resin 112 and may cause print failure for one or more subsequent layers (e.g., of resin 112, of object 110). In some embodiments, the present disclosure prevents the formation of such streaks on the carrier film 260 and prevents propagation of print failure to subsequent layers (e.g., of object 110), thus increasing probability of print success and manufacturing throughput. The system 200 may use recoating, digital light processing (DLP), moving light, photopolymerization, stereolithography (SLA), recoating blade, shear thinning, high viscosity resin, photopolymer, and/or vat photopolymerization. System 200 may eliminate or minimize subsequent print failures in the printing direction (e.g., x-direction) caused by a single defect (e.g., printed feature 114). System 200 may reduce or minimize filtering resin from print to print (e.g., between printing different objects 110).

In some embodiments, system 200 includes two or more blades 270. Blade 270A is configured to form the layer of resin 112 (e.g., is the last blade 270 on the upper substantially horizontal trajectory of the carrier film 260). Blade 270B is disposed before the blade 270A to prevent printed features 114 from contacting blade 270A. A distal end of blade 270B may be disposed at substantially the same distance from the carrier film 260 or closer to the carrier film 260 compared to the distal end of blade 270A. This allows the blade 270B to capture printed features 114 of any size that would have been caught by blade 270A. Accumulated resin 112 between blade 270B and blade 270A fill in any streaks or non-uniformity caused by the printed features 114 captured by blade 270B so that blade 270A can form a substantially uniform layer of resin 112.

In some embodiments, system 200 includes one or more components that cause one or more of the blades 270 to vibrate to reduce viscosity of the layer of resin 112. The components may include one or more of a piezoelectric element, an ultrasonic element, a mechanical element (e.g., motor), etc. that is coupled to a blade 270 to induce one or more frequencies of vibration on the blade 270. The blade 270 may be configured to agitate the resin 112 (e.g., one or more layers of resin 112). The frequency of vibration of the blade 270 may be selected based on the material type of the resin 112. The layers of resin 112 may be formed from resin that has a viscosity of greater than 5 Pascal-second (Pa-s).

The vibrating blade 270 (e.g., vibrating recoating blade) may induce high shear in the region of contact with the resin 112. Shear stress may be a function of viscosity (e.g., the ranges of shear may be different for different classes of materials). Resin 112 undergoes shear when one area of the resin 112 travels with a different velocity relative to an adjacent area of the resin 112. High shear may be created by tip velocity of the vibrating blade 270 being higher than a velocity of a portion of the vibrating blade 270 that is further away from the tip. The velocity of the resin 112 at the tip of the vibrating blade 270 may be greater than the velocity of the resin 112 at other portions of the vibrating blade 270. The resin 112 (e.g., a shear thinning resin) may exhibit a reduction in viscosity due to the induced local shear and form a low-viscosity boundary layer. The low-viscosity boundary layer may shield printed parts from damage during recoating (e.g., causing a portion of a layer of resin 112 to be cured on the build platform 120 or object 110). In conventional systems, blades may not do a good job of recoating viscous resins, which causes recoat speed is to be lowered significantly and printed part dimensions are to be large (e.g., greater than 300 microns when the storage modulus is greater than about $10^5$ Pa) to survive recoating. In some embodiments, coating gap and coating speed may be two parameters that are dependent on other factors (e.g., viscosity, temperature, and/or the like). For example, at a viscosity of 2 Pa-S at 55° C., a gap height of about 250 microns and a recoating speed of about 25 mm/s may be used. If the temperature is lowered, the coat height may be increased and the speed may be decreased. The vibrating blade 270 may allow the system 200 to recoat at high speeds and fabricate parts with high feature resolution (e.g., enabling higher manufacturing speeds, about 150 micron support strut size (e.g., about 8 mm tall) with about 200 micron feature size at the interface of the strut and orthodontic appliance) compared to conventional systems. The blades 270 and/or the surface of the resin 112 move (e.g., traverse) relative to each other and induce drag force on printed parts. The drag forces can damage high resolution and/or high aspect ratio features when the resin viscosity is high (e.g., greater than about 3 Pa-s, greater than about 5 Pa-s). Shear-thinning resins (e.g., resins containing filler materials) exhibit reduction in viscosity with increase in applied shear rate. In some embodiments, the present disclosure introduces vibration into the blade 270 using mechanical, ultrasonic, or piezoelectric coupling. The resin 112 in contact with the vibrating blade 270 experiences increase in shear rate, causing localized reduction in viscosity, which when combined with linear translation, a low-viscosity boundary layer (e.g., boundary layer with less than 5 Pa-s) can be created on the surface of the resin 112. The low viscosity layer allows the resin 112 to be recoated without causing damage to the object 110 (e.g., printed parts) or compromising the printing speed. The resin 122 may be a shear-thinning resin that exhibits low viscosity at higher shear rates (e.g., typical resin with filler material). The vibrating of the resin may lower the viscosity locally using the blade 270. In some embodiments, vibration may be induced by one or more components immersed in resin 112. The blade 270 may generate a no-slip region (e.g., shear-induced drop in viscosity) for the layer of resin 112 to form the object 110. The location of the blade 270 may be adjusted so that the low-viscosity region and the layer of resin 112 are in the same region. The object 110 is not damaged during recoating due to low-viscosity induced vibrations.

Vibration of blade 270 may be used in vat photopolymerization systems (e.g., see FIGS. 3A-B), SLA, mask stereolithography (M-SLA), DLP, bottom-up and top-down SLA systems, vibration of the top surface using sonic vibrations and/or standing waves, inducing vibration and/or shear by blowing air and/or creating vacuum at certain frequencies above/inside the resin 112, in polishing, in screen printing, in dyeing, and/or in coating appliances.

In some embodiments, system 200 includes one or more isolators 272 coupled to one or more of the blades 270. The isolators 272 may be vibration isolators to control frequency modulated vibrations of the blade 270.

In some embodiments, blade 270 has a first distal end disposed proximate the carrier film 260 and a second distal end opposite the first distal end. The first distal end may vibrate (e.g., move) while the second distal end is substantially stationary. The blade 270 may pivot about a point at the second distal end of the blade 270. In some embodiments, the blade 270 may vibrate by moving in one or more of the x-direction, y-direction, or z-direction. The x-direction may be to the left and right (e.g., in direction of movement of the carrier film 260 around the rollers 262 and against the direction of the movement of the carrier film 260). The y-direction may be into the page and out of the page (e.g., perpendicular to the movement of the carrier film 260 while the blade 270 maintains the same distance from the carrier film 260). The z-direction may be up and down to increase and decrease the distance between the carrier film 260 and the blade 270. Blade 270A may pivot, move in the x-direction, and/or move in the y-direction. Blade 270B may pivot, move in the x-direction, move in the y-direction, and/or move in the z-direction.

In some embodiments, system 200 includes a gate 274 (e.g., closing gate) and sidewalls 276. While the rollers 262 are moving, the gate 274 may be disposed at a greater distance from the carrier film 260 than the blade 270B so that printed features 114 can flow under the gate 274 and be captured by the blade 270B.

A partial enclosure 280 (e.g., recoating chamber) may be formed by the carrier film 260, blade 270A, gate 274, and sidewalls 276. The carrier film 260 may form the bottom of the partial enclosure 280. Blade 270A and gate 274 may form a first set of opposite sides of the partial enclosure 280. Sidewalls 276 may form a second set of opposite sides of the partial enclosure 280. Distal ends of sidewalls 276 may be disposed proximate the carrier film 260 to prevent resin 112 from flowing over the sides of the carrier film 260. Blade 270A and gate 274 may be offset from the carrier film 260 to allow a layer of resin 112 to be formed on the carrier film 260 by the blade 270A and for the layer of resin 112 (e.g., leftover from forming a layer of object 110) to flow under the gate 274 while the rollers 262 are moving carrier film 260. Blade 270A and/or gate 274 may be adjustable to change the offset from the carrier film 260. For example, responsive to the rollers 262 not moving the carrier film 260, the gate 274 may be lowered to be proximate the carrier film 260 (e.g., to be disposed on the carrier film 260) to prevent the accumulated resin 112 from flowing past the gate 274 off of the upper substantially horizontal trajectory of the carrier film 260. In some embodiments, the blade 270A may also be lowered to be proximate the carrier film 260 responsive to the rollers 262 not moving to prevent the accumulated resin from flowing off of the upper substantially horizontal trajectory of the carrier film 260 when the carrier film 260 is not moving.

In some embodiments, the accumulated resin 112 between the blade 270A, gate 274, and sidewalls 276 may be at least partially covered (e.g., by one or more structures) to prevent evaporation of the resin 112. The accumulated resin 112 may be covered by one or more of hollow balls, plastic balls, metal balls, a lid (e.g., sealed lid), a membrane, silicon oil, structures floating in the resin 112 (e.g., upper surfaces of the one or more structures are to be above the resin responsive to the one or more structures floating in the resin), etc.

A controller 150 may control rotation of the rollers 262, vibration of one or more of the blades 270, distance of gate 274 and/or blade 270A from the carrier film 260, height of the build platform 120 (e.g., lower the build platform 120 as layers are added to object 110), pattern of light provided by projector 140, and or the like.

In some embodiments, system 200 includes an imaging device 152. The imaging device 152 may be directed towards the carrier film 260. In some embodiments, the imaging device 152 provides image data of a portion of the carrier film 260 between the blade 270A and the object 110. The controller 150 may receive the image data from the imaging device 152. The controller 150 may determine, based on the image data, whether the uniformity of the film of resin 112 meets a threshold uniformity (e.g., does not have streaks, etc.).

In some embodiments, a machine learning model may be trained based on training input of historical image data and target output of historical performance data. The historical image data may be associated with the film of resin 112 and the historical performance data may be an indication of whether the uniformity of the film of resin 112 meets a threshold uniformity (e.g., does not have streaks). After being trained, the trained machine learning model may receive input of current image data and may output predictive data. The predictive data may be predictive performance data, such as a prediction of whether the uniformity of the film of resin 112 meets a threshold uniformity (e.g., does not have streaks). Current performance data for the current image data may be received (e.g., via user input) and the trained machine learning model may be further trained or retrained based on the current image data and the current performance data.

Responsive to determining that uniformity of the film of resin 112 does not meet a threshold uniformity, the controller 150 may cause blade 270B to be moved closer to the carrier film 260 to direct printed features 114 to a capture basin. In some embodiments, controller 150 stops formation of object 110 (e.g., stops projector 140, moves build platform 120 away from carrier film 260, etc.) until the uniformity of the layer of resin 112 meets a threshold uniformity. In some examples, controller 150 causes one or more of blade 270A to be moved to be further away from the carrier film 260, blade 270B to be closer to the carrier film 260, build platform 120 to be moved further away from the carrier film 260, and/or the rollers 262 to move the carrier film 260 (e.g., cause print features 114 from any location on the carrier film 260 to be moved to blade 270B which directs the printed features 114 to a capture basin) until the controller 150 determines, based on the image data, that uniformity of the layer of resin 112 meets a threshold uniformity. Responsive to determining the uniformity of the layer of resin 112 meets a threshold uniformity, controller 150 may cause blade 270A to be moved to the previous position (e.g., re-positioned to be closer to the carrier film 260), blade 270B to be moved to the previous position (e.g., re-positioned to be further from the carrier film 260), and/or build platform 120 to be moved to the previous position to form object 110.

Referring to FIG. 2C, system 200 may include one or more of a coating zone 290, a preheating zone 292, and an exposure zone 294.

The coating zone 290 may include a partial enclosure 280 formed by carrier film 260, blade 270A, gate 274, and sidewalls 276. The partial enclosure 280 may further include a cover 282 coupled (e.g., secured, attached, sealed, hermetically sealed, etc.) to the blade 270A, gate 274, and/or sidewalls 276 (e.g., to provide a sealed environment or a substantially sealed environment). A resin refill 284 may pass through the cover 282 to provide resin 112 into the partial enclosure 280. The resin refill 284 may be located anywhere before blade 270A. The resin refill 284 may be located at or after the gate 274 (e.g., between blade 270A and gate 274).

The resin 112 may be a reactive diluent that is used in additive manufacturing and/or 3D printing at high temperatures. Conventionally, high temperature 3D printing has the problem of reactive diluent evaporation (e.g., evaporation of resin 112) during printing. Controlling the atmosphere and making engineering changes to the instrument and/or printer can be complicated and expensive. In some embodiments, the present disclosure has a cover 282 (e.g., plastic or metal hollow balls of any size) to prevent evaporation of reactive diluent (e.g., resin 112) from the partial enclosure 280 (e.g., vat).

The majority of the resin 112 may be in the coating zone 290 and conventionally, most of the evaporation of resin 112 is in the coating zone 290. By including a cover 282 for the coating zone 290 (e.g., sealing the coating zone 290), evaporation is reduced or eliminated. The coating zone 290 may be one of the heated zones and where evaporation is conventionally expected. It may be easier to control the coating zone instead of the entire print chamber (e.g., cover coating zone 290 instead of all of system 200). Evaporation of solvents or small molecules reduces the service life of electrical parts, light engines, bearings, etc. Once the layer of resin 112 is transported on the carrier film 260 out of the coating zone 290, the layer of resin 112 is not heated anymore and less or no evaporation occurs. The layer of resin 112 may be heated again in the preheating zone 292 before being exposed in the exposure zone 294. In the preheating zone 292 and/or exposure zone 294, the carrier film 260 is above the layer of resin 112 so that low or no evaporation is to occur.

In some embodiments, the cover 282 is a membrane, metal plate, or other diffusion resistant material that is attached to the gate 274 and spans across the surface of the resin 112 to where it may attach to an upper distal end of the blade 270A. The cover 282 (e.g., membrane or other covering structure) can be flexible or rigid and covers the heated resin 112. By covering the resin and leaving no air space, the volatile components of a resin cannot go into a vapor state, thus preventing loss of monomer (e.g., resin 112). The cover 282 (e.g., membrane) can be attached to the edges (e.g., sidewalls 276) to form a better seal against loss. The cover 282 (e.g., membrane) can be heated to reduce the drag forces the cover 282 would feel from the resin 112 flowing underneath. A heating source (e.g., infrared (IR) IR heating source) may be disposed above the cover 282 to heat the cover 282. The cover 282 (e.g., membrane) can contain protrusions from the surface of the cover 282 that extend into the resin 112 and that may aid in mixing the incoming resin by providing shear forces. The cover 282 may be constructed to be easily removed for cleaning, etc.

In some embodiments, a heater 286 (e.g., heating plate) may heat the resin 112 in the coating zone 290 to reduce viscosity of the resin 112. In some embodiments, a blade 270 contacting resin 112 in the coating zone 290 may vibrate to reduce viscosity of the resin 112. Resin 112 with reduced viscosity may be moved faster (e.g., rollers 262 may move carrier film 260 and layer of resin 112 faster) and may be used to make smaller features on object 110 compared to resin 112 of higher viscosity.

The preheating zone 292 may include a heater 286 (e.g., heating plate) to heat the layer of resin 112 on the carrier film 260 to reduce the viscosity of the resin 112 prior to reaching the exposure zone 294.

The exposure zone 294 may include a glass plate 288 through which the projector 140 provides patterned light. The glass plate 288 may maintain the carrier film 260 and layer of resin 112 in position to form object 110 on build platform 120.

Referring to FIG. 2D, the partial enclosure 280 may include carrier film 260, blade 270A, gate 274, and resin refill 284, and cover 282. A heater 286 may heat resin 212 disposed in the partial enclosure 280 to lower the viscosity of the resin 212 to be able to move the carrier film 260 quicker and to form objects 110 with smaller features. The partial enclosure 280 may include a chiller-condenser 289. The chiller-condenser 289 may include a pipe that is in the shape of a coil. A first distal end of the pipe may interface with an opening formed by cover 282 to be able to receive gas from the partial enclosure. The second distal end of the pipe may be open to gas (e.g., inert gas, nitrogen, air, etc.). The chiller-condenser 289 may cool gas in the partial enclosure 280 to reduce evaporation of the resin 212. The heater 286 may increase temperature of the resin 212 proximate the carrier film 260 to decrease viscosity of the layer of resin 112 and the chiller-condenser 289 may prevent evaporation of the heated resin 212 to maintain material properties of the resin 212 and to prevent loss of the resin 212. By using the heater 286 and the chiller-condenser 289, the resin 212 may be at an increased temperature and the carrier film 260 may be moved at an increased speed.

Referring to FIG. 2E, in some embodiments, the cover 282 is proximate the upper surface of the resin 212 between the blade 270A and the gate 274. In some embodiments, the cover 282 is a membrane. In some embodiments, the cover 282 is a silicon oil. In some embodiments, the cover 282 is a structure. In some embodiments, an IR heating source is disposed above the cover 282 to heat the cover 282 and/or the resin 212. The resin refill 284 (e.g., resin input) may be located anywhere before the blade 270A. The resin refill 284 may be at or after the gate 274 (e.g., between gate 274 and blade 270A). Before and after may be in reference to the belt direction.

Figure 3A:
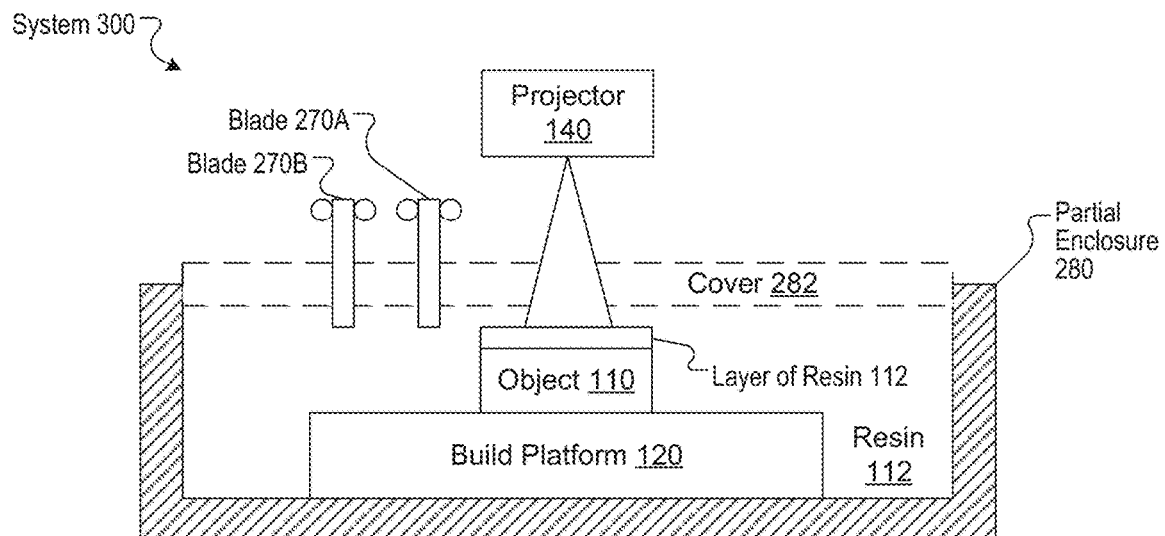
FIGS. 3A-B illustrate systems for forming objects using a partial enclosure, according to certain embodiments.
Figure 3B:
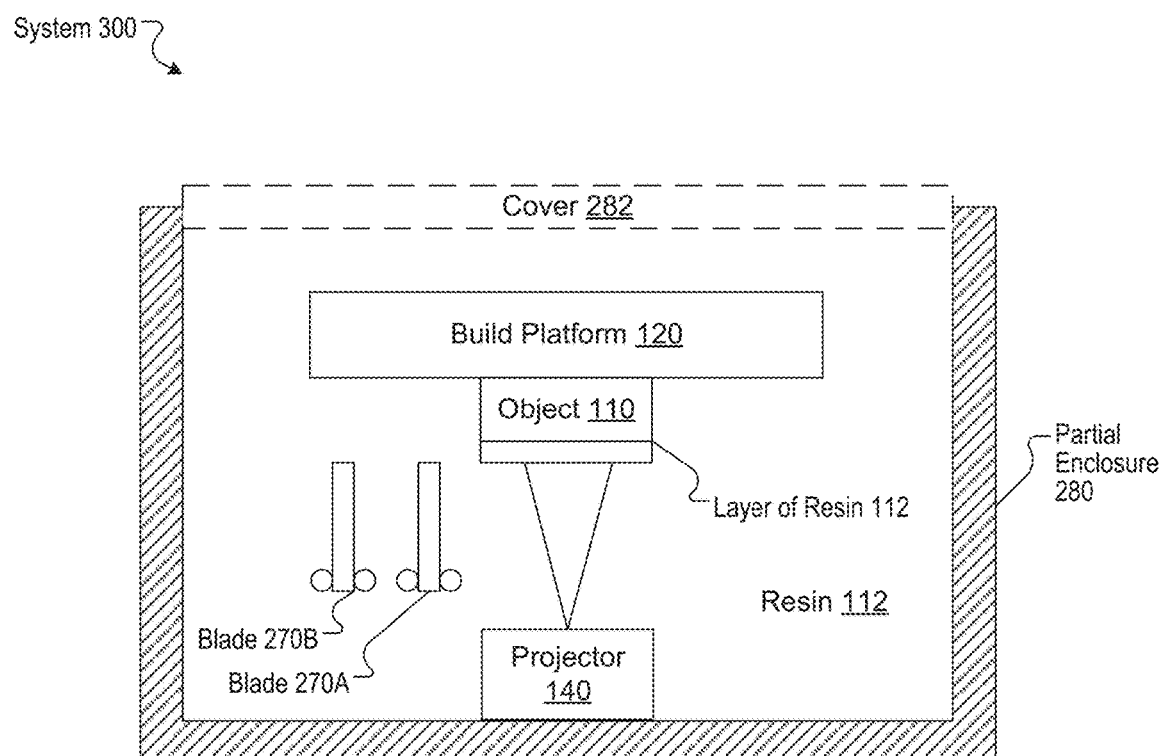

FIGS. 3A-B illustrate systems 300 (e.g., systems 100) for forming objects 310 using a partial enclosure 280, according to certain embodiments. System 300 may be any of the types of three-dimensional printing systems described herein, such as an SLA system. Features with similar reference numbers as those in other FIGS. may have the same or similar functionality, properties, and/or structure. In some embodiments, the systems 300 include multiple blades 270, have one or more blades 270 that vibrate, and/or have a cover 282 which may be similar to the features described in relation to other FIGS. (e.g., FIGS. 2A-E).

System 300 may include a partial enclosure 280. The partial enclosure 280 may be a vat that has a bottom wall and one or more side walls. Resin 112 may be disposed in the partial enclosure 280. A build platform 120 may be at least partially disposed in the resin 112 in the partial enclosure 280. An object 110 may be formed on the build platform 120 by a blade 270A forming a layer of resin 112 on the build platform 120 and/or object 110 and a projector 140 may cure a portion of the layer of resin 112 onto the build platform 120 and/or object 110.

In some embodiments, the build platform 120 is disposed in the resin and the object 110 is formed on an upper surface of the build platform 120 (e.g., see FIG. 3A). The projector 140 is disposed above the object 110. The blade 270A is disposed above the object 110.

In some embodiments, the projector 140 is disposed below the build platform 120 and the object 110 is formed on a lower surface of the build platform 120 (e.g., see FIG. 3B). The projector 140 may be disposed in the resin 112. The object 110 is disposed in the resin 112. The build platform may be disposed at least partially (e.g., completely) in the resin 112. In some embodiments, the projector 140 is disposed below the partial enclosure 280. In some embodiments, the build platform 120 is disposed above the resin 112.

In system 300 (e.g., of FIG. 3A and/or FIG. 3B), the blade 270A and/or the build platform 120 are configured to move relative to each other to form the layer of resin 112 to form the object 110. In some embodiments, blade 270A and/or blade 270B is configured to vibrate to reduce viscosity of the resin 112. Responsive to the resin 112 having lower viscosity, the blade 270A and/or build platform 120 may move quicker (e.g., a maximum speed of about 50 mm/s, about 30 mm/s to about 50 mm/s, about 35 mm/s to about 50 mm/s, about 40 mm/s to about 50 mm/s) for form the object 110 quicker than if the viscosity of the resin 112 was higher. The blade 270A and/or build platform 120 may move quicker and coat lower thickness which saves on material consumption compared to conventional systems. Responsive to the resin 112 having lower viscosity, smaller features may be formed in the object 110 and/or the object 110 may have less defects. The blade 270A and/or build platform 120 may move horizontally relative to each other to form the layer of resin 112. The blade 270A and/or build platform 120 may move vertically away from each other to form additional layers of resin 112 on the object 110.

A cover 282 may at least partially cover the partial enclosure 280 to reduce or eliminate evaporation of the resin 112 (e.g., to maintain material properties of the resin 112, to reduce waste of the resin.

In some embodiments, the cover 282 is a lid (e.g., sealed lid) that extends between the sidewalls of the partial enclosure. In some embodiments, the cover 282 is a membrane that extends over the resin 212. In some embodiments, the cover 282 is a fluid (e.g., silicon oil) that covers the resin 212. In some embodiments, the cover 282 includes structures (e.g., spheres, balls, etc.) that float in the resin 212 (e.g., upper surfaces of the structures are to be above the resin responsive to the one or more structures floating in the resin). The cover may have be rigid and have a fixed shape or may be flexible and have a non-fixed shape.

Referring to FIG. 3A, in some embodiments, the cover 282 may partially cover the resin 112 so as not to interfere with blades 270 and/or projector 140 (e.g., blades 270 may be partially disposed in the resin 112 and projector 140 may be disposed above the resin 112). Referring to FIGS. 3A-B, in some embodiments, blades 270 and/or projector 140 are disposed within the resin 112 and the cover 282 is disposed over the blades 270 and/or projector 140.

Figure 4A:
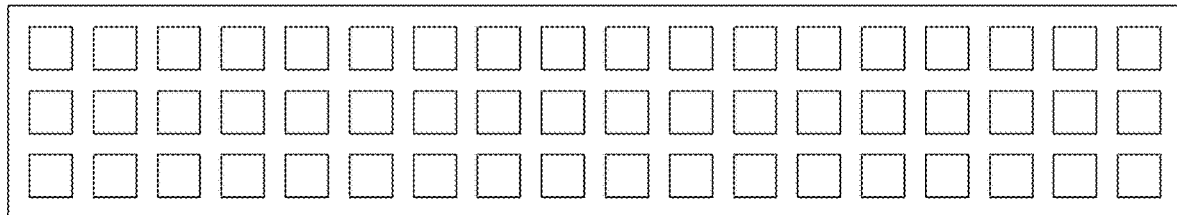
FIGS. 4A-C illustrate blades used in systems for forming objects, according to certain embodiments.
Figure 4B:
Figure 4C:
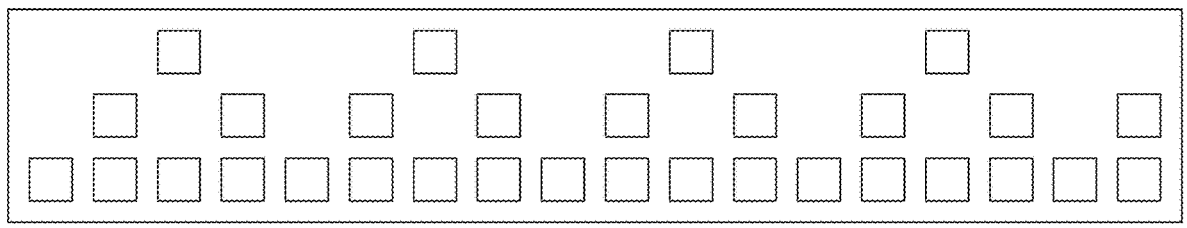

FIGS. 4A-C illustrate blades 400 used in systems (e.g., systems 100, 200, or 300) for forming objects (e.g., objects 110, 210, 310), according to certain embodiments. Features with similar reference numbers as those in other FIGS. may have the same or similar functionality, properties, and/or structure.

In some embodiments a first blade (e.g., blade 270A) forms the layer of resin (e.g., on the carrier film, on the build platform, on the object being formed on the build platform). In some embodiments, a second blade captures printed features that otherwise would have reached the first blade and caused the layer of resin to have a non-uniform thickness (e.g., cause streaks in the resin). In some embodiments, blades 400A-C are the second blade that captures printed features to allow the layer of resin formed by the first blade to be uniform.

Blade 400 may be a doctor blade that is rigid enough to capture a printed feature (e.g., partially cured resin, delaminated portion of object, print defects, etc.). Blade 400 may direct the printed features to a capture basin. A bottom surface of blade 400 may be disposed closer to a carrier film than the bottom surface of a first blade that forms the layer of resin so that print defects that pass under the blade 400 would not be stopped by the first blade and would not cause non-uniform thickness of the layer of resin. The blade 400 (e.g., doctor blade) may be a flow constriction device that captures cured parts (e.g., printed features) that are adhered to the carrier film. Streaks formed by blade 400 are covered by resin volume contained between blade 400 and the blade that forms the layer of resin, allowing the blade to form a smooth streak-free resin layer on the carrier film which prevents occurrence of print failure.

Blade 400 may form openings (e.g., graded porosity or mesh that improves resin flow for viscous materials) that allow passage of resin through the openings of the blade 400. The openings of blade 400 may maintain a constant resin volume between blade 400 and the blade that forms the layer of resin (e.g., blade 270A). The openings may have a largest dimension (e.g., length, width, diameter, distance between opposite corners, diagonal distance, etc.) that is smaller than the distance between the carrier film and the bottom surface of the first blade that forms the layer of resin. The openings may prevent accumulation of resin and prevent resin spill-over (e.g., prevent resin from spilling over the recoating chamber, prevent resin from spilling over the partial enclosure, prevent resin from spilling onto the projector, etc.).

Referring to FIG. 4A, the blade 400A may form openings that are substantially uniformly distributed. In some embodiments, the blade includes a mesh (e.g., expanded wire mesh) that forms the openings. The blade 400A may include a mesh and a frame, where the mesh is secured (e.g., welded) to the frame. The blade 400A may include a sheet of material (e.g., metal) that has openings formed in the sheet of material (e.g., injection molded with openings, openings punched or drilled into the sheet of material, etc.). The substantially uniform distribution of openings may allow resin to pass through the blade 400A to prevent accumulated resin and/or printed features from flowing over the top of the blade 400A.

Referring to FIG. 4B, the blade 400B may form openings towards one side of the blade 400B. The openings at one side of the blade may cause the resin to flow through the side that forms the openings. The printed features may be carried by the resin towards the side that forms the openings. The printed features may be captured, collected, and/or removed proximate the side that forms the openings.

Referring to FIG. 4C, the blade 400C may form more openings closer to the bottom surface of the blade 400C and less openings closer to the upper surface of the blade 400C. This may cause the printed features to become captured towards the bottom of the blade 400C.

In some embodiments, the blade is angled, curved, etc. to cause the printed features to be directed towards a location (e.g., side of the blade) to be captured and/or removed. In some embodiments, control parameters of one or more blades are controlled (e.g., by controller 150). The control parameters may include one or more of blade height (e.g., doctor blade height setting), shape of blade, inclination in x-y-direction, inclination in x-z direction, capture basin to capture failed layers and/or parts (e.g., printed features), number of blades (e.g., doctor blades) and position relative to the blade that forms the layer of resin. The shape, distance, and mounting angles of blade 400 can be altered to ease collection of printed features (e.g., layer fragments) at the end of a printing process. In some embodiments, blade 400 vibrates and/or moves to reduce viscosity of the layer of resin. In some embodiments, moving the blade 400 (e.g., up and down, x-direction, y-direction, z-direction, etc.) is controlled by a mechatronic system that reacts to image data received from an imaging device directed at the carrier film. In some examples, if a defect is detected based on image data received from an imaging device directed at the carrier film, the blade 400 (e.g., second blade, second gate, blade behind the blade that forms the layer of resin) can be moved closer to the carrier film to collect the printed feature (e.g., defect) and direct the printed feature to a collection tray. Once the printed feature is removed, the blade 400 (e.g., second blade) can be re-positioned to be further from the carrier film allowing greater flow of resin until the next defect is identified. The blade can be moved and controlled based on image data instead of being in a preset position relative to the carrier film.

Figure 5A:
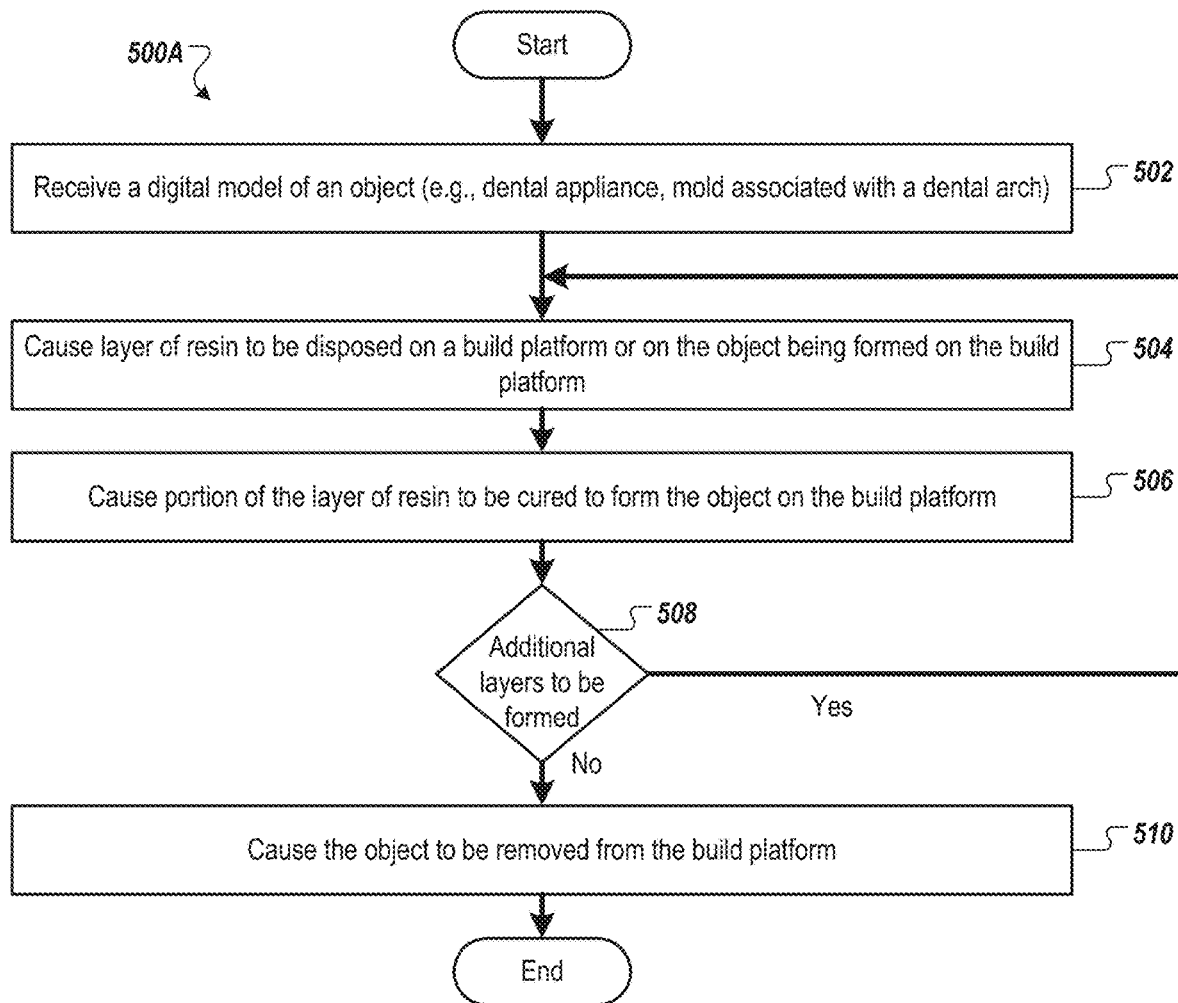
FIGS. 5A-B illustrate flow diagrams for methods of producing dental appliances, according to certain embodiments.
Figure 5B:
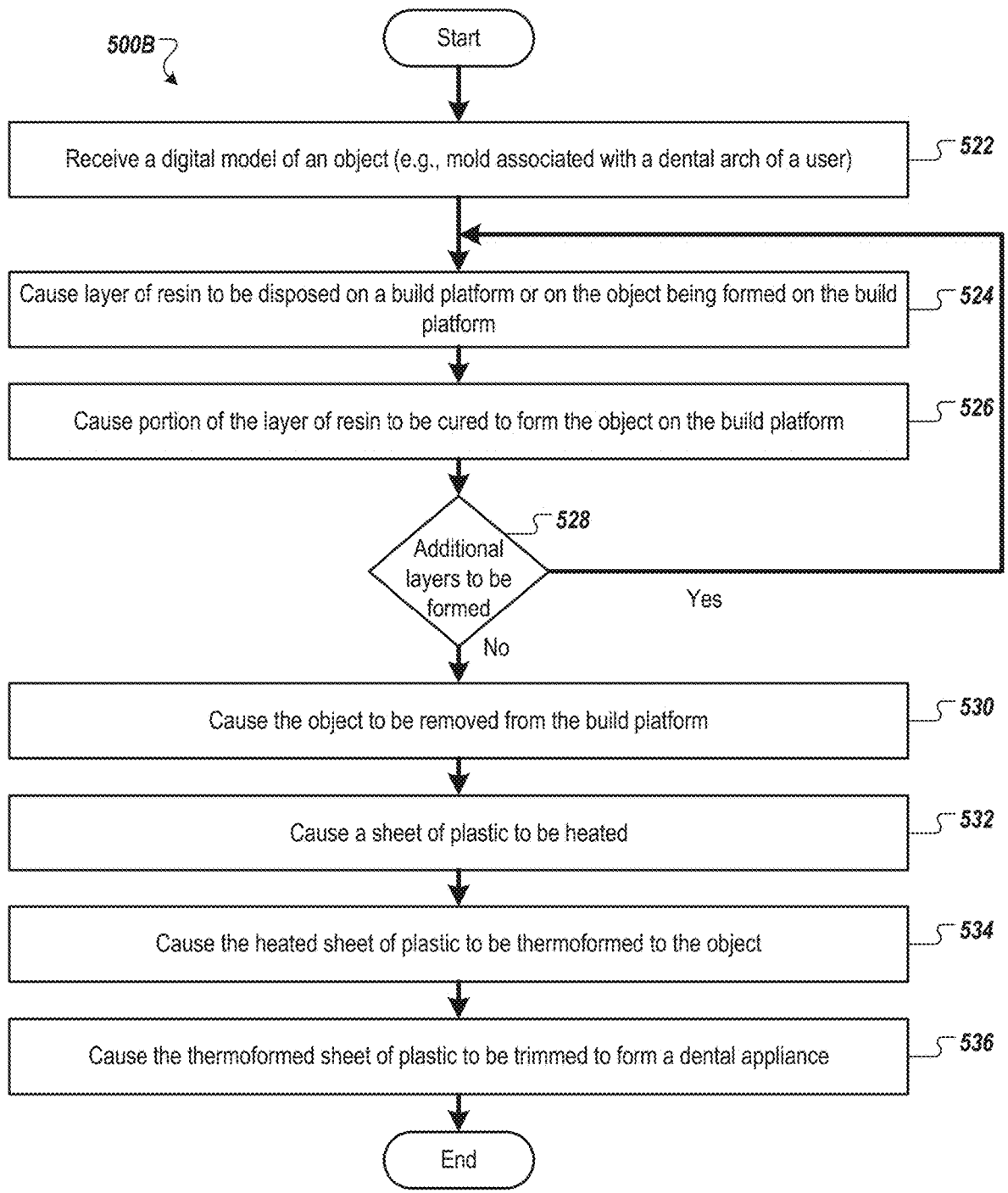

FIGS. 5A-B illustrate flow diagrams for methods 500A-B of producing objects such as dental appliances and/or molds for forming dental appliances, according to certain embodiments. In some embodiments, one or more operations of methods 500A-B are performed by a processing logic of a computing device (e.g., controller 150 of FIGS. 1A-3B) to automate one or more operations of producing an object (e.g., a dental appliance and/or mold). The processing logic may include hardware (e.g., circuitry, dedicated logic, programmable logic, microcode, etc.), software (e.g., instructions executed by a processing device), firmware, or a combination thereof. For example, one or more operations of methods 500A-B may be performed by a processing device executing a program or module, such as dental appliance generator 650 of FIG. 6.

Referring to FIG. 5A, at block 502 of method 500A, a digital model for an object (e.g., dental appliance to be used in relation to a dental arch of a user, a mold associated with a dental arch of a user, etc.) is generated. In some embodiments, the object is a dental appliance (e.g., to be used in relation to a dental arch of a user), such as incremental palatal expanders, aligners (e.g., aligners with or without mandibular advancement structures and/or other structures), dental attachment templates, and/or other dental appliances. In some embodiments, the object is a mold associated with a dental arch of a user, such as a mold usable to form a dental appliance. For example, the object may be a mold over which an orthodontic aligner may be thermoformed.

A shape of a dental arch for a patient at a treatment stage may be determined based on a treatment plan to generate the digital model of the object (e.g., dental appliance, mold, etc.). In the example of orthodontics, the treatment plan may be generated based on an intraoral scan of a dental arch (e.g., dental arch to receive a dental appliance, dental arch to be modeled). The intraoral scan of a patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

The processing logic may determine an initial shape for an object (e.g., dental appliance, a mold of the patient's dental arch) at a treatment stage based on the digital model of the dental arch at that treatment stage. Processing logic may additionally determine one or more features to add to the object.

The processing logic may determine a final shape for the object (e.g., dental appliance, mold) and may generate a digital model of the object (e.g., dental appliance, mold). Alternatively, the digital model may have already been generated. In such an instance, processing logic may update the already generated digital model to include one or more determined features for the object (e.g., dental appliance, mold). The digital model may be represented in a file such as a computer aided drafting (CAD) file or a 3D printable file such as a stereolithography (STL) file. The digital model may include instructions that will control a fabrication system or device in order to produce the object (e.g., dental appliance, mold) with specified geometries.

At block 504, a layer of resin is disposed on a build platform or on the object being formed on the build platform. In some embodiments, a blade forms a layer of resin on a carrier film and the carrier film moves the layer of resin to be on the object or build platform (e.g., see FIGS. 2A-C). In some embodiments, the blade and/or build platform move relative to each other so that the blade forms the layer of resin on the build platform or object.

At block 506, a portion of the layer of resin is cured to form the object on the build platform. The layer of resin is cured by causing a pattern of light (e.g., UV light provided by a projector) to be provided to the layer of resin (e.g., through a transparent carrier film). The patterned light cures a portion of the layer of resin to the build platform or object. The pattern of light is based on the digital model of the object. The processing logic may determine, based on the digital model, layers of the object and patterns of light to form the layers. The processing logic may instruct the projector to provide the patterns of light to form the layers of the object.

At block 508, it is determined whether additional layers are to be formed. If more layers are to be formed on the object, then flow continues to block 504. If more layers are not to be formed on the object, flow continues to block 510.

In some embodiments, through blocks 504-508, an object (e.g., dental appliance, mold) is generated based on the digital model of block 502. A virtual 3D model of a patient's dental arch may be used to generate a unique customized object (e.g., dental appliance, mold) associated with the dental arch at a particular stage of treatment. The shape of the object (e.g., dental appliance, mold) may be at least in part based on the shape of the virtual 3D model for that treatment stage. The object (e.g., dental appliance, mold) may correspond to a dental arch of a patient and the object (e.g., dental appliance, mold) may include a sloping portion that commences below a gum line of the dental arch and extends away from the dental arch to a lower portion of the object (e.g., dental appliance, mold). In some embodiments, the object (e.g., dental appliance, mold) is generated with the sloping portion commencing below the gum line (e.g., to assist in the release of the thermoformed sheet of plastic from the mold). The object (e.g., dental appliance, mold) may be formed using a rapid prototyping equipment (e.g., 3D printers) to manufacture the object (e.g., dental appliance, mold) using additive manufacturing techniques (e.g., stereolithography) or subtractive manufacturing techniques (e.g., milling). The digital model may be input into a rapid prototyping machine. The rapid prototyping machine then manufactures the object (e.g., dental appliance, mold) using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA object (e.g., dental appliance, mold). In SLA, the object (e.g., dental appliance, mold) is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the object (e.g., dental appliance, mold). The platform is lowered incrementally, and the light source traces a new pattern over the platform to form another layer of the object (e.g., dental appliance, mold) at each increment. This process repeats until the object (e.g., dental appliance, mold) is completely fabricated. Once all of the layers of the object (e.g., dental appliance, mold) are formed, the object (e.g., dental appliance, mold) may be cleaned and cured. In one embodiment, a system such as described earlier herein (e.g., system 200) is used to print the object.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the object (e.g., dental appliance, mold). The materials used for fabrication of the object (e.g., dental appliance, mold) can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of an object (e.g., dental appliance, mold) including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., complex features added to the mold) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the object (e.g., dental appliance, mold), and to cause one or more additional materials to be used for the remainder of the object (e.g., dental appliance, mold).

In some embodiments, the formed object is a mold, and a dental appliance may be formed from the object (e.g., by thermoforming the dental appliance over the mold). In other embodiments, the formed object is a dental application. In either instance, the dental appliance may be configured to provide forces to move the patient's teeth. The shape of each dental appliance is unique and customized for a particular patient and a particular treatment stage. In an example, dental appliances can be pressure formed or thermoformed over printed molds. Each mold may be used to fabricate a dental appliance that will apply forces to the patient's teeth at a particular stage of the orthodontic treatment. In some embodiments, a dental appliance is directly fabricated by method 500A (e.g., object of blocks 502-510 is the dental appliance) without forming a physical mold of the dental arch. The dental appliances each have teeth-receiving cavities that receive and resiliently reposition the teeth in accordance with a particular treatment stage.

At block 510, the object is removed from the build platform. The object may be secured to a plate. The object may be secured to the plate via fasteners such as a pin, a keyway, and a locking mechanism. The object may be secured to the plate to avoid movement in the x-, y-, and z-direction and to avoid rotation (e.g., change in angle) of the object.

Referring to FIG. 5B, at block 522 of method 500B, a digital model for an object (e.g., a mold associated with a dental arch of a user) is generated. Block 522 of FIG. 5B may be similar to block 502 of FIG. 5A.

At block 524, a layer of resin is disposed on a build platform or on the object being formed on the build platform. Block 524 of FIG. 5B may be similar to block 504 of FIG. 5A.

At block 526, a portion of the layer of resin is cured to form the object (e.g., mold) on the build platform. Block 526 of FIG. 5B may be similar to block 506 of FIG. 5A.

At block 528, it is determined whether additional layers are to be formed. Block 528 of FIG. 5B may be similar to block 508 of FIG. 5A. If more layers are to be formed on the object (e.g., mold), then flow continues to block 524. If more layers are not to be formed on the object (e.g., mold), flow continues to block 530.

At block 530, the object (e.g., mold) is removed from the build platform. Block 530 of FIG. 5B may be similar to block 510 of FIG. 5A.

At block 532, a sheet of plastic is heated. The sheet of plastic may be secured to a pallet and the sheet of plastic secured to the pallet may be surrounded with a mask prior to heating the sheet of plastic. The sheet of plastic may be an elastic thermoplastic, a sheet of polymeric material, etc. The sheet of plastic may be lowered onto the pallet so that holding pins of the pallet pierce the sheet of plastic to secure the sheet of plastic to the pallet. A pressurized cylinder may lower the mask onto the sheet of plastic secured to the pallet. The sheet of plastic may be heated to a temperature at which the sheet of plastic becomes pliable. The sheet of plastic may be heated using a ceramic heater, convection oven, or infrared heater. The mask may allow the sheet of plastic to be heated to 336° F. without hanging to avoid air leaks.

At block 534, the heated sheet of plastic is thermoformed to the object. To thermoform the heated sheet of plastic over the object, pressure may concurrently be applied to the sheet of plastic to form the now pliable sheet of plastic around the object (e.g., with features that will imprint markings and/or elements in the dental appliance formed on the object). Once the sheet cools, it will have a shape that conforms to the object. In one embodiment, a release agent (e.g., a non-stick material) is applied to the object before forming the dental appliances (e.g., shells). This may facilitate later removal of the molds from the shells.

At block 536, a dental appliance is trimmed from the thermoformed sheet of plastic. The thermoformed sheet of plastic may be removed from the object (e.g., using a shell removal device). The thermoformed sheet of plastic may be trimmed to generate the dental appliance. In some embodiments, the portion of thermoformed sheet of plastic that is disposed on a portion of the object that slopes outward below the gum line is removed during the trimming of the thermoformed sheet of plastic to generate the dental appliance. After the thermoformed sheet of plastic is removed from the object for a treatment stage, the thermoformed sheet of plastic is subsequently trimmed along one or more cut lines (also referred to as a trim line). The cut line may be a gingival cut line that represents an interface between a dental appliance and a patient's gingiva. In one embodiment, the dental appliance is manually cut by a technician using scissors, a bur, a cutting wheel, a scalpel, or any other cutting implement. In another embodiment, the dental appliance is cut by a computer controlled trimming machine such as a CNC machine or a laser trimming machine. The computer controlled trimming machine may control an angle and position of a cutting tool of the trimming machine to trim the thermoformed sheet of plastic.

In some embodiments, the transferring of the plate securing the object and/or the sheet of plastic is via a conveyor system (e.g., via lateral movement). In some embodiments, the transferring of the plate securing the object and/or the sheet of plastic is via a dial system (e.g., via rotational movement).

In some embodiments, the object is transferred to be located below the thermoforming station and is lifted to have the heated sheet thermoformed over the first mold and the second mold. In some embodiments, the transferring of the first object to be located below the thermoforming station is via lateral movement (e.g., conveyor system). In some embodiments, the transferring of the object to be located below the thermoforming station is via rotational movement (e.g., dial system).

In some embodiments, the techniques herein can be used to form molds, such as thermoforming molds. Examples of these can be found in: U.S. Pat. No. 9,943,991, by inventors Tanugula et al., entitled "Mold with separable features;" U.S. Pat. No. 9,943,386, to inventors Webber et al., entitled "Mold with weakened areas;" and U.S. Pat. No. 8,776,391 to inventors Kaza et al., entitled "System for post-processing orthodontic appliance molds;" as well as any continuation or divisional application claiming priority and any utility or provisional application to which these claim priority therefrom. These patents/applications are hereby incorporated by reference as if set forth fully herein.

In some embodiments, the techniques herein can be used to form appliances with mandibular repositioning features. Examples of these can be found in: U.S. Pat. No. 9,844,424 by inventors Wu et al., entitled, "Dental appliance with repositioning jaw elements;" U.S. Pat. Pub. No. 2015/0238280 by inventors Wu et al., entitled "Dental appliance with repositioning jaw elements;" U.S. Pat. No. 10,213,277 by inventors Webber et al., entitled "Dental appliance binding structure;" as well as any continuation or divisional application claiming priority and any utility or provisional application to which these claim priority therefrom. These patents/applications are hereby incorporated by reference as if set forth fully herein.

In some embodiments, the techniques herein can be used to form palatal expanders. Examples can be found in: U.S. Pat. No. 9,610,141 by inventors Kopelman et al., entitled, "Arch expanding appliance;" U.S. Pat. No. 7,192,273 by inventor McSurdy entitled "System and method for palatal expansion;" U.S. Pat. No. 7,874,836 by inventor McSurdy entitled "System and method for palatal expansion;" as well as any continuation or divisional application claiming priority and any utility or provisional application to which these claim priority therefrom. These patents/applications are hereby incorporated by reference as if set forth fully herein.

In some embodiments, the techniques herein can be used to form attachment formation templates. Examples can be found in: U.S. Pat. Pub. No. 2017/0007368 by inventor Boronkay entitled "Direct fabrication of attachment templates with adhesive;" U.S. Pat. Pub. No. 2017/0165032 by inventors Webber et al., entitled "Dental attachment placement structure;" U.S. Pat. Pub. No. 2017/0319296 by inventors Webber et al., entitled "Dental attachment placement structure;" the contents of U.S. patent application Ser. No. 16/366,686 by inventors Webber et al., entitled "Dental attachment placement structure;" as well as any continuation or divisional application claiming priority and any utility or provisional application to which these claim priority therefrom. These patents/applications are hereby incorporated by reference as if set forth fully herein.

In some embodiments, the techniques herein can be used to form directly fabricated aligners. Examples can be found in: U.S. Pat. App. Pub. No. 2016/0310236 by inventors Kopelman et al., entitled "Direct fabrication of orthodontic appliances with elastics;" U.S. Pat. App. Pub. No. 2017/0007365 to Kopelman et al., entitled "Direct fabrication of aligners with interproximal force coupling;" U.S. Pat. App. Pub. No. 2017/0007359 to Kopelman et al., entitled "Direct fabrication of orthodontic appliances with variable properties;" U.S. Pat. App. Pub. No. 2017/0007360 to Kopelman et al., entitled "Systems, apparatuses and methods for dental appliances with integrally formed features;" U.S. Pat. No. 10,363,116 to Boronkay entitled "Direct fabrication of power arms;" U.S. Pat. App. Pub. No. 2017/0007366 to Kopeleman et al., entitled "Direct fabrication of aligners for arch expansion;" U.S. Pat. App. Pub. No. 2017/0007367 to Li et al., entitled "Direct fabrication of palate expansion and other application;" as well as any continuation or divisional application claiming priority and any utility or provisional application to which these claim priority therefrom. These patents/applications are hereby incorporated by reference as if set forth fully herein.

Examples of materials that can be used with the embodiments discussed herein include the subject matter of U.S. Pat. Pub. No. 2017/0007362, by inventors Yan CHEN et al., entitled, "Dental Materials Using Thermoset Polymers;" International Patent Application Number PCT/US2019/030683 to ALIGN TECHNOLOGY, INC., entitled "Curable Composition for Use in a High Temperature Lithography-Based Photopolymerization Process and Method of Producing Crosslinked Polymers Therefrom; and International Patent Application Number PCT/US2019/030687 to ALIGN TECHNOLOGY, INC., entitled, "Polymerizable Monomers and Method of Polymerizing the Same." These patents/applications are hereby incorporated by reference as if set forth fully herein. As noted herein, the hybrid 3D printing techniques may combine advantages of SLA, DLP and FDM into a single technology that can be used as the basis of 3D printing objects (dental appliances, hearing aids, medical implants, etc.) for mass production.

FIG. 6 illustrates a diagrammatic representation of a machine in the example form of a computing device 600 within which a set of instructions, for causing the machine to perform any one or more of the methodologies discussed with reference to the methods of FIGS. 5A-B. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computing device 600, the main memory 604 and the processing device 602 also constituting computer-readable storage media.

The computer-readable storage medium 624 may also be used to store one or more instructions for dental appliance production and/or a dental appliance generator 650, which may perform one or more of the operations of methods 500A-B described with reference to FIGS. 5A-B. The computer-readable storage medium 624 may also store a software library containing methods that call a dental appliance generator 650. While the computer-readable storage medium 624 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing or encoding a set of instructions for execution by the machine and that cause the machine to perform any one or more of the methodologies of the present disclosure. The term "non-transitory computer-readable storage medium" shall accordingly be taken to include, but not be limited to, solid-state memories, and optical and magnetic media.

Figure 7A:
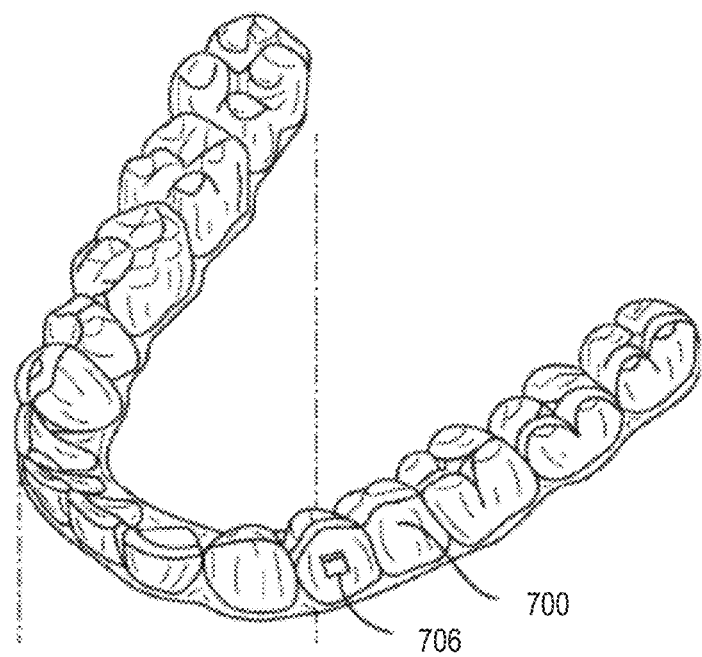
FIG. 7A illustrates a tooth repositioning appliance, according to certain embodiments.
Figure 7A:
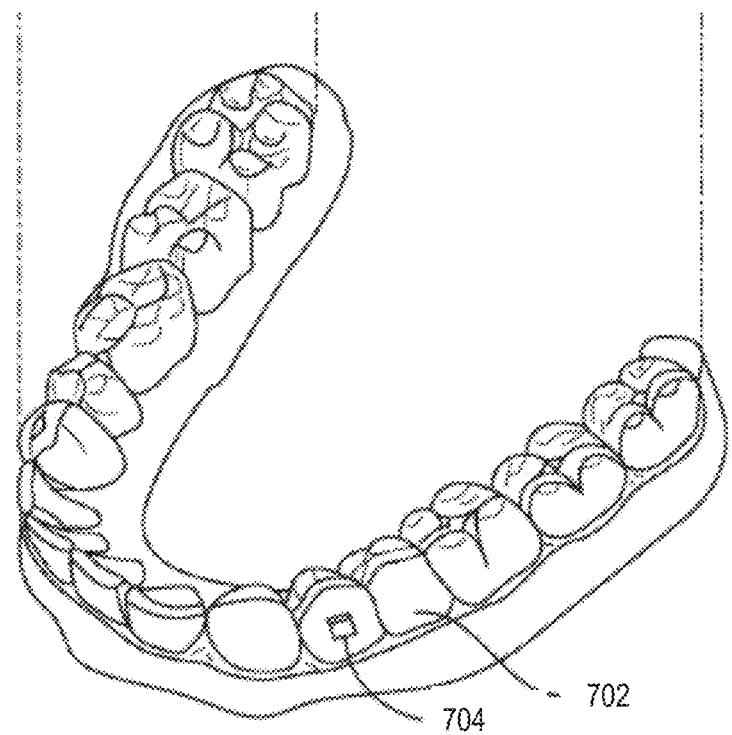

FIG. 7A illustrates an exemplary tooth repositioning dental appliance or aligner 700 that can be worn by a patient in order to achieve an incremental repositioning of individual teeth 702 in the jaw. The aligner 700 may be formed from an object (e.g., object 110 of one or more of FIG. 1A-2C or 3A-B) formed by layers of resin on a build platform, as described herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. A "polymeric material," as used herein, may include any material formed from a polymer. A "polymer," as used herein, may refer to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Useful polymers include organic polymers or inorganic polymers that may be in amorphous, semi-amorphous, crystalline or semi-crystalline states. Polymers may include polyolefins, polyesters, polyacrylates, polymethacrylates, polystyrenes, Polypropylenes, polyethylenes, Polyethylene terephthalates, poly lactic acid, polyurethanes, epoxide polymers, polyethers, poly (vinyl chlorides), polysiloxanes, polycarbonates, polyamides, poly acrylonitriles, polybutadienes, poly(cycloolefins), and copolymers. The systems and/or methods provided herein are compatible with a range of plastics and/or polymers. Accordingly, this list is not all inclusive, but rather is exemplary. The plastics can be thermosets or thermoplastics. The plastic may be a thermoplastic.

Examples of materials applicable to the embodiments disclosed herein include, but are not limited to, those materials described in the following patent applications filed by Align Technology: "MULTILAYER DENTAL APPLIANCES AND RELATED METHODS AND SYSTEMS," U.S. Pat. No. 9,655,691 to Li, et al., filed May 14, 2012; "SYSTEMS AND METHODS FOR VARYING ELASTIC MODULUS APPLIANCES," U.S. Pat. No. 6,964,564 to Phan, et al., filed Jul. 26, 2002; "METHODS OF MAKING ORTHODONTIC APPLIANCES," U.S. Pat. No. 7,641,828 to DeSimone, et al., filed Oct. 12, 2004; "TREATMENT OF TEETH BY ALIGNERS," U.S. Pat. No. 8,740,614 to Wen et al., filed Jul. 29, 2009; and any applications claiming benefit therefrom or providing benefit thereto (including publications and issued patents), including any divisional, continuation, or continuation-in-part thereof, the content of which are incorporated by reference herein.

Examples of materials applicable to the embodiments disclosed herein include a hard polymer layer disposed between two soft polymer layers. In some embodiments, the hard inner polymer layer includes a co-polyester and has a polymer layer elastic modulus. In some embodiments, a first soft outer polymer layer and a second soft outer polymer layer each include a thermoplastic polyurethane elastomer and each have a soft polymer elastic modulus less than the hard polymer layer elastic modulus, a flexural modulus of greater than about 35,000 psi, a hardness of about 60A to about 85D, and a thickness in a range from 25 microns to 100 microns. In some embodiments, the hard inner polymer layer is disposed between the first soft outer polymer layer and the second soft outer polymer layer so as to reduce degradation of the resilient position force applied to the teeth when the appliance is worn. The hard polymer layer can include a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof (e.g., a blend of at least two of the listed hard polymeric materials). In some embodiments, the hard polymer layer includes two or more hard polymer layers. The soft outer polymer material may include a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or a combination thereof (e.g., a blend of at least two of the listed soft polymeric materials). The soft polymer layers can be the same material or a different material.

Examples of materials applicable to the embodiments disclosed herein include a middle layer disposed between two layers. The two layers individually include a thermoplastic polymer having a flexural modulus of from about 1,000 MPa to 2,500 MPa and a glass transition temperature and/or melting point of from about 80° C. to 180° C. The middle layer includes a polyurethane elastomer having a flexural modulus of from about 50 MPa to about 500 MPa and one or more of a glass transition temperature and/or melting point of from about 90° C. to about 220° C. The polymeric sheet composition has a combined thickness of the middle layer and the outer layers of from 250 microns to 2000 microns and a flexural modulus of from 500 MPa to 1,500 MPa. In some embodiments, the outer layers include one or more of a co-polyester, a polycarbonate, a polyester polycarbonate blend, a polyurethane, a polyamide, or a polyolefin. The middle layer may have a Shore hardness of from A90 to D55 and a compression set of less than 35% after 22 hours at 25° C. In some embodiments, the outer layers have a lateral restoring force of less than 100 Newtons (N) per square centimeter when displayed by 0.05 mm to 0.1 mm relative to each other. In some embodiments, the interplay peel strength between the outer layers and the middle layer is greater than 50 N per 2.5 cm. In some embodiments, the combined thickness of the outer layers is from 50 microns to 1,000 microns. In some embodiments one or more of the outer layers include a microcrystalline polyamide including from 50 to 100 mole % of C6 to C14 aliphatic diacid moieties and about 50 to 100 mole % of 4,4'-methylene-bis(cyclohexylamine), having a glass transition of between about 100° C. and 180° C., a heat of fusion of less than 20 J/g and a light transmission of greater than 80%. In some embodiments, one or more of the outer layers includes a co-polyester including: a dicarboxylic acid component including 70 mole % to 100 mole % of terephthalic acid residues; and a diol component including (i) 0 to 90 mole % ethylene glycol, (ii) 5 mole % to 50 mole % of 2,2,4,4-tetramethyl-1,3-cyclobutanediol residues, (iii) 50 mole % to 95 mole % 1,4-cyclohexanedimethanol residues, and (iv) 0 to 1 mole % of a polyol having three or more hydroxyl groups, where the sum of the mole % of diol residues (i), (ii), (iii), and (iv) amounts to 100 mole % and the co-polyester exhibits a glass transition temperature Tg from 80° C. to 150° C. In some embodiments, the middle layer includes an aromatic polyether polyurethane having a Shore hardness of from A90 to D55 and a compression set of less than 35%, where the interlayer peel strength between the outer layers and the middle layer is greater than 50 N per 2.5 cm. In some embodiments, one or more of the outer layers includes a polyurethane that includes: a di-isocyanate including 80 mole % to 100 mole % of methylene diphenyl diisocyanate residues and/or hydrogenated methylene diphenyl diisocyanate; and a diol component including: (i) 0 to 100 mole % hexamethylene diol; and (ii) 0 to 50 mole % 1,4-cyclohexanedimethanol, where the sum of (i) and (ii) amounts to greater than 90 mole % and the polyurethane has a glass transition temperature Tg from about 85° C. to about 150° C.

Although polymeric aligners are discussed herein, the techniques disclosed may also be applied to aligners having different materials. Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to perform simultaneous forming multiple shells which are any suitable type of shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

The aligner 700 can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 704 on teeth 702 with corresponding receptacles or apertures 706 in the appliance 700 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the URL "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 7B:
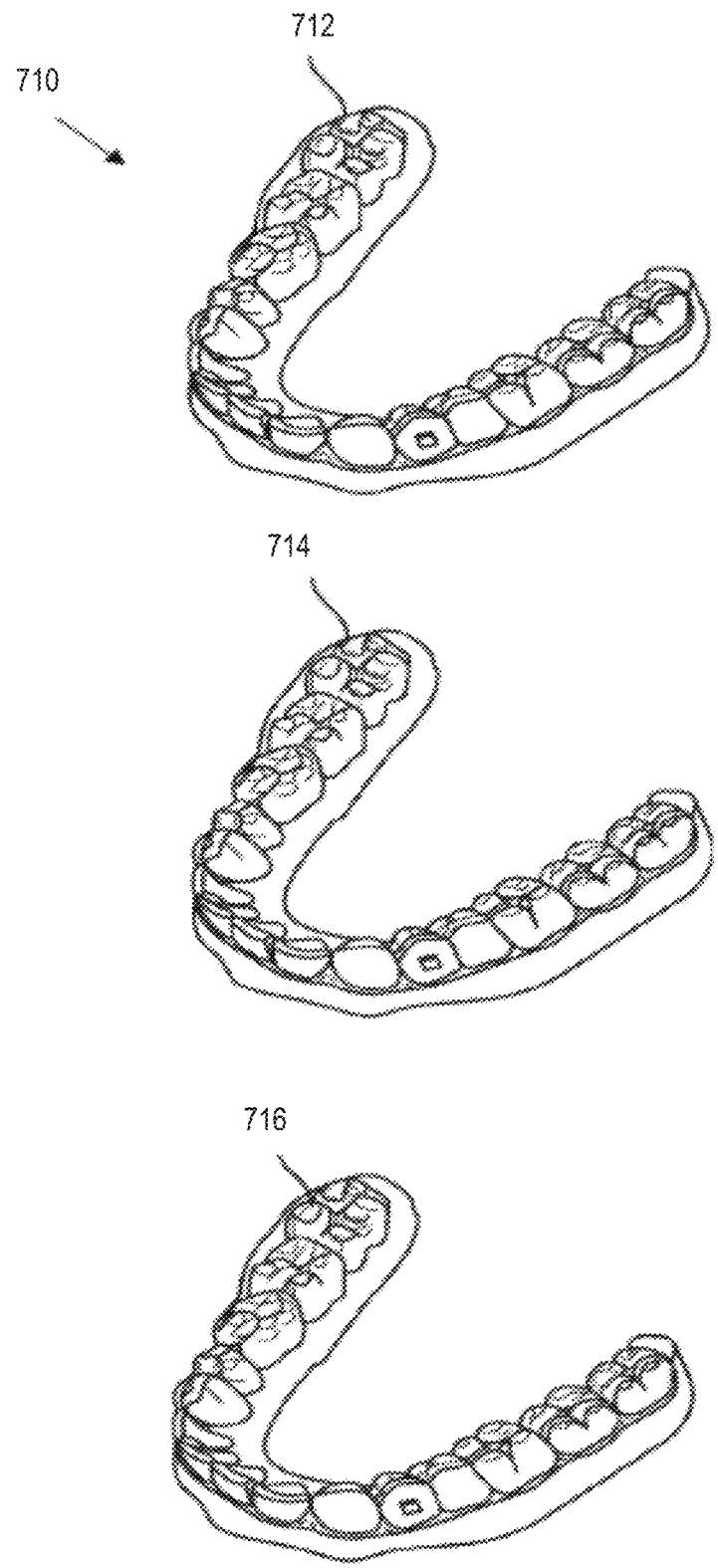
FIG. 7B illustrates a tooth repositioning system, according to certain embodiments.

FIG. 7B illustrates a tooth repositioning system 710 including a plurality of appliances 712, 714, 716. The appliances 712, 714, 716 may be formed on objects (e.g., object 110 of one or more of FIG. 1A-2C or 3A-B) that are formed by layers of resin on a build platform, as described herein. Alternatively, the appliances 712, 714, 716 may be directly manufactured using a rapid prototyping machine such as that discussed herein above. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 710 can include a first appliance 712 corresponding to an initial tooth arrangement, one or more intermediate appliances 714 corresponding to one or more intermediate arrangements, and a final appliance 716 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

In some embodiments, the appliances 712, 714, 716 (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In an example of indirect fabrication, a mold of a patient's dental arch may be fabricated from a digital model of the dental arch, and a shell may be formed over the mold (e.g., by thermoforming a polymeric sheet over the mold of the dental arch and then trimming the thermoformed polymeric sheet). The fabrication of the mold may be performed by a rapid prototyping machine (e.g., a stereolithography (SLA) 3D printer). The rapid prototyping machine may receive digital models of molds of dental arches and/or digital models of the appliances 712, 714, 716 after the digital models of the appliances 712, 714, 716 have been processed by processing logic of a computing device, such as the computing device in FIG. 6. The processing logic may include hardware (e.g., circuitry, dedicated logic, programmable logic, microcode, etc.), software (e.g., instructions executed by a processing device), firmware, or a combination thereof. For example, one or more operations may be performed by a processing device executing a dental appliance generator 650.

To manufacture the molds, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch (mold). For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a dental impression or the like). The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models (digital designs) of a dental arch may be generated for a single patient. A first virtual 3D model may be a unique model of a patient's dental arch and/or teeth as they presently exist, and a final virtual 3D model may be a model of the patient's dental arch and/or teeth after correction of one or more teeth and/or a jaw. Multiple intermediate virtual 3D models may be modeled, each of which may be incrementally different from previous virtual 3D models.

Each virtual 3D model of a patient's dental arch may be used to generate a unique customized physical mold of the dental arch at a particular stage of treatment. The shape of the mold may be at least in part based on the shape of the virtual 3D model for that treatment stage. The virtual 3D model may be represented in a file such as a computer aided drafting (CAD) file or a 3D printable file such as a stereolithography (STL) file. The virtual 3D model for the mold may be sent to a third party (e.g., clinician office, laboratory, manufacturing facility or other entity). The virtual 3D model may include instructions that will control a fabrication system or device in order to produce the mold with specified geometries.

A clinician office, laboratory, manufacturing facility or other entity may receive the virtual 3D model of the mold, the digital model having been created as set forth above. The entity may input the digital model into a rapid prototyping machine. The rapid prototyping machine then manufactures the mold using the digital model. One example of a rapid prototyping manufacturing machine is a 3D printer. 3D printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

Appliances may be formed from each mold and when applied to the teeth of the patient, may provide forces to move the patient's teeth as dictated by the treatment plan. The shape of each appliance is unique and customized for a particular patient and a particular treatment stage. In an example, the appliances 712, 714, 716 can be pressure formed or thermoformed over the molds. Each mold may be used to fabricate an appliance that will apply forces to the patient's teeth at a particular stage of the orthodontic treatment. The appliances 712, 714, 716 each have teeth-receiving cavities that receive and resiliently reposition the teeth in accordance with a particular treatment stage.

In one embodiment, a sheet of material is pressure formed or thermoformed over the mold. The sheet may be, for example, a sheet of polymeric (e.g., an elastic thermopolymeric, a sheet of polymeric material, etc.). To thermoform the shell over the mold, the sheet of material may be heated to a temperature at which the sheet becomes pliable. Pressure may concurrently be applied to the sheet to form the now pliable sheet around the mold. Once the sheet cools, it will have a shape that conforms to the mold. In one embodiment, a release agent (e.g., a non-stick material) is applied to the mold before forming the shell. This may facilitate later removal of the mold from the shell. Forces may be applied to lift the appliance from the mold. In some instances, a breakage, warpage, or deformation may result from the removal forces. Accordingly, embodiments disclosed herein may determine where the probable point or points of damage may occur in a digital design of the appliance prior to manufacturing and may perform a corrective action.

Additional information may be added to the appliance. The additional information may be any information that pertains to the appliance. Examples of such additional information includes a part number identifier, patient name, a patient identifier, a case number, a sequence identifier (e.g., indicating which appliance a particular liner is in a treatment sequence), a date of manufacture, a clinician name, a logo and so forth. For example, after determining there is a probable point of damage in a digital design of an appliance, an indicator may be inserted into the digital design of the appliance. The indicator may represent a recommended place to begin removing the polymeric appliance to prevent the point of damage from manifesting during removal in some embodiments.

In some embodiments, a library of removal methods/patterns may be established and this library may be referenced when simulating the removal of the aligner in the numerical simulation. Different patients or production technicians may tend to remove aligners differently, and there might be a few typical patterns. For example: 1) some patients lift from the lingual side of posteriors first (first left and then right, or vice versa), and then go around the arch from left/right posterior section to the right/left posterior section; 2) similar to #1, but some other patients lift only one side of the posterior and then go around the arch; 3) similar to #1, but some patients lift from the buccal side rather than the lingual side of the posterior; 4) some patients lift from the anterior incisors and pull hard to remove the aligner; 5) some other patients grab both lingual and buccal side of a posterior location and pull out both sides at the same time; 6) some other patients grab a random tooth in the middle. The library can also include a removal guideline provided by the manufacturer of the aligner. Removal approach may also depend on presence or absence of attachments on teeth as some pf the above method may result in more comfortable way of removal. Based on the attachment situation on each tooth, it can be determined how each patient would probably remove an aligner and adapt that removal procedure for that patient in that specific simulation.

After an appliance is formed over a mold for a treatment stage, the appliance is removed from the mold (e.g., automated removal of the appliance from the mold), and the appliance is subsequently trimmed along a cutline (also referred to as a trim line). The processing logic may determine a cutline for the appliance. The determination of the cutline(s) may be made based on the virtual 3D model of the dental arch at a particular treatment stage, based on a virtual 3D model of the appliance to be formed over the dental arch, or a combination of a virtual 3D model of the dental arch and a virtual 3D model of the appliance. The location and shape of the cutline can be important to the functionality of the appliance (e.g., an ability of the appliance to apply desired forces to a patient's teeth) as well as the fit and comfort of the appliance. For shells such as orthodontic appliances, orthodontic retainers and orthodontic splints, the trimming of the shell may play a role in the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. When too much of the shell is trimmed, the shell may become weaker at that location and may be a point of damage when a patient removes the shell from their teeth or when the shell is removed from the mold. In some embodiments, the cut line may be modified in the digital design of the appliance as one of the corrective actions taken when a probable point of damage is determined to exist in the digital design of the appliance.

On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. In some embodiments, the cutline may be a straight line across the appliance at the gingival line, below the gingival line, or above the gingival line. In some embodiments, the cutline may be a gingival cutline that represents an interface between an appliance and a patient's gingiva. In such embodiments, the cutline controls a distance between an edge of the appliance and a gum line or gingival surface of a patient.

Each patient has a unique dental arch with unique gingiva. Accordingly, the shape and position of the cutline may be unique and customized for each patient and for each stage of treatment. For instance, the cutline is customized to follow along the gum line (also referred to as the gingival line). In some embodiments, the cutline may be away from the gum line in some regions and on the gum line in other regions. For example, it may be desirable in some instances for the cutline to be away from the gum line (e.g., not touching the gum) where the shell will touch a tooth and on the gum line (e.g., touching the gum) in the interproximal regions between teeth. Accordingly, it is important that the shell be trimmed along a predetermined cutline.

In some embodiments, the dental appliances (e.g., orthodontic appliances) herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances 712, 714, and 716. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances 712, 714, and 716 can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances 712, 714, and 716 can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances 712, 714, and 716. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances 712, 714, and 716 are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, and then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Once appliances (e.g., aligners) are directly fabricated, they may be inspected using the systems and/or methods described herein above.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 7C:
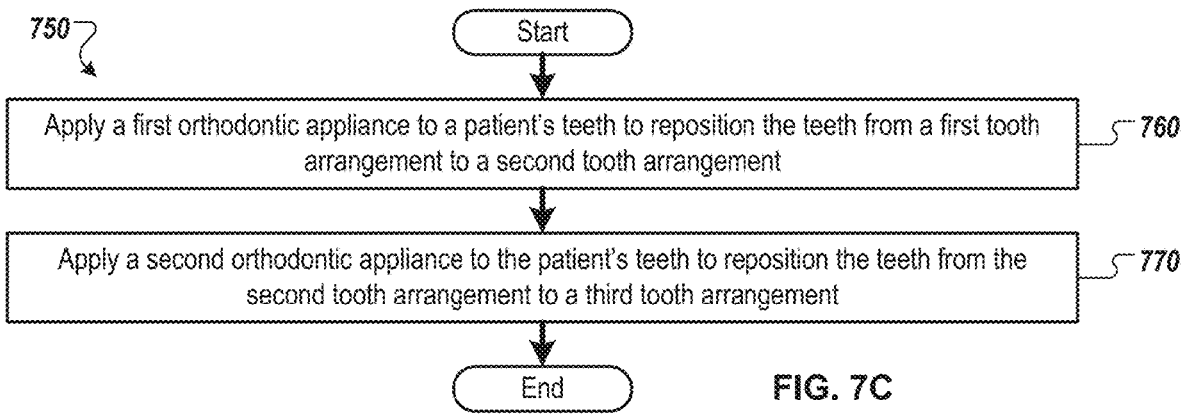
FIG. 7C illustrates a method of orthodontic treatment using a plurality of appliances, according to certain embodiments.

FIG. 7C illustrates a method 750 of orthodontic treatment using a plurality of appliances, in accordance with embodiments. One or more of the plurality of appliances may be formed on an object (e.g., object 110 of one or more of FIG. 1A-2C or 3A-B) that is formed by layers of resin on a build platform, as described herein. The method 750 can be practiced using any of the appliances or appliance sets described herein. In block 760, a first orthodontic appliance is applied to a patient's teeth in order to reposition the teeth from a first tooth arrangement to a second tooth arrangement. In block 770, a second orthodontic appliance is applied to the patient's teeth in order to reposition the teeth from the second tooth arrangement to a third tooth arrangement. The method 750 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

Figure 8:
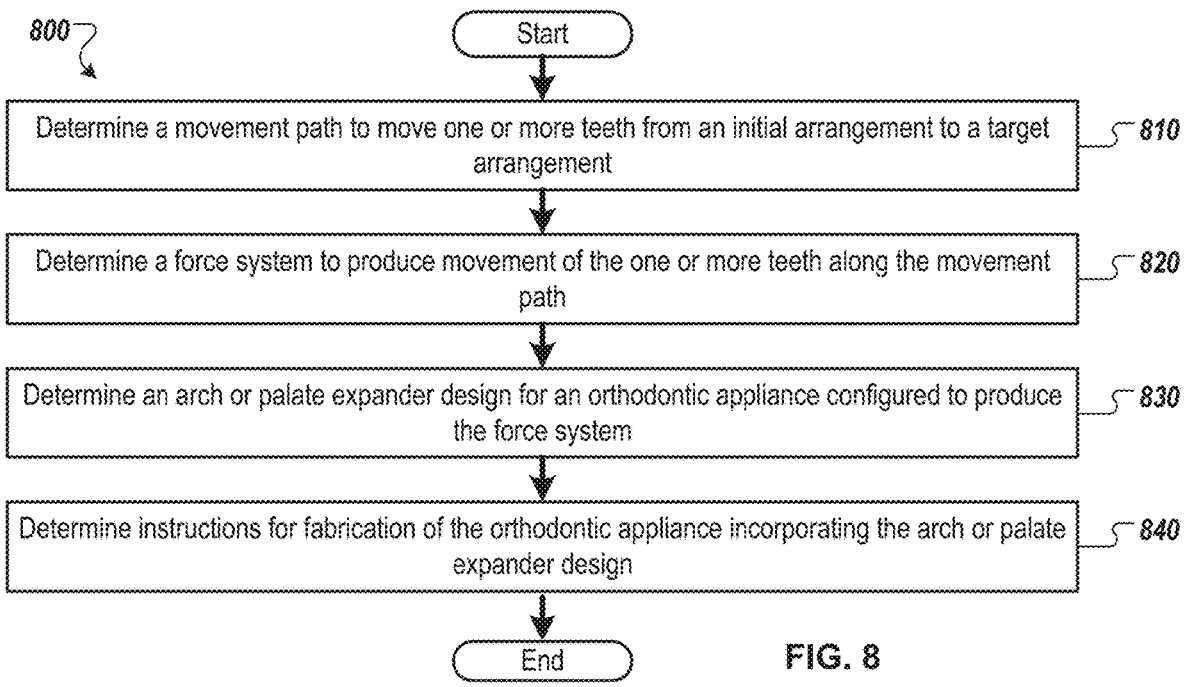
FIG. 8 illustrates a method for designing an orthodontic appliance, according to certain embodiments.

FIG. 8 illustrates a method 800 for designing an orthodontic appliance to be produced by direct fabrication, in accordance with embodiments. The method 800 can be applied to any embodiment of the orthodontic appliances described herein. Some or all of the blocks of the method 800 can be performed by any suitable data processing system or device, e.g., one or more processors configured with suitable instructions.

In block 810, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 820, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In block 830, appliance design for an orthodontic appliance configured to produce the force system is determined. Determination of the orthodontic appliance, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA (Abaqus) software products from Dassault Systémes of Waltham, MA.

Optionally, one or more orthodontic appliances can be selected for testing or force modeling. As noted above, a desired tooth movement, as well as a force system required or desired for eliciting the desired tooth movement, can be identified. Using the simulation environment, a candidate orthodontic appliance can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 840, instructions for fabrication of the orthodontic appliance incorporating the appliance design are generated. The instructions can be configured to control a fabrication system or device in order to produce the orthodontic appliance with the specified orthodontic appliance. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming. In some embodiments, the instructions for fabrication of the orthodontic appliance include instructions for forming an object (e.g., object 110 of one or more of FIG. 1A-2C or 3A-B) that is formed by layers of resin on a build platform, as described herein. The object may be a mold and the orthodontic appliance may be formed on the mold.

Method 800 may comprise additional blocks: 1) The upper arch and palate of the patient is scanned intraorally to generate three dimensional data of the palate and upper arch; and/or 2) The three dimensional shape profile of the appliance is determined to provide a gap and teeth engagement structures as described herein.

Although the above blocks show a method 800 of designing an orthodontic appliance in accordance with some embodiments, a person of ordinary skill in the art will recognize some variations based on the teaching described herein. Some of the blocks may comprise sub-blocks. Some of the blocks may be repeated as often as desired. One or more blocks of the method 800 may be performed with any suitable fabrication system or device, such as the embodiments described herein. Some of the blocks may be optional, and the order of the blocks can be varied as desired.

Figure 9:
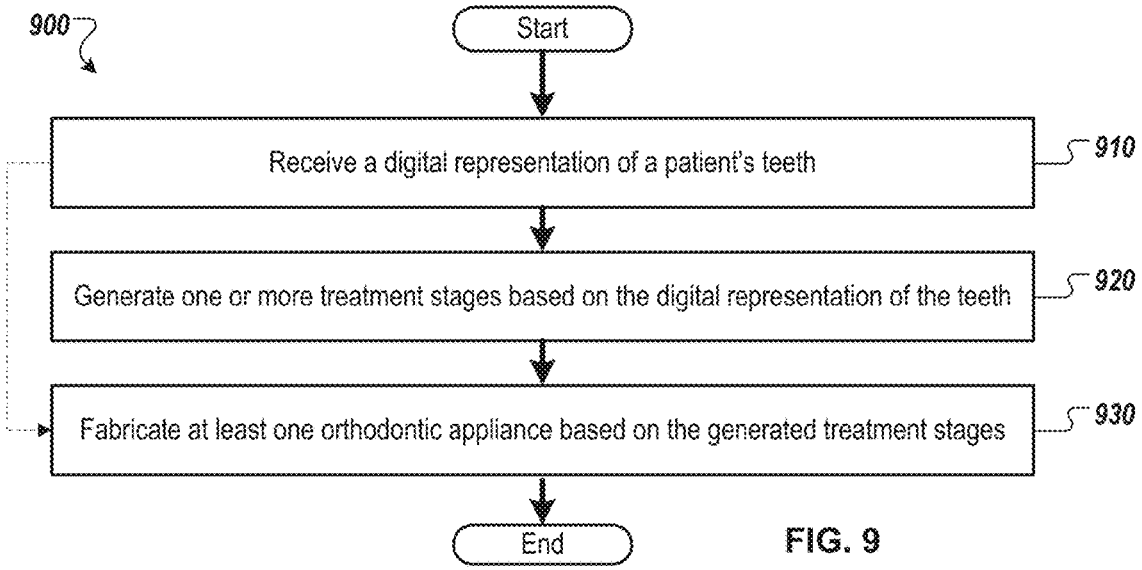
FIG. 9 illustrates a method for digitally planning an orthodontic treatment, according to certain embodiments.

FIG. 9 illustrates a method 900 for digitally planning an orthodontic treatment and/or design or fabrication of an appliance, in accordance with embodiments. The method 900 can be applied to any of the treatment procedures described herein and can be performed by any suitable data processing system.

In block 910, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 920, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 930, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired. The fabrication of the appliance may include forming an object (e.g., object 110 of one or more of FIG. 1A-2C or 3A-B) that is formed by layers of resin on a build platform, as described herein. The object may be a mold and the orthodontic appliance may be formed on the mold.

In some instances, staging of various arrangements or treatment stages may not be necessary for design and/or fabrication of an appliance. As illustrated by the dashed line in FIG. 9, design and/or fabrication of an orthodontic appliance, and perhaps a particular orthodontic treatment, may include use of a representation of the patient's teeth (e.g., receive a digital representation of the patient's teeth at block 910), followed by design and/or fabrication of an orthodontic appliance based on a representation of the patient's teeth in the arrangement represented by the received representation.

Figure 10A:
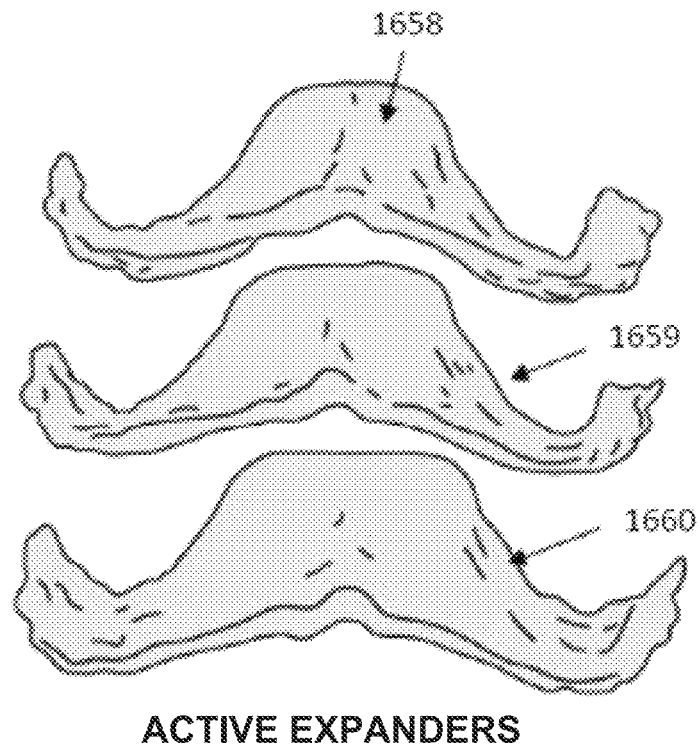
FIG. 10A illustrates a series of palatal expanders that are configured to progressively expand the suture, according to certain embodiments.
Figure 10B:
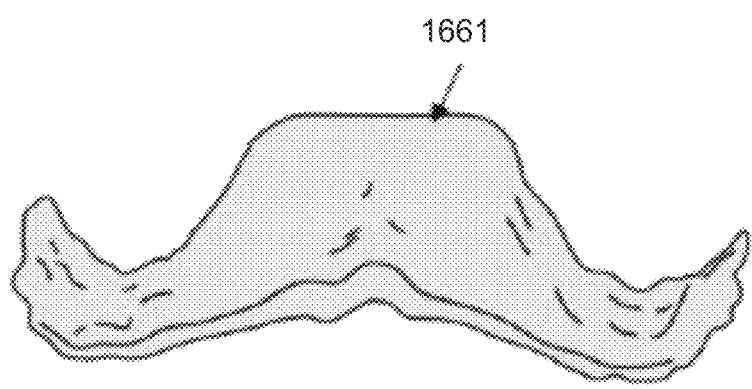
FIG. 10B illustrates a passive holder (e.g., retainer) that may be worn, for example, after the series of FIG. 10A has completed expanding the patient's palate, according to certain embodiments.

FIGS. 10A and 10B illustrate example objects that may be produced by the methods described herein. FIG. 10A shows an example of a series of palatal expanders that get progressively broader. For example, an initial upper palatal expander 1658 may have narrower palatal region than the intermediate palatal expander 1659 and a final palatal expander 1660. FIG. 10B illustrates an example of a passive holder (e.g., retainer) 1661 that may be worn after the series has completed expanding the patient's palate. In this example, the palatal expander retainer 1661 is similar or identical to the last of the palatal expanders in the sequence, although it may have a different configuration.

As mentioned above, a palatal expander as described herein can be one of a series of palatal expanders (incremental palatal expanders) that may be used to expand a subject's palate from an initial size/shape toward a target size/shape. For example, the methods and improvements described herein may be incorporated into a palatal expander or series of palatal expander as described, for example, in US20190314119A1, herein incorporated by reference in its entirety. A series of palatal expanders may be configured to expand the patient's palate by a predetermined distance (e.g., the distance between the molar regions of one expander may differ from the distance between the molar regions of the prior expander by not more than 2 mm, by between 0.1 and 2 mm, by between 0.25 and 1 mm, etc.) and/or by a predetermined force (e.g., limiting the force applied to less than 180 Newtons (N), to between 8-200 N, between 8-90 N, between 8-80 N, between 8-70 N, between 8-60 N, between 8-50 N, between 8-40 N, between 8-30 N, between 30-60 N, between 30-70 N, between 40-60 N, between 40-70 N, between 60-200 N, between 70-180 N, between 70-160 N, etc., including any range there between).

The palatal region may be between about 1-5 mm thick (e.g., between 1.5 to 3 mm, between 2 and 2.5 mm thick, etc.). The occlusal side may have a thickness of between about 0.5-2 mm (e.g., between 0.5 to 1.75 mm, between 0.75 to 1.7 mm, etc.). The buccal side may have a thickness of between about 0.25-1 mm (e.g., between 0.35 and 0.85 mm, between about 0.4 and 0.8 mm, etc.).

The dental devices described herein can include any of a number of features to facilitate the expansion process, improve patient comfort, and/or aid in insertion/retention of the dental devices in the patient's dentition. Examples of some features of dental devices are described in U.S. Patent Application Publication No. 2018/0153648A1, filed on Dec. 4, 2017, which is incorporated herein by reference in its entirety. For example, any of the dental devices described herein may include any number attachment features that are configured to couple with corresponding attachments bonded to the patient's teeth. The dental devices may have regions of varying thickness. In any of the dental devices described herein can have varied thicknesses. For example, the thickness of a palatal region may be thicker or thinner than the thickness of tooth engagement regions. The palatal region of any of the palatal expanders may include one or more cut-out regions, which may enhance comfort and/or prevent problems with speech.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, computer models (e.g., for additive manufacturing) and instructions related to forming a dental device may be stored on a non-transitory computer-readable storage medium.

The methods and apparatuses described herein may use different material, and in particular, may use different photopolymers with different material behaviors within the same device or region of a device. For example, as described above, in some variations the region of a device that engages with the subject's teeth (e.g., the "wings") may be different from the region of the device that engages with the palate (e.g., the center, central, or palatal region); in some variations these different regions may be formed of different photopolymers that may have different properties.

By using different material properties within a single device, all of the material property requirements for a dental appliance may be achieved. For a single, e.g., printed, appliance. In some examples, an appliance (a palatal expander) has flexible wing (tooth-engaging) regions that may permit low insertion forces, and may have a high modulus and a high remaining stress for the apparatus, and in particular the palatal region to achieve palatal movement. This could be achieved by changing the material during additive manufacturing (e.g., for a vat-based 3D printing process) or by changing the resin composition (e.g., for jetting-based additive manufacturing processes).

In some variations the direction of printing may be selected. For example, the printing direction for a vat-based additive manufacturing process may be from the wing region to the palatal region and back again, so that the wing region (more flexible tooth engaging region) has a higher elongate. The modulus and the remaining stress in the wings may be lower than that for the palatal region as the wing may have less impact on the required palatal movement. The increase flexibility of the wings may allow them to be applied to the teeth with lower insertion forces. In some variation the device may be printed so that the left wing portion is printed first (from the left-to-right) direction, and once the printing has extended to a height that extends into the palatal region, the resin may be changed and printed with a higher modulus material to a second height forming the palatal region. A second transition may be made to form the second (e.g., left) wing region printing in the first, lower modulus material, to the third height. Thus, any of the apparatuses described herein may include material transition regions or boundaries between lower modulus (more flexible) material and higher modulus (less flexible) material that extend in parallel lines from the front (anterior) of the device to the back (posterior) of the device; these boundaries may overlap with both wing (tooth-engaging) and palatal regions of the appliance. A second region of the device formed of a higher modulus material may extend a constant height (diameter) between the wing regions formed of a lower modulus material and may include the palatal region.

The method and features described herein may also include or be included as part of an attachment template (dental attachment template) for placing one or more dental attachments onto a subject's teeth, e.g., to help assist in securing a dental appliance to the subject's teeth. For example, described herein are attachment templates in which the dental attachment template includes stiffer (more rigid) regions that are configured to break away or apparat from more compliant regions configured as tooth-engagement (e.g., support) regions that may position the one or more attachments at predetermined and appropriate locations on the teeth. For example, the methods and features described herein may be used to modify a dental attachment structure as described in US20190298494A1, herein incorporated by reference in its entirety.

For example, the apparatuses and methods described herein may include dental attachment templates and methods of making and using them that include forming the attachment portions from a stiffer material, such as a material having a stiffness (e.g., Young's modulus) that is higher than more compliant region. For example the Young's modulus of the attachment portions may be formed of a material, as described herein, having a Young's modulus of 5 GPa or greater (e.g., 7 GPa or greater, 8 GPa or greater, 9 GPa or greater, 10 GPa or greater, 11 GPa or greater, 12 GPa or greater, 13 GPa or greater, 14 GPa or greater, 15 GPa or greater, 20 GPa or greater, 25 GPa or greater, between 5 GPa and 1000 GPa, etc.). Thus, this may result in stiffer regions for the attachments. The more compliant regions, such as the tooth-engagement regions may have a Young's modulus of less than the Young's modulus of the attachment(s), such as a Young's modulus of 10 GPa or less, 9 GPa or less, 8 GPa or less, 7 GPa or less, 6 GPa or less, 5 GPa or less, 4 GPa or less, 3 GPa or less, 2 GPa or less, 1 GPa or less, 0.5 GPa or less, 0.1 GPa or less, etc.). Thus, the tooth-engagement and attachment positioning portions of the apparatus may generally have a lower Young's modulus as compared to the attachment(s).

Any of these apparatuses may include a junction region between the attachment(s) and the tooth-engaging region, as described above. In some examples, the apparatus may include one or more interface printing areas. In general, these apparatuses may be formed as part of a single 3D printing process (e.g., in a single vat).

Figure 11A:
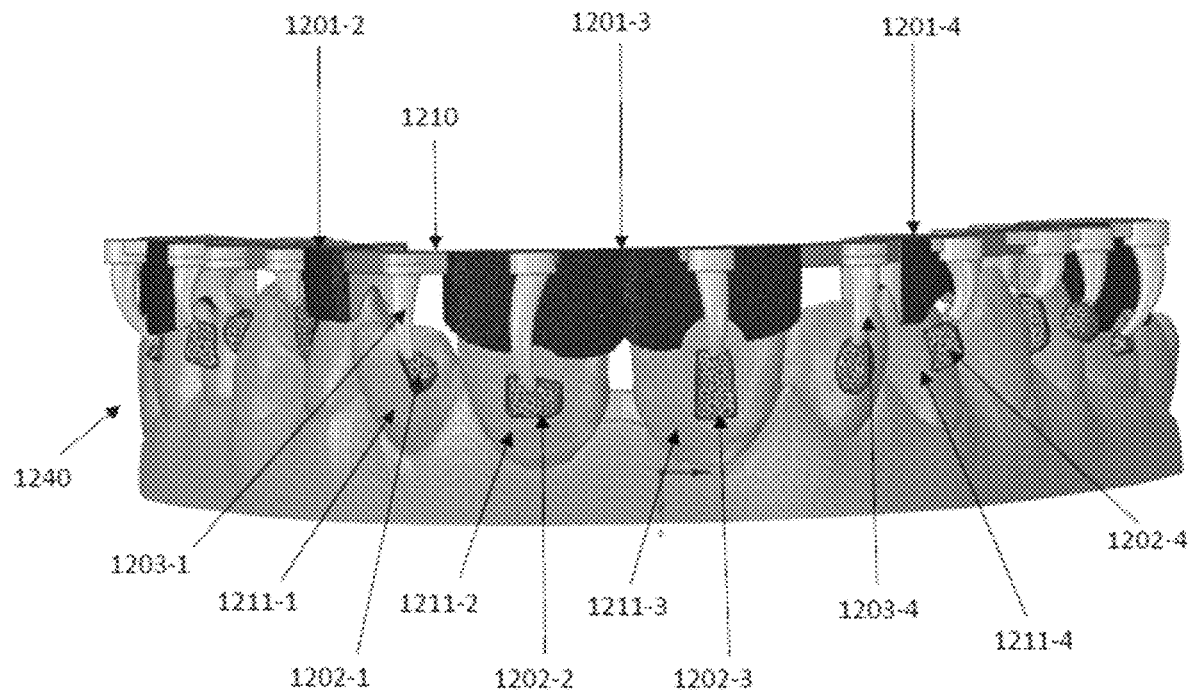
FIG. 11A illustrates a front view of a dental attachment placement structure that includes a frame and may be fabricated or configured as described herein, according to certain embodiments.
Figure 11B:
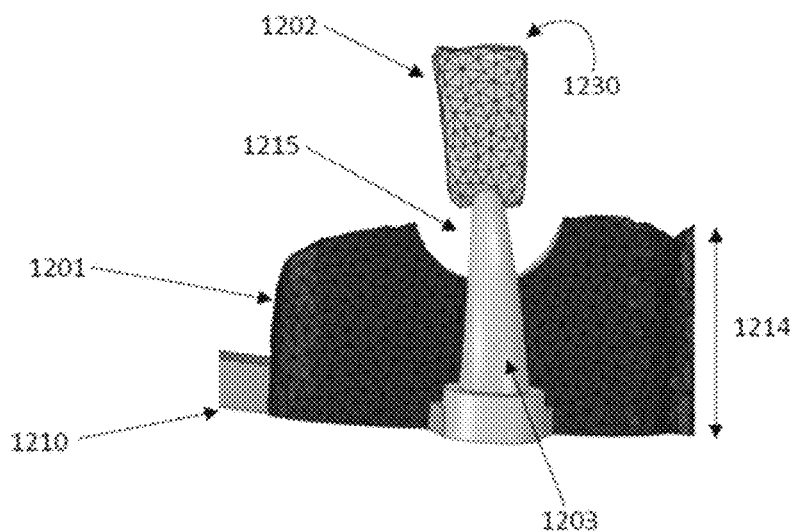
FIG. 11B illustrates a close-up view of a dental attachment of the attachment placement structure of FIG. 11A, according to certain embodiments.
Figure 11C:
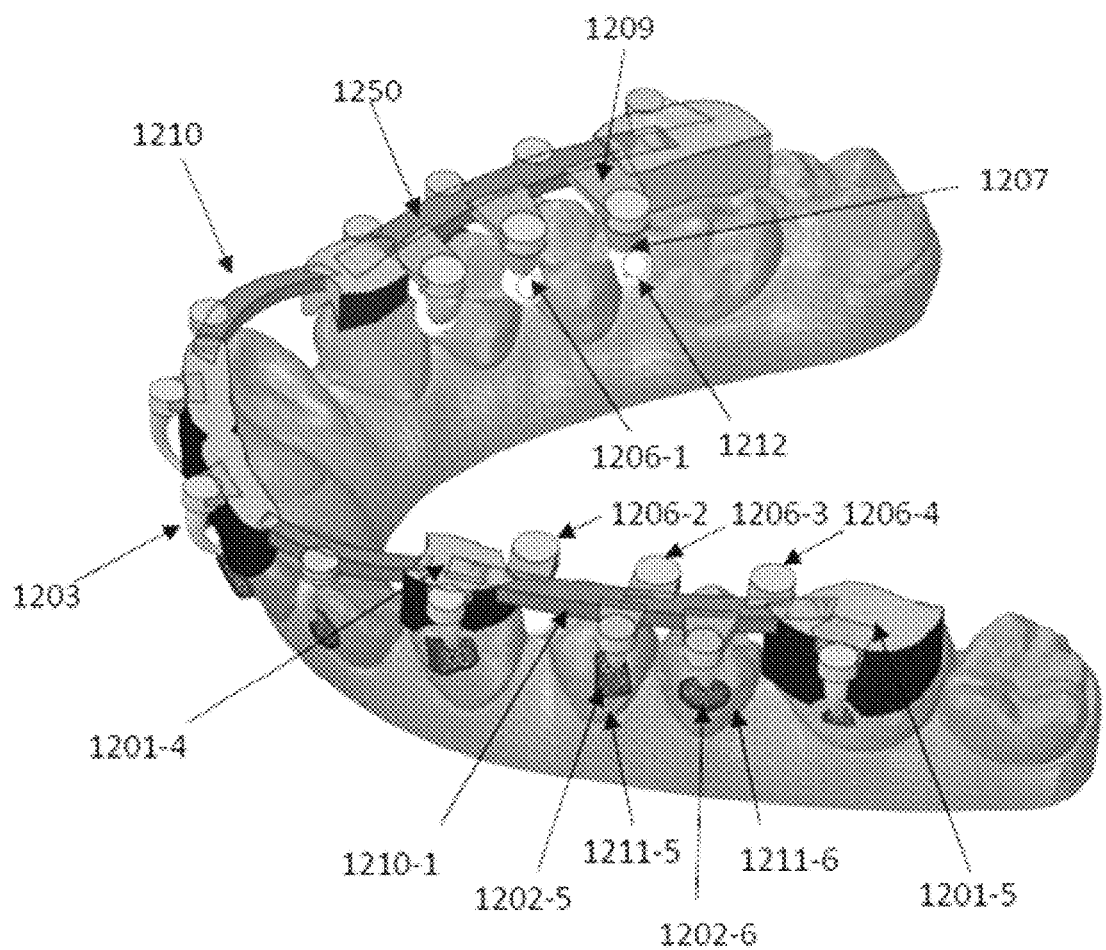
FIG. 11C illustrates a perspective side view of the dental attachment placement structure of FIG. 11A, according to certain embodiments.
Figure 11D:
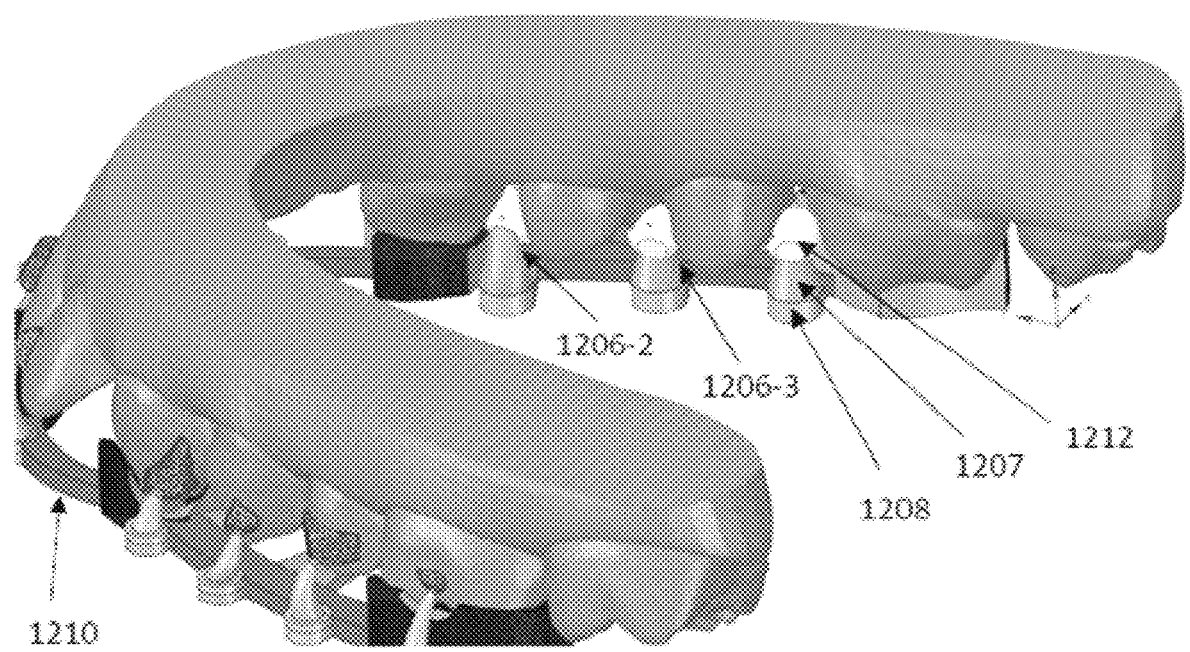
FIG. 11D illustrates an alternative perspective side view of the dental attachment placement structure of FIG. 11A, according to certain embodiments.
Figure 11E:
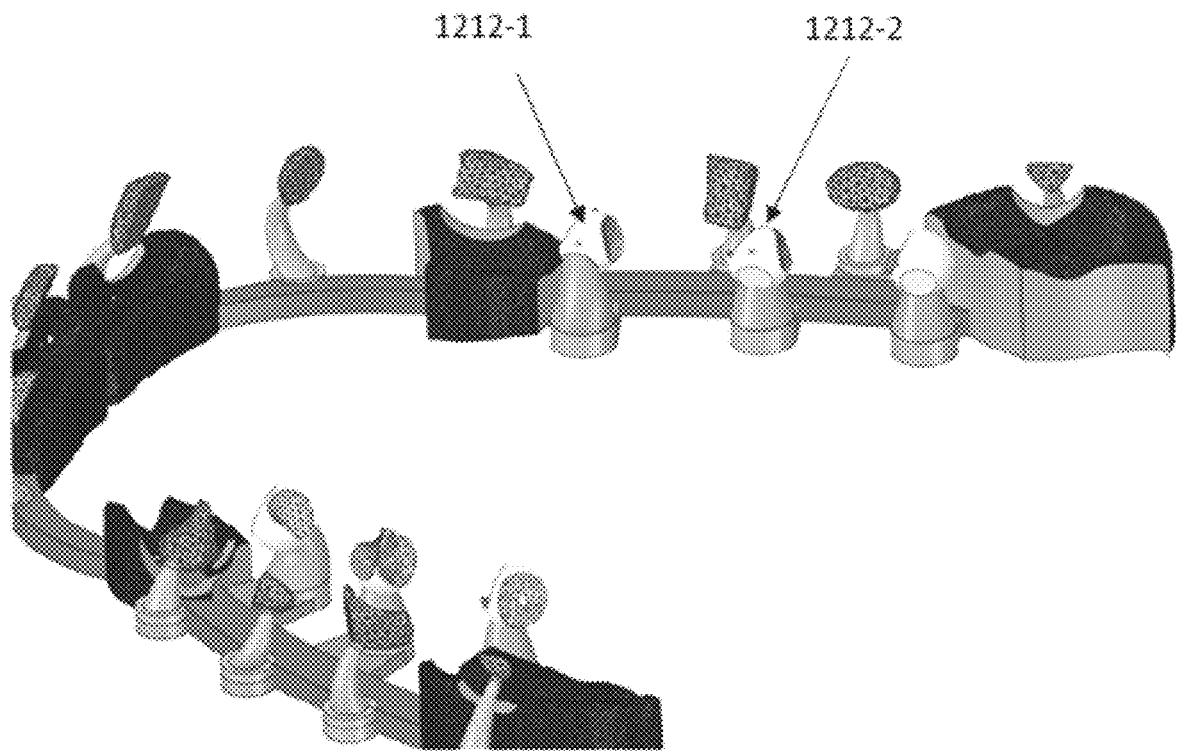
FIG. 11E illustrates a perspective side view of the dental attachment placement structure of FIG. 11A without a dental arch, according to certain embodiments.
Figure 11F:
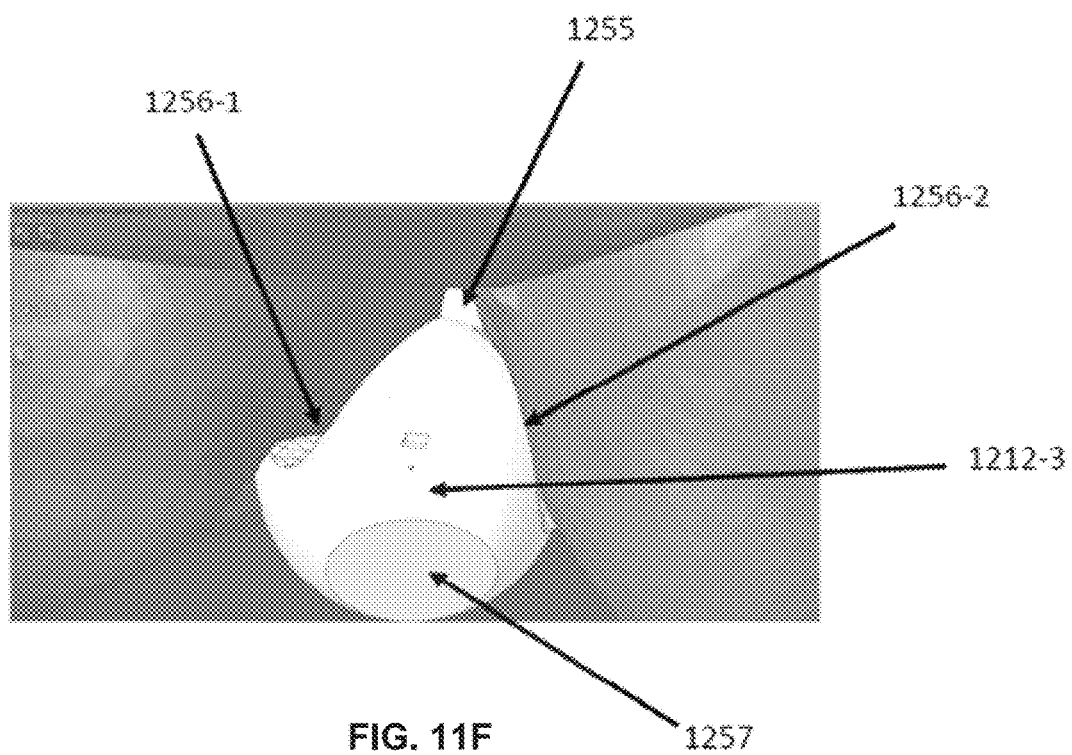
FIG. 11F illustrates a close-up view of a contact portion of a retention support of the dental attachment placement structure of FIG. 11A, according to certain embodiments.
Figure 11G:
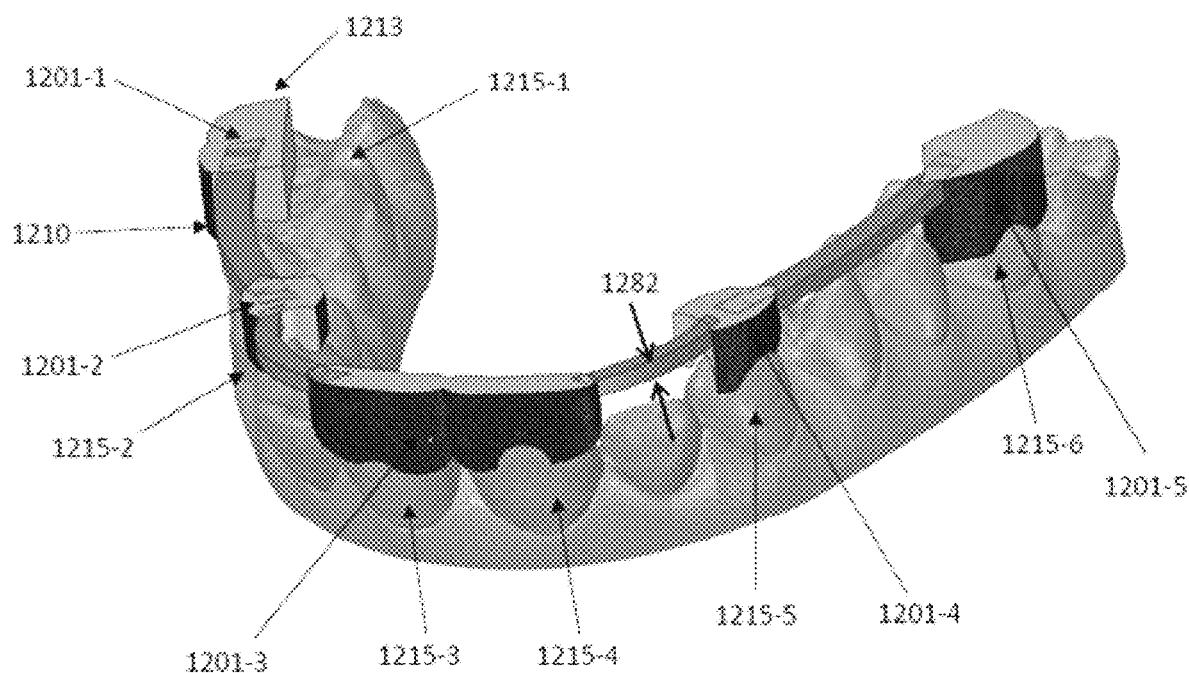
FIG. 11G illustrates a perspective side view of the frame and registration anchors of the dental attachment placement structure of FIG. 11A, according to certain embodiments.
Figure 11H:
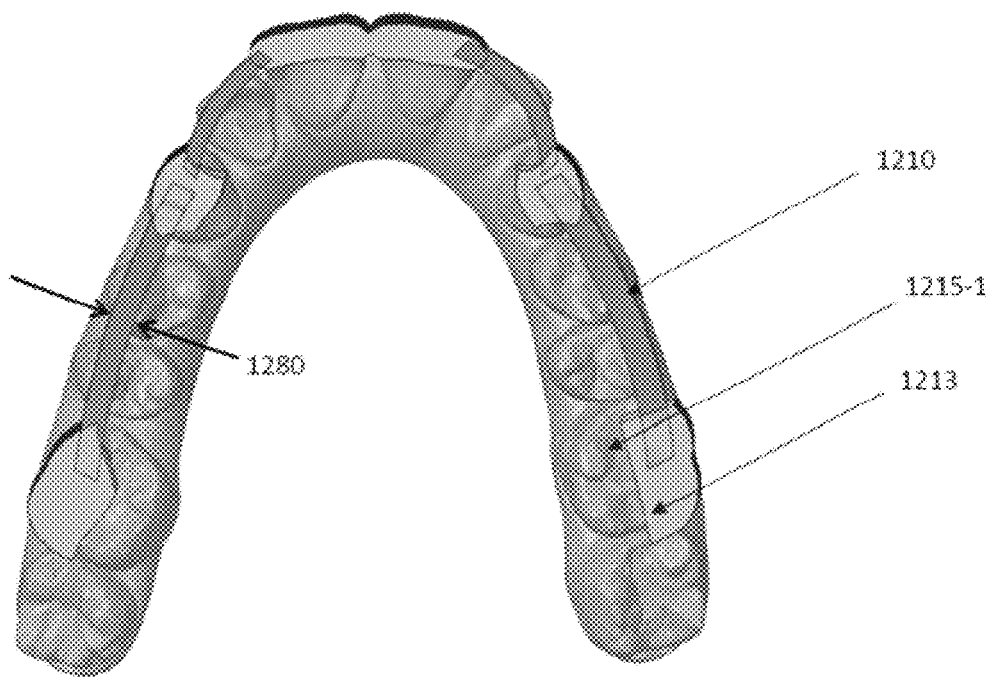
FIG. 11H illustrates an alternative perspective side view of the frame and registration anchors of the dental attachment placement structure of FIG. 11A, according to certain embodiments.
Figure 11I:
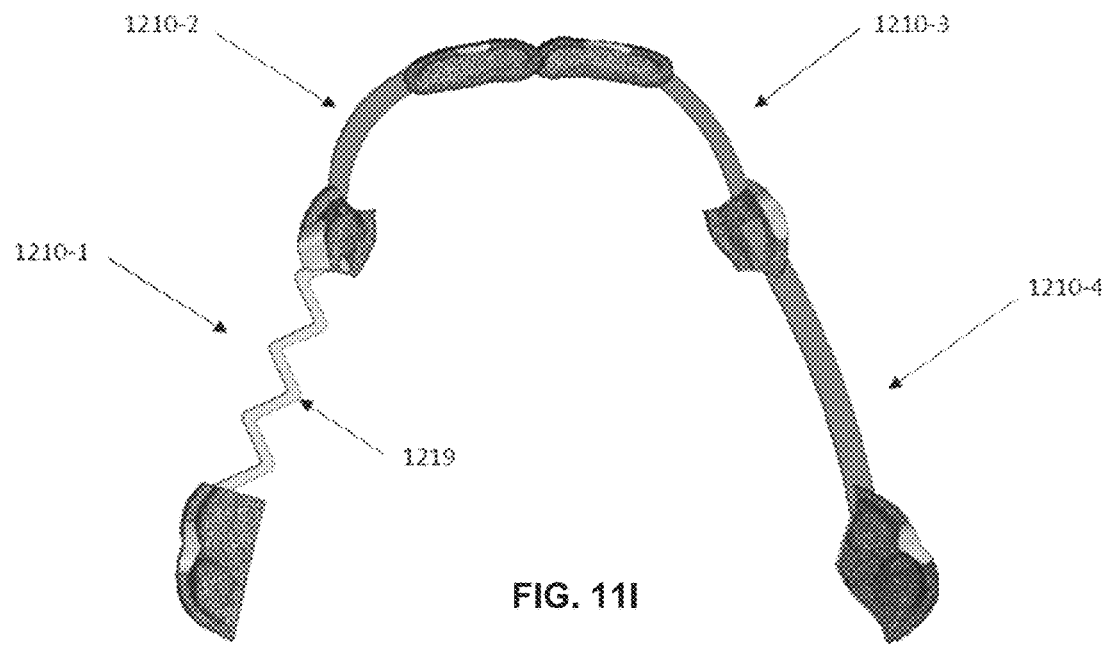
FIG. 11I illustrates an overhead view of an alternative of the dental attachment placement structure of FIG. 11A having a flexible frame portion, according to certain embodiments.
Figure 11J:
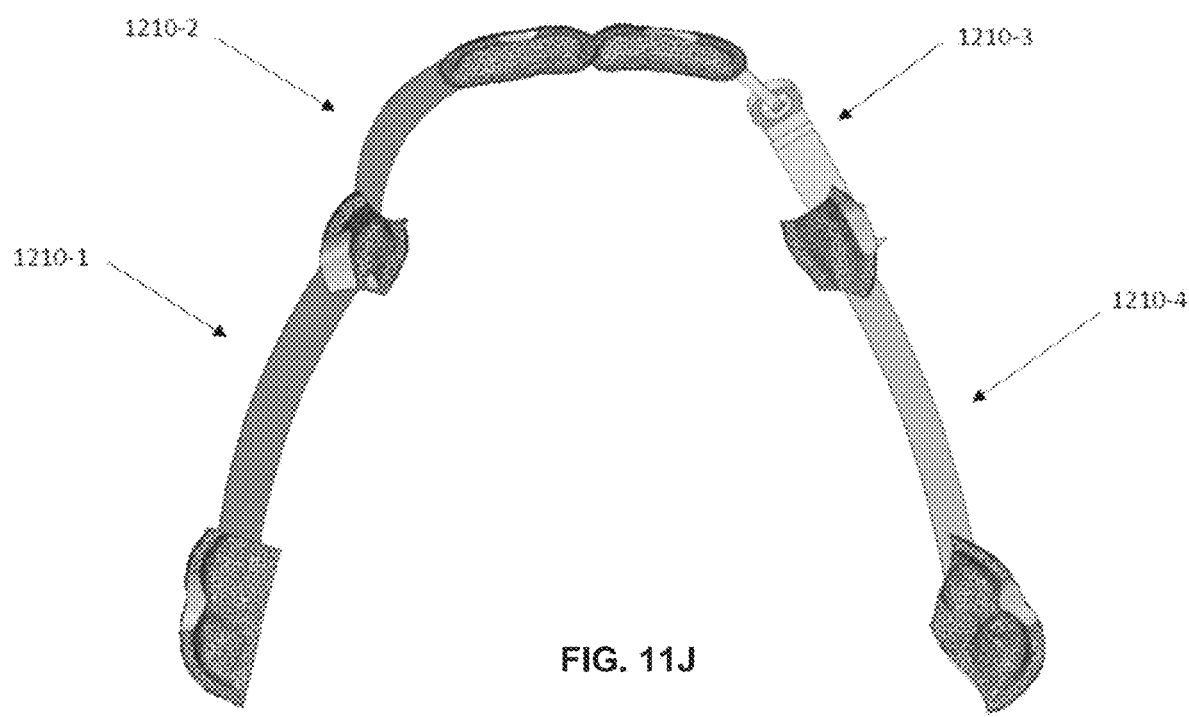
FIGS. 11J and 11K illustrate an overhead view and perspective side views of another alternative of the dental attachment placement structure of FIG. 11A having a flexible frame portion, according to certain embodiments.
Figure 11K:
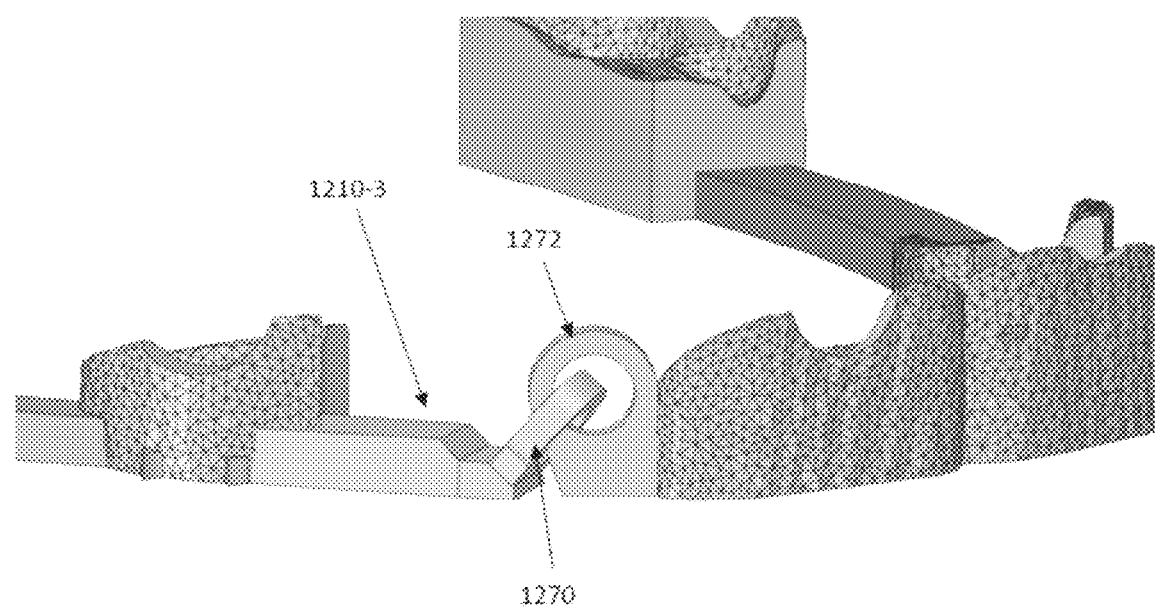
Figure 11L:
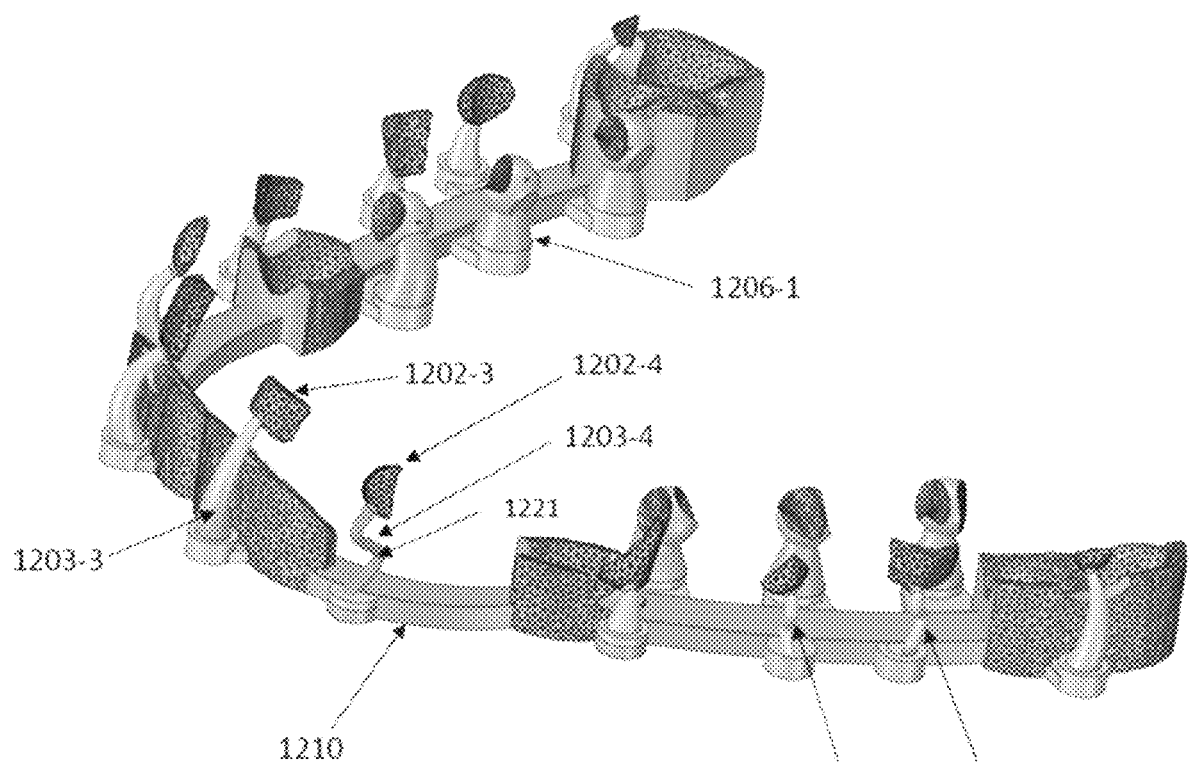
FIG. 11L illustrates a perspective side view of an alternative of the dental attachment placement structure of FIG. 11A having a flexible attachment support, according to certain embodiments.
Figure 11M:
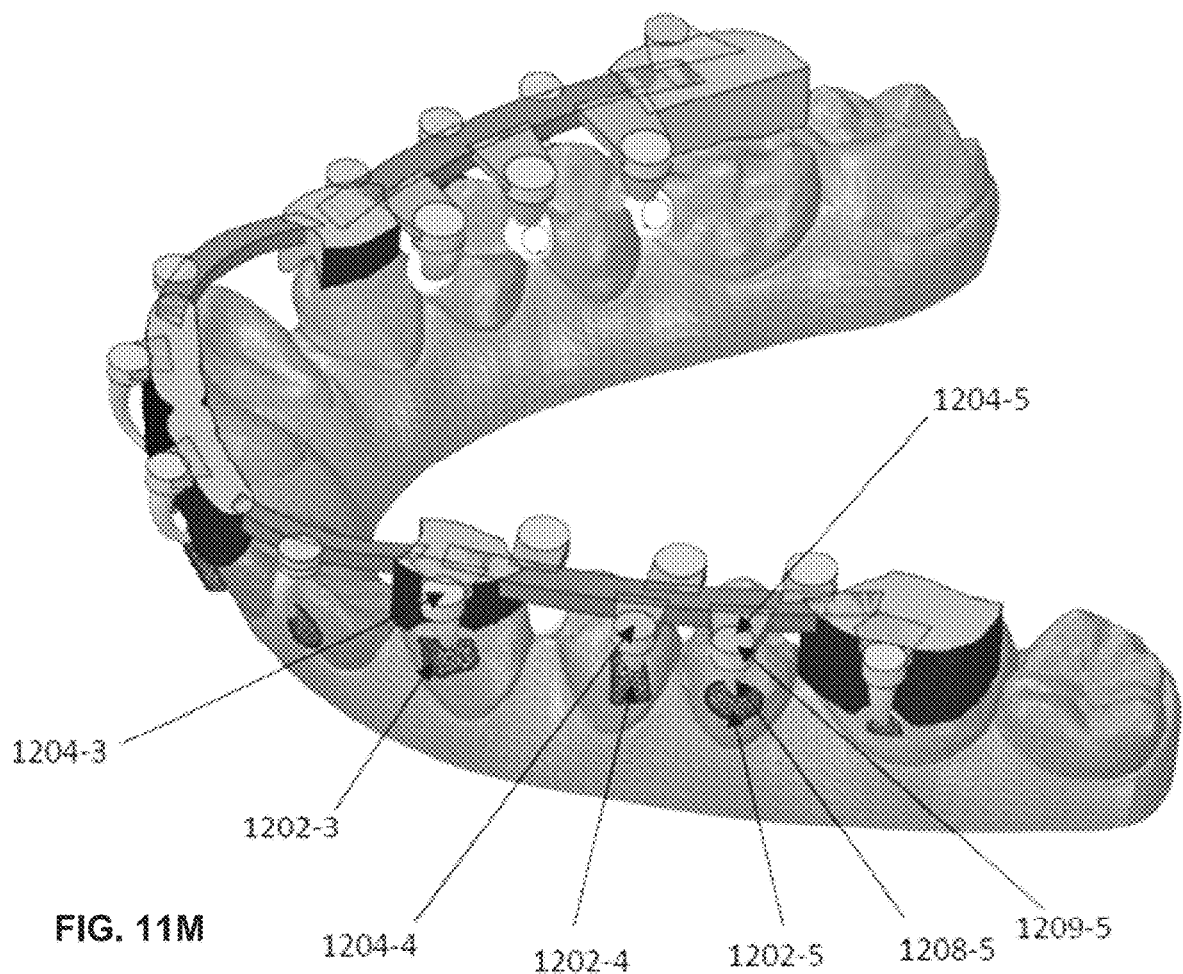
FIGS. 11M and 11N illustrate various perspective side views of the dental attachment placement structure of FIG. 11A showing aspects of the attachment supports, according to certain embodiments.
Figure 11N:
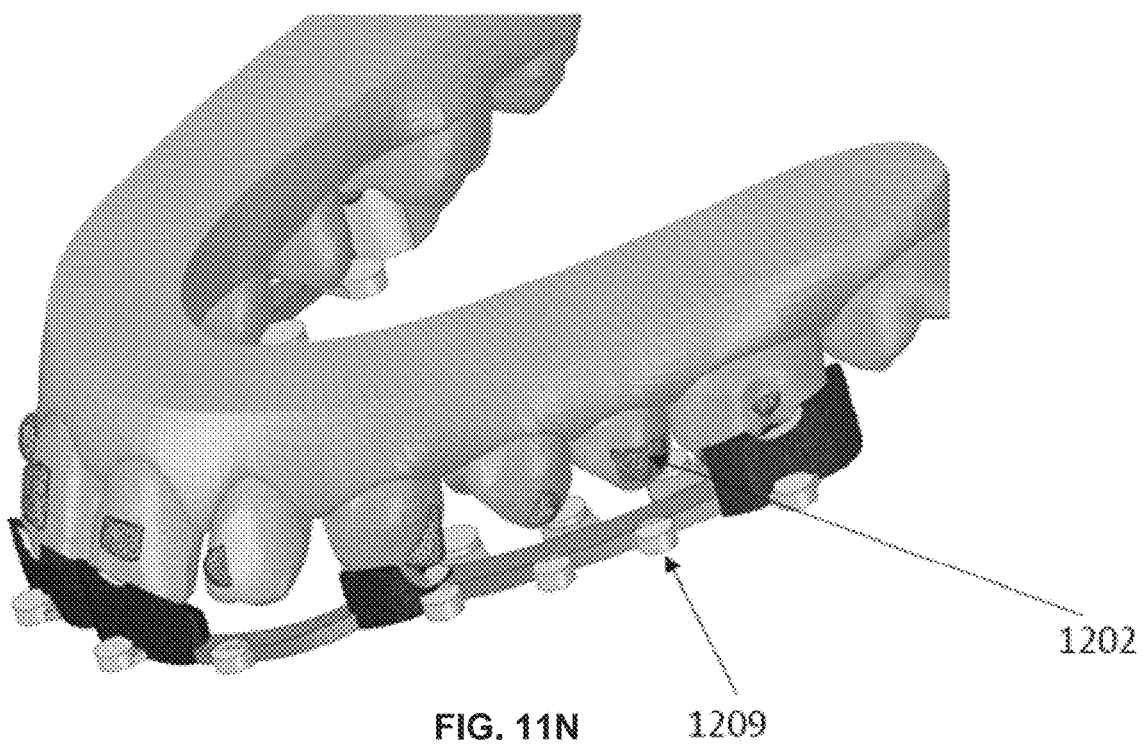

For example, FIGS. 11A-11N illustrate examples of attachments and dental attachment templates that may be formed by the methods described herein. For example, FIG. 11A illustrates a front view of a dental attachment placement structure according to a number of embodiments of the present disclosure. The structure illustrated includes several components that when used together can be beneficial in the accurate placement and orientation of one or more attachments on one or more buccal tooth surfaces of a dental arch 1240. The features illustrated in this figure are a frame 1210 configured to extend over at least a portion of the dental arch. The frame may be a solid structure that follows the shape of the dental arch of the patient, or a portion of the dental arch. The frame can support one or more extending structures that cooperate with the frame to register the one or more dental attachments (examples of which are identified as 1202-1, 1202-2, 1202-3, and 1202-4) to predetermined tooth surface position(s). The dental attachment(s) may be attached to the frame via one or more an attachment supports (examples of which are identified as 1203-1 and 1203-4). This can allow the dental attachment to extend a distance from the frame and to access the predetermined position on a corresponding tooth surface. If multiple attachments are used, the attachment supports may extend in the same direction with respect to the frame. For instance, attachment supports may extend in a downward (or upward) direction from the frame to position the supports below (or above) the frame.

The dental attachment may be removably attached to the attachment support such that the attachment can be detached from the dental attachment placement structure, for example, after the attachment is affixed to the tooth surface. An attachment may be attached to an attachment support at an interface region between the attachment and attachment support. This interface region may be configured for easy detachment. For example, the attachment support may have a thicker end close to the frame that tapers to a lesser thickness at the interface region for easier detachment. In some embodiments, detachment is accomplished using a detachment tool, as described herein. In a number of embodiments, the interface region is sufficiently frangible to allow the attachment to break away from the attachment support without the use of detachment tool. In some cases, a user may be able to detach the attachment by applying a compressive, tensile or pressing force on the attachment (e.g., by the user's hand).

The frame may also include one or more registration anchors (examples of which are identified as 1201-2, 1201-3, and 1201-4) that extend from the frame and that include contact surfaces that register with corresponding one or more teeth. When the contact surfaces of the registration anchor(s) register with corresponding teeth, the dental attachments can also register with the corresponding tooth surfaces. In some cases, the registration anchor contact surface is contoured to complement the undulations and/or grooves of a corresponding surface of one or more teeth. The contoured surface may be adapted to complement the surfaces of any type of one or more teeth, such as one or more incisors, canines, premolars, and molars. The contoured surface may be adapted to complement any side of a tooth, such as one or more lingual, occlusal, buccal, and distal tooth surfaces. In some embodiments, the registration anchor may at least partially encapsulate an incisal edge of a tooth. The registration anchor may and extend over more than one side of a tooth, such as portions of the top (e.g., crown), buccal and/or lingual sides of the corresponding tooth. In the example shown in FIG. 11A, the registration anchors extend over the top and buccal sides of corresponding teeth.

In some cases, the dental attachment is configured to attach to the same tooth as the tooth that the registration anchor is configured to contact. For instance, attachment 1202-4 is aligned with a surface of tooth 1211-4, which is the same tooth that registration anchor 1201-4 is registered with. In some cases, the registration anchor is configured to registered with a different tooth that the tooth that the dental attachment is configured to attach to. For instance, attachment 1202-1 is aligned with a surface of tooth 1211-1, which is different than tooth 1211-2 that registration anchor 1201-3 is registered with. The registration anchor may be configured to be registered with multiple teeth. For instance, registration anchor 1201-3 can adapted to be registered with surfaces of tooth 1211-2 and tooth 1211-3. When the one or more registration anchors are correctly placed on and registered with corresponding tooth surface(s), the dental attachment placement structure can be properly aligned with the dental arch, and the attachment(s) can be precisely positioned with respect to the tooth surface(s).

FIG. 11B illustrates a close-up view of an attachment portion of the dental attachment placement structure of FIG. 11A. In this example, the attachment support 1203 extends indirectly from the frame 1210 via registration the anchor 1201. This configuration can allow the attachment 1202 to be connected to the same tooth that the registration anchor 1201 is registered with. In the example shown, the registration anchor 1201 includes a clearance 1215 to provide proper positioning of the attachment 1202 without interference from the registration anchor 1201 and/or attachment support 1203. The shape and depth of the clearance 1214 may vary depending on the desired tooth position for the attachment 1202. The thickness and height 1214 of the registration anchor 1201, as well as its offset from the tooth, may also vary depending on the desired placement of attachment 1202. In some cases, the clearance 1215 provides access for the treatment professional around the attachment 1202 during, for example, the process of affixing the attachment 1202 to the tooth.

In addition to extending the attachment in a downward or upward direction away from the frame and toward the tooth, the attachment support may also align an attachment surface (e.g., 1230) of the attachment with respect to the tooth surface. In some cases, the attachment support points the attachment surface (e.g., 1230) in a direction toward the midline of the frame. For example, the attachment support may have an arched shape that orients the attachment such that the attachment surface is substantially parallel to the target tooth surface. In other embodiments, the attachment support has an angled shape. This arched or angled shape may also provide room for the user's hand or a detachment tool to access the attachment for detachment as the arched shape can bow outward. The shape and size of the dental attachment 1202 can vary depending on desired force characteristics and the shape and type of corresponding dental appliance (e.g., aligner), as described herein.

In some embodiments, the dental attachment placement structure includes one or more retention supports that extends from the frame and is configured to maintain the dental attachment(s) at the predetermined position(s). FIGS. 11C and 11D illustrate top and bottom perspective views of the dental attachment placement structure of FIG. 11A on a dental arch, showing exemplary retention supports, examples of which are identified as 1206-1, 1206-2 and 1206-3. A retention support can include a contact portion 1212 that is configured to contact one or more teeth and/or gums of the dental arch. In the example shown, the contact portion 1212 is shaped and sized to contact an interproximal region between the teeth. The contact portion can have any shape. In some cases, the contact portion has a substantially spherical shape, as shown. Other non-limiting examples shapes can include a polyhedron (e.g., tetrahedron or cube), cone, cylinder and ovoid shapes. The retention support may include an arched or angled portion that extends the dental contact portion a distance from the frame. For example, the retention support may include a horizontal portion 1209 that extends in a horizontal direction with respect to the frame 1210, and a vertical portion 1207 that extends in a vertical direction with respect to the frame 1210, which position the dental contact portion 1212 on a surface (e.g., lingual surface) of the dental arch.

In some cases, the retention support extends from a different side of the frame than the attachment support. For example, the retention support can extend from a first side of the frame and the attachment support may extend from a second side of the frame. In the example shown in FIGS. 11C and 11D, the retention supports extend from a lingual side of the frame such that the retention supports can contact a lingual portion of the dental arch, and the attachment supports (e.g., 1203) extend from a buccal side of the frame such that the attachments (e.g., 1202) can register at positions on buccal surfaces of the teeth. The retention support can support the lingual side of the frame to stabilize the position of the dental attachment placement structure on the dental arch in three-dimensions.

The frame (e.g., 1210) can be shaped and sized for following at least a portion of the dental arch. In some instances, the frame has an arched shape (e.g., U-shaped) in accordance with the dental arch. In other embodiments, the frame covers only a portion of the dental arch. The frame may be one continuous piece or may include multiple pieces that are joined together. Such sections may have a curved (e.g., arched) shape or be straight and joined together to provide a generally curved (e.g., arched) shape. Although the example shown shows frame 1210 that is adapted to follow along occlusal sides of the teeth (e.g., top of the dental arch), other variations are encompassed by the instant disclosure. For example, the frame may be adapted to follow along the lingual and/or buccal sides of the teeth (e.g. inside of the dental arch and/or outside of the dental arch). In some embodiments the frame is adapted to follow along multiple sides of the teeth (e.g., two or more of the occlusal, lingual and buccal sides). In some cases, the dental attachment placement structure includes more than one frame. For example, two or more frames may be adapted to follow along one or more of the occlusal, lingual and buccal sides of the teeth. Such variations may be included in any of the dental attachment placement structures described herein.

In some embodiments, the registration anchors register with only a subset of the teeth of the dental arch. In some examples, two or more registration anchors are used to span the frame over one or more teeth. For instance, registration anchors 1201-4 and 1201-5 extend from the frame 1210 such that they are separated by a gap portion 1210-1 of the frame. The registration anchors 1201-4 and 1201-5 are configured to register with non-adjacent teeth such that the gap portion 1210-1 of the frame spans teeth 1211-5 and 1211-6. This can allow the gap portion 1210-1 of the frame to suspend over the dental arch and allow dental attachments 1202-5, 1202-6 and retention supports 1206-2, 1206-3, 1206-4 to be positioned over their respective target teeth. This allows the dental attachment placement structure to occlude less of the dental arch than a dental attachment placement structure that covers more tooth surfaces. For instance, the treatment professional can more easily access regions around the intervening teeth 1211-5 and 1211-6 for attaching the attachments 1202-5 and 1202-6.

As described herein, the dental attachment placement structure can be formed using additive manufacturing techniques. In some cases, this involves printing portions of the dental attachment placement structure on a build plate (sometimes referred to as a build platform or base plate) of an additive manufacturing machine without the use of supports. As known, manufacturing supports are often used in 3D printing to support the 3D object on a build plate during the printing process. Such manufacturing supports are typically used to support portions of the 3D object, such as overhangs, that tend to deform during the printing process and are generally removed from the 3D object after the printing process is complete. Such manufacturing supports adds extra material, and adds extra manufacturing time and expense for removing the supports. In some embodiments, the dental attachment placement structure is printed without the use of manufacturing supports, thereby saving material, time and money. In the example shown in FIG. 11C, the frame 1210 can have a surface 1250 (e.g., top or bottom surface) that can be formed on a build plate without the use of manufacturing supports to provide the advantages described above. The surface 1250 may be a substantially flat surface in accordance with a flat build plate surface. The flat surface 1250 may correspond to a top (or bottom) surface of the dental attachment placement structure, where the attachment support(s) (e.g., 1203) and/or retention support(s) (e.g., 1206-1, 1206-2, 1206-3, 1206-4) extend with respect to a bottom (or top) surface of the frame. In some cases, portions of the attachment support(s) and/or retention support(s) can also be built on the build plate and have a correspondingly flat surface.

To use the dental attachment placement apparatus, a treatment professional can position the one or more registration anchors on corresponding tooth surfaces. In the embodiment shown in FIGS. 11A-11D, the registration anchors start at the frame and extend until the anchors encapsulate at least a portion of an incisal edge and extend over one or more sides of corresponding teeth. This positions the one or more dental attachments against corresponding tooth surfaces at predetermined positions. The one or more retention supports can also be positioned on (and in some cases, registered with) surfaces of one or more teeth (e.g., on a lingual side of the dental arch) to maintain the position of the dental attachments. The dental attachment can be affixed to the predetermined position on the tooth surface using, for example, one or more adhesives, as described herein. The dental attachments can be detached from the dental supports such that only the dental attachments from the structure remain coupled to the patient's dental arch.

FIG. 11E illustrate a perspective view of the dental attachment placement structure of FIG. 11A without a dental arch, showing aspects of various contact portions (e.g., 1212-1 and 1212-2) of retention supports. 11F shows a close-up view of a contact portion 1212-3. The contact portion can be configured to be placed in the interproximal region 1255 between adjacent teeth. The contact portion can include one or more conforming surfaces (e.g., 1256-1 and 1256-2) that is configured to conform to the shape of teeth and/or gums. The conformed shape may allow the contact portion to grip onto a surface of the dental arch (e.g., on the lingual side). The shape of the contact portion 1212 can be determined based on virtual model. For instance, a virtual sphere (or cone, tetrahedron, etc.) can be placed in a virtual model of the interproximal region (based on a scan of the patient's dentition) and subtracting regions from the virtual sphere where the teeth would be. In this process, in some embodiments, the gingiva is also taken into account. In some instances, the virtual model of the gingiva can be enlarged by a scaling factor (e.g., making the gingiva 10% larger), and thus any portions of the virtual sphere that are contacting the scaled up gingiva are subtracted from the sphere. In this manner, the contact portion of the retention feature can be formed such that its surfaces will match those of the teeth that it will be in contact with and without interfering with (e.g., contacting) the gingiva, which may cause discomfort to the patient. In some embodiments, the contact portion of the retention feature includes one or more chamfered surfaces (e.g., 1257), e.g., to reduce the amount of protrusion of the contact portion from the dental arch, which may also increase the comfort to the patient.

FIGS. 11G and 11H show alternative views of the dental attachment placement structure of FIG. 11A without the dental attachments and retention supports to allow certain features to be examined and discussed more closely and to aid the reader's understanding. One or more registration anchors (e.g., 1201-1, 1201-2, 1201-3, 1201-4 and 1201-5) can be configured to register with one or more corresponding anchor teeth (e.g., 1215-1, 1215-2, 1215-3, 1215-4, 1215-5 and 1215-6). According to some embodiments, the buccal aspect 1213 (i.e., the tallest point of the buccal surfaces of a tooth) of the one or more anchor teeth can be used as the outermost limit of the dental attachment placement structure. A thickness (e.g., 1280) and width (e.g., 1282) of the frame (or portions of the frame) can be varied such that distance between the frame and the buccal aspect 1213 is as small as practical, thereby minimizing the distance between the frame and the dental arch.

In some embodiments, one or more portions of the dental attachment placement structure is flexible in order to reduce stress concentrations in portions of the structure. Since the dental attachment placement structure may be made of brittle material (e.g., some composite materials), such flexible features can allow the structure to be more resilient and less prone to breakage while still being made of material(s) having desirable properties such as stiffness. The flexible features can reduce the occurrence of breakage during handling (e.g., during manufacture and shipping) of the structure. Having flexible features may allow more structures to be printed (e.g., on a build plate) per 3D printing run. The flexible features may also allow the structures to bend in ways that reduce the dimensions of the structures for more efficient packaging. The flexible features may also provide some tolerance so that the structure can fit on the patient's dental arch more easily. FIGS. 11G-11K show variations of the dental attachment placement structure 11A with various flexible features, in accordance with some embodiments. FIGS. 11G-11K do not show certain features, such as dental attachments and retention supports for simplicity; however, such features can be included.

FIG. 11G illustrates an overhead view of the dental attachment placement structure where a portion 1210-1 of the frame is modified to have a zig-zag or "Z" shape as an alternative to an arch shape. In other variations, the flexible portion can have a sinusoidal or "S" shaped pattern. Such geometries may allow the flexible portion 1210-1 to bend or twist in response to forces (e.g., pushing, pulling, twisting) that may be applied to the frame, thereby distributing the stress and reducing stress concentrations. One or more of portions 1210-1, 1210-2, 1210-3 and 1210-4 of the frame may include such modified curved geometry, depending on particular needs. These types of changes in geometry of the frame allow the frame (or portions thereof) to be flexible without changing the material of the frame. That is, flexible portion 1210-1 may be made of the same material as one or more of portions 1210-2, 1210-3 and 1210-4 of the frame, attachment supports, attachment supports and retention anchors. This solution may be more cost effective than manufacturing the structure with different materials having different degrees of flexibility.

FIGS. 11J and 11K illustrate a link joint alternative to the arch-shaped frame portions of FIG. 11A. The link joint can include interlocking links, such as a first link 1270 and second link 1272 denoted in FIG. 11K. The link joint can include any number of interlocking links (e.g., 2, 3, 4, 5, 6, 10, 20). The interlocking nature of the link joint may allow the links to move with respect to each other while remaining connected with each other. As with a zig-zag or sinusoidal geometry, the link joint geometry can give the frame portion 1210-3 flexibility for resisting breakage when a force (e.g., pushing, pulling, twisting) are applied to the frame. The link joint can be placed anywhere along the frame as needed, including one or more of portions 1210-1, 1210-2, 1210-3 and 1210-4 of the frame. It should be noted that the linked link joint geometry may efficiently be formed using a 3D printing process, whereby the interlocking links can be formed intact (i.e., linked).

The dental attachment placement structure may have flexible portions other than the frame. FIG. 11L illustrates an alternative variation of the structure of FIG. 11A having flexible attachment supports 1203-4, 1203-5 and 1203-6. As opposed an attachment support which tapers from a thicker diameter near the frame to a thinner diameter near the attachment (e.g., 1203-3), the flexible attachment supports may be thinner in diameter and have a sinusoidal or zig-zag shape that provides increased flexibility and resilience in response to an applied force (e.g., pushing, pulling, twisting). Having a more flexible attachment support can also allow for more maneuverability of the attachment (e.g., 1203-4) by the treatment specialist during placement and affixing of the attachment, and may reduce the risk of the attachment support being accidently adhered to the tooth surface. The flexible attachment support can have any shape and is not limited to the sinusoidal or zig-zag shape shown in FIG. 11K. For example, a spring (e.g., spiral), arc, bow or hook shape may also provide a desired amount of flexibility. The dental attachment placement structure can have any number of flexible attachment supports (e.g., 1, 2, 3, 4, 5, 8, 10). In some cases, one or more of the retention supports (e.g., 1206-1) may have a flexible geometry (e.g., sinusoidal or zig-zag shape).

According to some embodiments, the material forming the one or more features of the dental attachment placement structure provides flexibility. In some embodiments, a lattice structure can be incorporated into one or more portions of any of the dental attachment placement structures described herein. The lattice structure can include cavities that can increase the flexibility and/or reduces material consumption and weight of the structure. The lattice structure is incorporated into one or more of the frame, registration anchors, attachments, attachment supports, retention supports, or other portion of a dental attachment placement structure. As such, the rigidity or flexibility of the elements can be adjusted based upon the desired implementation.

A dental attachment placement structure may include any combination of the flexible features of FIGS. 11G-11L. For example, the structure can include one or more flexible frame portions 1219 (e.g., FIG. 11I), one or more flexible attachment supports 1221 (e.g., FIG. 11L) and/or one or more flexible retention supports. The number of flexible features can vary depending on particular needs. Generally, the structure may have some flexibility to resist breakage and rigid enough to support and maintain the attachment(s) when placed on a patient's dental arch. In some embodiments, the flexible features are made of the same material as other portions of the structure, as described above. The flexibility may arise, at least in part, due to the shape; e.g., sinusoidal, zig-zag, etc. shapes may be used. In some embodiments, the flexible features are made of a different material (e.g., more flexible) than other portion of the structure.

As described herein, the dental attachment placement structure can be formed based on a virtual model. According to some embodiments, the location and orientation of the frame and other features of the structure are determined based on the location of the dental attachments in the virtual model. FIGS. 11M and 11N illustrate one example of how features of the dental attachment placement structure of FIG. 11A can be formed from a virtual model. The side perspective view of FIG. 11M illustrates a side perspective view of the structure showing how the attachment support 1204-5 that supports attachment 1202-05 can include a base portion 1209-5 and a bridge portion 1209-5. Although not necessary in all embodiments, the base portion 1209-5 can be a solid, extruded, circular structure. The diameter and thickness of the attachment support may vary. The base portion 1209-5 may have a greater thickness (e.g., diameter) than the bridge portion 1208-5.

To determine the location and orientation of the frame 1210, a center of the attachment 1202-3 can be located and projected vertically until it intersects with the plane of the frame 1210. This point can be used as a reference (e.g., correspond to the center of a circle) used to create the base portion 1209-5, thereby informing the location and orientation of the frame 1210. The bridge portion 1209-5 can be formed to connect the base portion 1209-5 to the frame or registration anchor. The dental attachments 1202-4 and 1202-5 can likewise be used to create corresponding base portions and bridge portions for connecting the attachment supports 1204-4 and 1204-5 to the frame or a registration anchor, as well as the remaining dental attachments and attachment supports, until the location and orientation of the entire frame 2101 is determined. During, for example a 3D printing process, the attachment support may be centered under the dental attachment. FIG. 11N illustrates a different view of a base portion 1209 of an attachment support (without the bridge portion) with respect to a corresponding attachment 1202.

Also described herein are dental appliances, e.g., aligners, including one or more mandibular advancement elements. Any of the aligners described herein may include one or more mandibular advancement elements (e.g., mandibular advancement blocks). In some examples, the mandibular advancement element/block may have a stiffness (e.g., Young's modulus) that is greater than that of the more compliant tooth-engagement regions of the aligner. In general, in any of the apparatuses described herein the Young's modulus of the stiffer portion (e.g., the mandibular advancement block) may formed of a material, as described herein, having a Young's modulus of 5 GPa or greater (e.g., 7 GPa or greater, 8 GPa or greater, 9 GPa or greater, 10 GPa or greater, 11 GPa or greater, 12 GPa or greater, 13 GPa or greater, 14 GPa or greater, 15 GPa or greater, 20 GPa or greater, 25 GPa or greater, between 5 GPa and 1000 GPa, etc.). The more compliant regions, such as the tooth-engagement regions, may have a Young's modulus of less than the Young's modulus of the attachment(s), such as a Young's modulus of 10 GPa or less, 9 GPa or less, 8 GPa or less, 7 GPa or less, 6 GPa or less, 5 GPa or less, 4 GPa or less, 3 GPa or less, 2 GPa or less, 1 GPa or less, 0.5 GPa or less, 0.1 GPa or less, etc.). Thus, the tooth-engagement regions of the apparatus may generally have a lower Young's modulus as compared to the stiffer portions (e.g., attachment(s), mandibular advancement block(s), etc.).

Figure 12A:
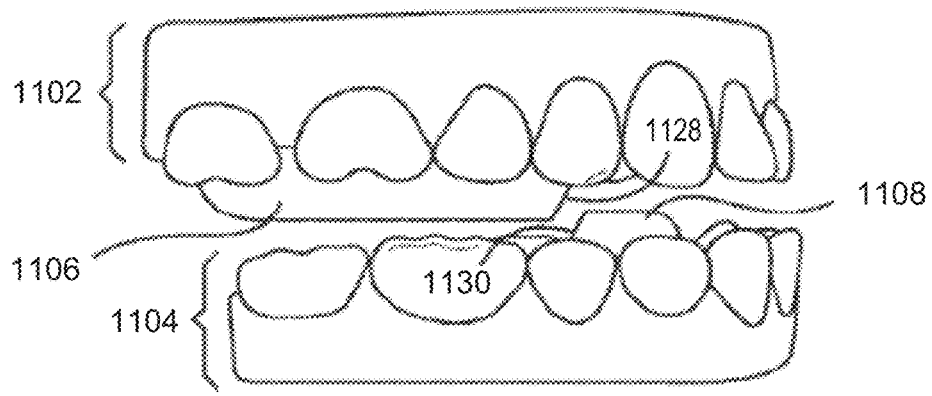
FIG. 12A shows a side view of an upper jaw with a first mandibular repositioning jaw element and a lower jaw with a repositioning jaw element, according to certain embodiments.
Figure 12B:
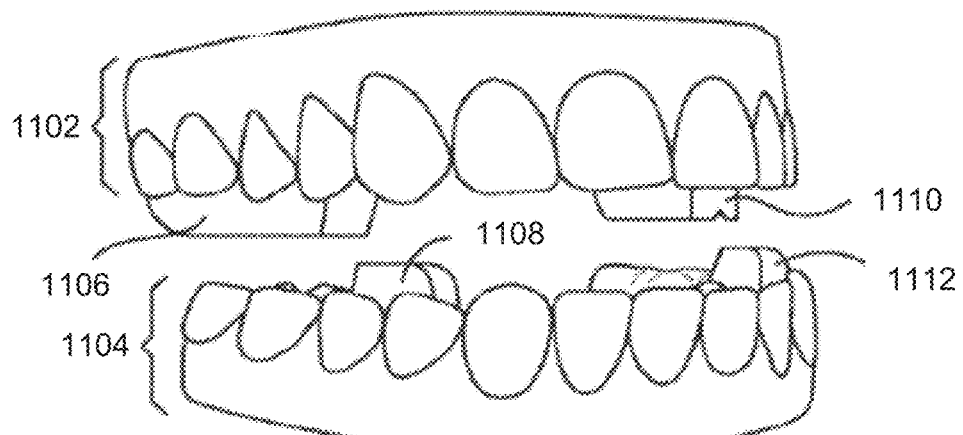
FIG. 12B illustrates a front view of an upper jaw with a first repositioning jaw element and a third repositioning jaw element and a lower jaw with a second repositioning jaw element and a fourth repositioning jaw element, according to certain embodiments.
Figure 12C:
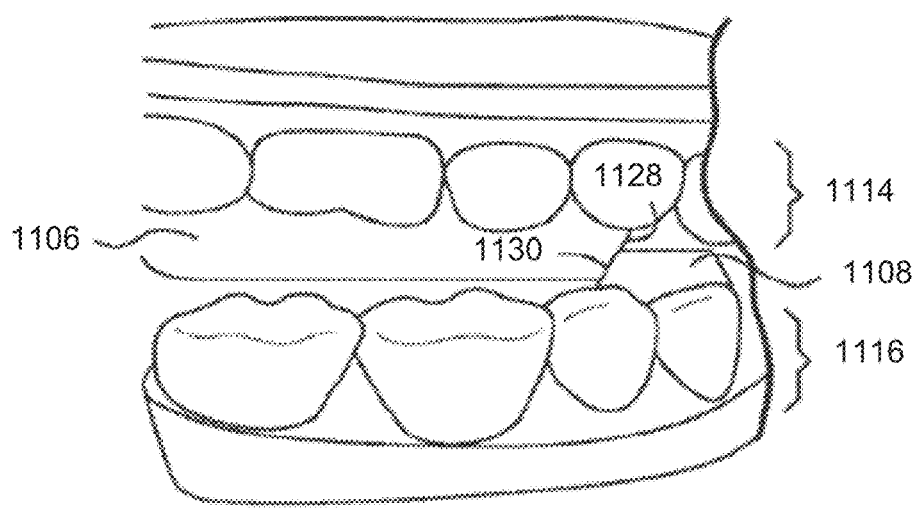
FIG. 12C illustrates a side view of a first aligner shell with a first repositioning jaw element (mandibular repositioning block) and a second shell with a second repositioning jaw element (mandibular repositioning block), according to certain embodiments.

FIGS. 12A-12C illustrate one example of an aligner appliance including mandibular advancement blocks that may be produced by the methods described herein. Examples of mandibular advancement blocks and appliances including them may be found, for example, in U.S. 20180132975A1, herein incorporated by reference in its entirety. FIG. 12A illustrates a side view of an upper jaw 1102 with a first repositioning jaw element 1106 and a lower jaw 1104 with a second repositioning jaw element 1108 according to a number of embodiments of the present disclosure. The upper jaw 1102, the first repositioning jaw element 1106, the lower jaw 1104, and the second repositioning jaw element 1108 illustrated in FIG. 12A include virtual images of jaws and repositioning jaw elements, respectively (e.g., virtual jaws and/or virtual repositioning jaw elements), as discussed further herein. The upper jaw 1102 can include a maxilla, its related soft and hard tissues, and can include a number of teeth of a patient's upper dentition. The lower jaw 1104 can include a mandible, its related soft and hard tissues, and can include a number of teeth of the patient's lower dentition.

In some instances, the patient may exhibit abnormal occlusion or malocclusion. For instance, this may include a jaw (or both) that is protrusive, retrusive, or laterally displaced. As an example, positioning of the number of teeth of the patient's upper dentition and the number of teeth of the patient's lower dentition can be such that the best fit of the upper dentition with the lower dentition results in a misalignment of the lower jaw 1104 relative to the upper jaw 1102 either in positional relations or at the level of the jaw joint which connects the lower jaw 1104 to the upper jaw 1102. The lower jaw 1104 can be in a retruded position, for instance, resulting in a distance (e.g., space) between the front teeth of the upper dentition and the front teeth of the lower dentition (e.g., an increased overjet). Correction of the malocclusion can be beneficial to the patient in terms of improved chewing ability, reduced premature wear of the teeth, and/or improved facial aesthetics.

In some embodiments, the upper jaw 1102 and lower jaw 1104 illustrated in FIG. 12A can include a virtual model of the patient's upper jaw and lower jaw. A virtual model of one or more dental appliances (e.g., an appliance for the upper dentition and an appliance for the lower dentition which may also be connected together) each having a shell configured to reposition a number of teeth of the patient can be provided. The virtual model of the dental appliance can include a virtual model of a dental appliance configured to reposition the number of teeth of the patient.

Repositioning jaw elements can be positioned on occlusal, buccal, and/or lingual surfaces of a dental appliance to be placed over the patient's teeth. A repositioning jaw element, as used herein, can include a portion of material (e.g., a geometric shaped element, such as a block shape) extending from a surface of the shell of the appliance, as discussed further herein. For instance, a virtual repositioning jaw element can be positioned on the shell of the virtual model of the dental appliance parallel to a bite plane of the patient. A bite plane, as used herein, can include a surface from the incisal edges of the incisors and the tips of the occluding surfaces of the posterior teeth that is a mean of the curvature of the surface.

In some embodiments, the position of the virtual repositioning jaw element can be revised to align with a midline (e.g., middle) of at least one tooth of the number of teeth wherein the virtual repositioning jaw element extends from a surface of the shell of the virtual model of the dental appliance. However, embodiments in accordance with the present disclosure are not so limited and the virtual repositioning jaw elements may not be aligned with a midline of the at least one tooth in various embodiments. The virtual model of the dental appliance, including the virtual repositioning jaw element, can be used to determine a treatment plan for the patient and/or to form a physical dental appliance and/or physical repositioning jaw element (e.g., as discussed further herein).

The physical repositioning jaw element can be formed of a variety of material types. In some embodiments, the physical repositioning jaw element can be formed of the same material as the shell of the dental appliance (e.g., a polymeric material). For instance, the physical repositioning jaw element can be formed integrally with the shell and/or formed of a same material as the shell.

The repositioning jaw elements can also be positioned in different places, in some embodiments. For example, the first repositioning jaw element 1106 and the second repositioning jaw element 1108 can be positioned near occlusal surfaces of the teeth of the patient to advance the placement of the lower jaw 1104 in a forward direction (e.g., in an anterior direction and/or toward a patient's lips) or in a backward direction (e.g., in a posterior direction and/or towards the back of the patient's head). For instance, occlusal surfaces of teeth of the upper jaw 1102 and lower jaw 1104 can be separated using the first repositioning jaw element 1106 and the second repositioning jaw element 1108 to move (e.g., to move sagittally) the lower jaw 1104 of the patient from an articulation path during opening (e.g., the path that the jaw currently follows when opening) to a desired range of jaw opening extending from an advanced or forward position of occlusion, as described further herein. As an example, the first repositioning jaw element 1106 can include a first surface 1128 and the second repositioning jaw element 1108 can include a second surface 1130 to interface, interact, and/or otherwise engage with the first surface 1128 of the first repositioning jaw element 1106, as discussed further herein. By moving the lower jaw 1104, muscles associated with movement of the lower jaw 1104 can be retrained to a new position (generally in a forward and/or downward direction, or in a backward direction) or the lower jaw may be permitted to grow more fully if the patient has not fully developed skeletally.

FIG. 12B illustrates a front view of an upper jaw 1102 with a first repositioning jaw element 1106 and a third repositioning jaw element 1110 and a lower jaw 1104 with a second repositioning jaw element 1108 and a fourth repositioning jaw element 1112 according to a number of embodiments of the present disclosure. A front view, as used herein, can include an anterior view and/or a more anterior view of the jaws as compared to a side view. The upper jaw 1102, the first repositioning jaw element 1106, the third repositioning jaw element 1110, the lower jaw 1104, the second repositioning jaw element 1108, and the fourth repositioning jaw element 1112 illustrated in FIG. 12B can include virtual images of jaws and repositioning jaw elements, respectively (e.g., virtual jaws and/or virtual repositioning jaw elements), as discussed further herein. As illustrated by FIG. 12B, two repositioning jaw elements (e.g., the first repositioning jaw element 1106 and the third repositioning jaw element 1110) can be positioned near (e.g., adjacent to) occlusal surfaces of the upper jaw 1102 and two repositioning jaw elements (e.g., the second repositioning jaw element 1108 and the fourth repositioning jaw element 1112) can be positioned near occlusal surfaces of the lower jaw 1104.

The first repositioning jaw element 1106 can be positioned near the occlusal surfaces of the posterior teeth (in the embodiment illustrated by FIG. 12B, the molars and/or bicuspids) of the upper jaw 1102 and the second repositioning element 1108 can be positioned near the occlusal surfaces of the posterior teeth (in the embodiment illustrated by FIG. 12B, the bicuspids) of the lower jaw 1104. The first repositioning jaw element 1106 and second repositioning jaw element 1108 can be located near a first posterior side of the patient's dentition.

The first repositioning jaw element 1106 and the second repositioning jaw element 1108 can include surfaces that can interface, interact, and/or engage with a surface of a repositioning jaw element on a shell of an opposing jaw. For instance, a first surface of the first repositioning jaw element 1106 can interface, interact, and/or engage with a second surface of the second repositioning jaw element 1108. A surface, as used herein, can include a side and/or end surface of a repositioning jaw element. In some embodiments, the first surface can include a slanted surface on a mesial-facing surface of the first repositioning jaw element 1106 and/or the second surface can include a slanted surface on a distal-facing surface of the second repositioning jaw element 1108, for instance. For example, a mesial-facing surface can include a surface of a repositioning jaw element that is in a direction toward the anterior midline of the teeth. A distal-facing surface can include a surface of a repositioning jaw element that is in a direction toward the last tooth in each quadrant of a dental arch. However, embodiments in accordance with the present disclosure are not so limited. A mesial-facing surface, in some embodiments, can be facing toward the facial plane (e.g., normal to the facial plane), whereas a distal-facing surface can be facing away from the facial plane (e.g., normal to the facial plane but in the opposite direction). The surfaces of the repositioning jaw elements, in accordance with embodiments of the present disclosure, can be oriented in a variety of directions.

The third repositioning jaw element 1110 can be positioned near the occlusal surfaces of the posterior teeth (in embodiment illustrated by FIG. 12B, molars and/or bicuspids) of the upper jaw 1102 and the fourth repositioning jaw element 1112 can be positioned near the occlusal surfaces of the posterior teeth (in the embodiment illustrated by FIG. 12B, bicuspids) of the lower jaw 1104. The third repositioning jaw element 1110 and the fourth repositioning jaw element 1112 can be located near a second posterior side of the patient's dentition. The third repositioning jaw element 1110 and the fourth repositioning jaw element 1112 can include surfaces that can interface, interact, and/or engage with a surface of a repositioning jaw element on an opposite jaw. For instance, a third surface of the third repositioning jaw element 1110 can interface, interact, and/or engage with a fourth surface of the fourth repositioning jaw element 1112. The third surface can include a slanted surface on a mesial-facing surface of the third repositioning jaw element 1110 and the fourth surface can include a slanted surface on a distal-facing surface of the fourth repositioning jaw element 1112, for instance.

However, embodiments in accordance with the present disclosure are not so limited. For instance, the surfaces of the repositioning jaw elements 1106, 1108, 1110, 1112 can be oriented in a variety of directions. For instance, the first surface of the first repositioning jaw element 1106 and the third surface of the third repositioning jaw element 1110 can include distal-facing slanted surfaces and/or the second surface of the second repositioning jaw element 1108 and the fourth surface of the fourth repositioning jaw element 1112 can include mesial-facing slanted surfaces, among other orientations.

The surfaces (e.g., that interact and/or interface) of the repositioning jaw elements 1106, 1108, 1110, 1112 can be angled, in various embodiments, to guide the lower jaw 1104 into position and gain desired lateral or prevent unwanted lateral movement. The surfaces can be angled in buccal-lingual and/or mesial-distal direction, for example. The angle of interacting and/or interfacing surfaces (e.g., two surfaces that are designed to interface, interact, and/or engage with each other either actively or passively) can have the same degree and/or slant or a different degree and/or slant.

For example, the first surface of the first repositioning jaw element 1106 and the second surface of the second repositioning jaw element 1108 can interface at a first slant. The slant can include, for instance, a degree of angle of the repositioning jaw elements. The third surface of the third repositioning jaw element 1110 and the fourth surface of the fourth repositioning jaw element 1112 can interface at a second slant.

The first slant and the second slant, in accordance with a number of embodiments, can include opposing angles. The opposing angles of slants on opposing posterior sides of the patient's dentition can facilitate desired lateral movement or limit and/or prevent unwanted lateral movement. In some embodiments, the sum of the opposing angles can include 180 degrees. As an example, if the first slant is 70 degrees then the second slant can include 110 degrees.

In accordance with some embodiments, the repositioning jaw elements 1106, 1108, 1110, 1112 extending from surfaces of a shell can be used to generate distalizing force on at least some of the teeth that are located within the shell. For example, when the repositioning jaw elements 1106, 1108, 1110, 1112 interface, the distalizing forces can be isolated to posterior teeth of the upper jaw. The distalizing forces can, in some embodiments, cause tooth movement of the upper jaw posterior teeth in a distal direction. As such, the repositioning jaw elements 1106, 1108, 1110, 1112 in various embodiments can be a substitute for Class II elastics.

In some embodiments, the repositioning jaw elements 1106, 1108, 1110, 1112 can include geometric features to engage with a repositioning jaw element on an opposing jaw. Geometric features, as used herein, can include a variety of protruding geometric shapes (e.g., cylinder, rectangular, etc.) and/or receding geometric shapes (e.g., negative space that matches the protruding geometric shape on a repositioning jaw element on an opposing jaw, as illustrated in the embodiment of FIG. 8A). For example, a geometric feature on the first surface of the first repositioning jaw element 1106 can include a convex cylindrical shaped feature and a geometric feature on the second surface of the second repositioning jaw element 1108 can include a concave cylindrical shaped feature shaped to mate with the geometric feature on the first surface of the first repositioning jaw element 1106

Figure 13A:
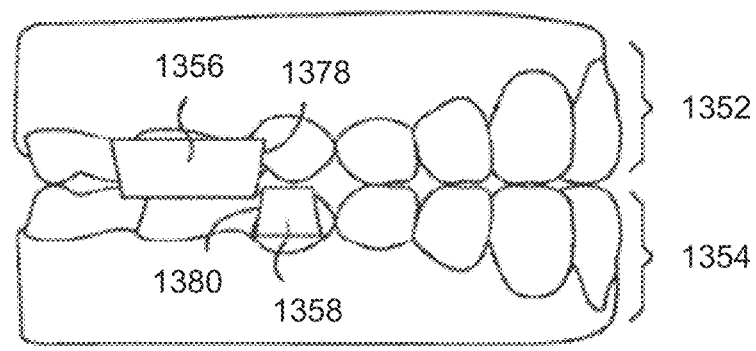
FIG. 13A is a side view of an upper jaw with a first repositioning jaw element (mandibular repositioning block) and a lower jaw with a second repositioning jaw element (mandibular repositioning block), according to certain embodiments.
Figure 13B:
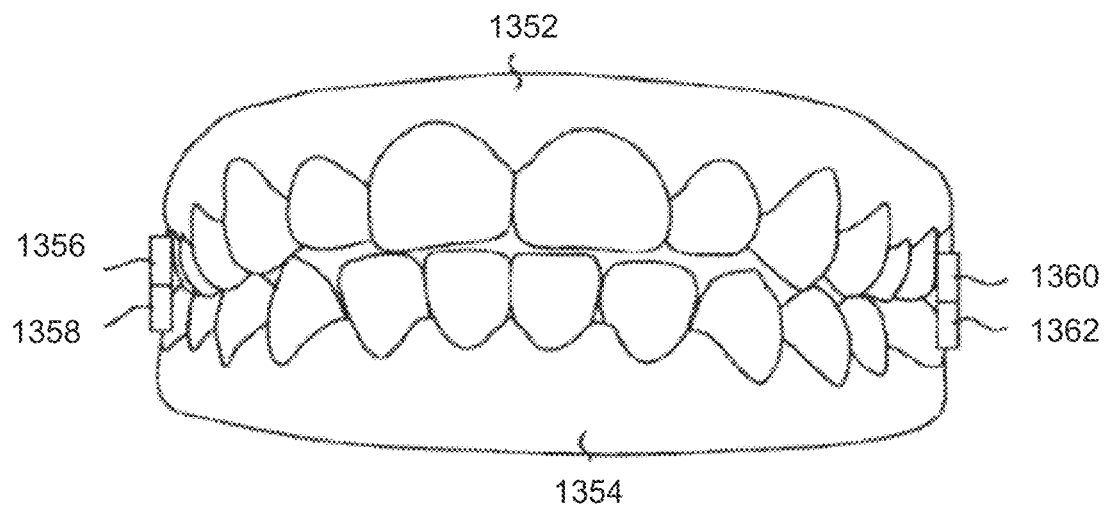
FIG. 13B shows a front view of an upper jaw with a first repositioning jaw element (mandibular repositioning block) and a third repositioning jaw element (mandibular repositioning block) and a lower jaw with a second repositioning jaw element (mandibular repositioning block) and a fourth repositioning jaw element (mandibular repositioning block), according to certain embodiments.

FIGS. 13A-13B illustrate examples of an aligner appliance including mandibular advancement blocks that may be produced by the methods described herein. FIG. 13A illustrates a side view of an upper jaw 1352 with a first repositioning jaw element 1356 and a lower jaw 1354 with a second repositioning jaw element 1358 according to a number of embodiments of the present disclosure. The upper jaw 1352, the first repositioning jaw element 1356, the lower jaw 1354, and the second repositioning jaw element 1358 illustrated in FIG. 13A can include virtual images of jaws and repositioning jaw elements, respectively (e.g., virtual jaws and/or virtual repositioning jaw elements), as discussed further herein. As illustrated in the embodiment of FIG. 13A, the first repositioning jaw element 1356 can be positioned near a buccal surface of the posterior teeth (e.g., molars and bicuspids) of the upper jaw 1352 of the patient to move the position (e.g., to move sagittally) of the lower jaw 1354 in a forward direction or backward direction.

Although not illustrated in FIG. 13A, the first repositioning jaw element 1356 can extend from a buccal surface of a first shell of a dental appliance. A buccal surface of a shell, as used herein, can include an exterior surface of a shell near the buccal surface of the teeth therein. Further, in various embodiments, the first repositioning jaw element 1356 can be positioned near a lingual surface of the first shell. A lingual surface of a shell can include an exterior surface of the shell near the lingual surface of the teeth therein.

The second repositioning jaw element 1358 can be positioned near a buccal surface of the posterior teeth (e.g., bicuspids) of the lower jaw 1354 of the patient to move the position of the lower jaw 1354 in a forward direction or backward direction. Although not illustrated in FIG. 13A, the second repositioning jaw element 1358 can extend from a buccal surface of a second shell of a dental appliance.

The first repositioning jaw element 1356 and the second repositioning jaw element 1358 can interface. For instance, a first surface 1378 of the first repositioning jaw element 1356 can interface with a second surface 1380 of the second repositioning jaw element 1358. The first repositioning jaw element 1356 and the second repositioning jaw element 1358 can be positioned to interface in a presence of a temporary bite (e.g., a fully engaged sagittal jaw position of the patient's upper dentition and the patient's lower dentition) in a manner to reposition the patient's jaw. A fully engaged sagittal jaw position, as previously discussed, can include a relationship of the mandible and the maxilla when the upper and lower jaw are closed as far as the dental appliance with the repositioning jaw elements will allow (e.g., a partial occlusal jaw position).

For example, the first surface 1378 of the first repositioning jaw element 1356 interfacing with the second surface 1380 of the second repositioning jaw element 1358 can place a force on the patient's jaw to reposition the patient's jaw. The force can, for instance, sagittally move the patient's lower jaw 1354.

In various embodiments, at least one of the repositioning jaw elements 1356, 1358 can extend past an occlusal plane of the upper jaw 1352 and/or lower jaw 1354 of the patient. For example, the first repositioning jaw element 1356 can extend past the occlusal plane of the upper jaw 1352 to interface with the second repositioning jaw element 1358. The second repositioning jaw element 1358 may not extend past the occlusal plane of the lower jaw 1354, for instance. Alternatively, the second repositioning jaw element 1358 can extend past the occlusal plane of the lower jaw 1354 to interface with the first repositioning jaw element 1356 and the first repositioning jaw element 1356 may not extend past the occlusal plane of the upper jaw 1352. Further, in some embodiments, both the first repositioning jaw element 1356 and the second repositioning jaw element 1358 can extend past the occlusal plane of the upper jaw 1352 and the lower jaw 1354, respectively, to interface with one another.

FIG. 13B illustrates a front view of an upper jaw 1352 with a first repositioning jaw element 1356 and a third repositioning jaw element 1360 and a lower jaw 1354 with a second repositioning jaw element 1358 and a fourth repositioning jaw element 1362 according to a number of embodiments of the present disclosure. The upper jaw 1352, the first repositioning jaw element 1356, the third repositioning jaw element 1360, the lower jaw 1354, the second repositioning jaw element 1358, and the fourth repositioning jaw element 1362 illustrated in FIG. 13B can include virtual images of jaws and repositioning jaw elements, respectively (e.g., virtual jaws and/or virtual repositioning jaw elements), as discussed further herein. As illustrated by FIG. 13B, two repositioning jaw elements (e.g., the first repositioning jaw element 1356 and the third repositioning jaw element 1360) can be positioned near buccal surfaces of the upper jaw 1352 and two repositioning jaw elements (e.g., the second repositioning jaw element 1358 and the fourth repositioning jaw element 1362) can be positioned near buccal surfaces of the lower jaw 1354.

For example, the first repositioning jaw element 1356 can be positioned near the buccal surfaces of posterior teeth (e.g., molars and/or bicuspids) of the upper jaw 1352 and the second repositioning jaw element 1358 can be positioned near the buccal surfaces of posterior teeth (e.g., bicuspids) of the lower jaw 1354. The first repositioning jaw element 1356 and the second repositioning jaw element 1358 can be located near a first posterior side of the patient's dentition (e.g., positioned on a first posterior side of a first shell and a second shell).

The first repositioning jaw element 1356 and the second repositioning jaw element 1358 can include surfaces designed to interact, interface, and/or otherwise engage with one another. For instance, a first surface of the first repositioning jaw element 1356 can interface with a second surface of a second repositioning jaw element 1358. The first surface can include a slanted surface on a mesial-facing surface of the first repositioning jaw element 1356 and the second surface can include a slanted surface on a distal-facing surface of the first repositioning jaw element 1358, for example.

The third repositioning jaw element 1360 can be positioned near the buccal surfaces of posterior teeth (e.g., molars and/or bicuspids) of the upper jaw 1352 and the fourth repositioning jaw element 1362 can be positioned near the buccal surfaces of posterior teeth (e.g., bicuspids) of the lower jaw 1354. The third repositioning jaw element 1360 and the fourth repositioning jaw element 1362 can be located near a second posterior side of the patient's dentition (e.g., positioned on a second posterior side of a shell of a first shell and a second shell).

The third repositioning jaw element 1360 and the fourth repositioning jaw element 1362 can include surfaces designed to interact, interface, and/or otherwise engage with one another. For instance, a third surface of the third repositioning jaw element 1360 can interface with a fourth surface of the fourth repositioning jaw element 1362. The third surface can include a slanted surface on a mesial-facing surface of the third repositioning jaw element 1360 and the fourth surface can include a slanted surface on a distal-facing surface of the fourth repositioning jaw element 1362, for example.

The surfaces of the repositioning jaw elements 1356, 1358, 1360, 1362 can be angled, in various embodiments, to guide the lower jaw 1354 into the intended and/or final jaw position and/or prevent unwanted lateral movement. The surfaces can be angled in buccal-lingual and/or mesial-distal direction. The angle of the surfaces (e.g., two surfaces that are designed to interface) can be comprised of supplemental angles (e.g., have the same slants at the interface).

For example, the first surface of the first repositioning jaw element 1356 and the second surface of the second repositioning jaw element 1358 can interface at a first slant. The third surface of the third repositioning jaw element 1360 and the fourth surface of the fourth repositioning jaw element 1362 can interface at a second slant.

Although not illustrated by the embodiments of FIG. 13B, the first repositioning jaw element 1356 can extend from a buccal surface of a first shell of a dental appliance and/or the second repositioning jaw element 1358 can extend from a buccal surface of a second shell of the dental appliance. The first repositioning jaw element 1356 and the second repositioning jaw element 1358 can be located near a first side of the patient's dentition (e.g., the right side of the patient's dentition). The third repositioning jaw element 1360 can extend from a buccal surface of the first shell of the dental appliance and the fourth repositioning jaw element 1362 can extend from a buccal surface of the second shell of the dental appliance. The third repositioning jaw element 1360 and the fourth repositioning jaw element 1362 can be located near a second side of the patient's dentition (e.g., a left side of the patient's dentition).

FIG. 12C illustrates a side view of a first shell 1114 with a first repositioning jaw element 1106 and a second shell 1116 with a second repositioning jaw element 1108 according to a number of embodiments of the present disclosure. The side view can, for instance, include a profile view of the first shell 1114 and the second shell 1116. The first shell 1114 and the second shell 1116, in some embodiments, can include a removable dental appliance.

Other examples of aligners including features that may be formed to be more rigid than tooth-engagement regions may include apparatuses with an occlusal block, such as those described in US20210169617, incorporated herein by reference in its entirety.

In general, any of the aligners described herein may have variable properties, including a mix of regions of different stiffness/compliances (e.g., Young's modulus). For example, the methods and features described herein may be used with and/or may modify the apparatuses shown and described in US20170007359A1, herein incorporated by reference in its entirety. For example, the methods described herein may be used to make any of the dental appliances shown and described in the in US20170007359A1.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A system comprising:
a carrier film comprising an outer surface and an inner surface, wherein the inner surface is configured to contact rollers;
a first blade configured to form a layer of resin on the outer surface of the carrier film;
a second blade configured to prevent printed features from contacting the first blade, wherein the second blade forms a plurality of openings that form a graded porosity or a mesh to allow resin to flow through the second blade to prevent accumulation of the resin behind the second blade and to prevent resin-spill over; and
a build platform, wherein a portion of the layer of resin is to be added to an object being formed on the build platform.

2. The system of claim 1, wherein the printed features comprise one or more of a printing defect, incomplete curing, or layer delamination from the object being formed on the build platform.

3. The system of claim 1, wherein the second blade is configured to direct the printed features into a capture basin.

4. The system of claim 1, wherein distance of the second blade from the carrier film and mounting angle of the second blade relative to the carrier film are adjustable for collection of the printed features.

5. The system of claim 1 further comprising a third blade, wherein the second blade and the third blade are at different distances from the carrier film.

6. The system of claim 1 further comprising a closing gate disposed above the carrier film, wherein the second blade is disposed between the first blade and the closing gate, wherein the second blade is closer to the carrier film than the first blade and the closing gate.

7. The system of claim 1, wherein the second blade is curved to collect the printed features.

8. The system of claim 1, wherein the second blade has a shorter height than the first blade.

9. The system of claim 1, wherein the first blade is disposed substantially perpendicular to the carrier film, and wherein the second blade is not parallel to the first blade.

10. The system of claim 1 further comprising an automated device that is configured to remove the printed features from the second blade.

11. The system of claim 1, wherein at least one of the first blade or the second blade is configured to vibrate to reduce viscosity of the layer of resin.

12. The system of claim 1, wherein one or more structures are configured to at least partially cover resin accumulated behind the first blade, and wherein the one or more structures are configured to prevent evaporation of the resin.

13. The system of claim 1, wherein the object is a dental appliance.

14. The system of claim 1 further comprising a controller configured to:
receive image data from an imaging device directed to the carrier film; and
responsive to determining, based on the image data, that uniformity of the layer of resin does not meet a threshold uniformity, moving the second blade to capture the printed features.

15. A system comprising:
a carrier film comprising an outer surface and an inner surface, wherein the inner surface is configured to contact rollers;
a first structure configured to form a layer of resin on the outer surface of the carrier film, wherein the first structure is oriented substantially perpendicular to the carrier film;
a second structure configured to prevent printed features from contacting the first structure, wherein the second structure is disposed proximate the outer surface of the carrier film, wherein the second structure comprises a blade that forms a plurality of openings that form a graded porosity or a mesh to allow resin to flow through the blade to prevent accumulation of the resin behind the blade and to prevent resin-spill over; and
a build platform, wherein a portion of the layer of resin is to be added to an object being formed on the build platform.

16. The system of claim 15, wherein the second structure is closer to the outer surface of the carrier film than the first structure, and wherein the second structure is configured to direct the printed features off of the carrier film.

17. A system comprising:
a plurality of rollers;
a carrier film configured to be moved in a loop trajectory by the plurality of rollers, wherein a layer of resin is to be disposed on an outer surface of the carrier film and the rollers are to contact an inner surface of the carrier film;
a build platform disposed under the carrier film, wherein a portion of the layer of resin is to be added to an object being formed on the build platform; and
a blade disposed above the carrier film, wherein the blade is to direct printed features to a capture basin to maintain thickness uniformity of the layer of resin, wherein the blade forms a plurality of openings that form a graded porosity or a mesh to allow resin to flow through the blade to prevent accumulation of the resin behind the blade and to prevent resin-spill over.

* * * * *